US012677275B2

(12) United States Patent
Rahman et al.

(10) Patent No.: US 12,677,275 B2
(45) Date of Patent: Jul. 7, 2026

(54) UPLINK CODEBOOK DESIGN

(71) Applicant: Samsung Electronics Co., Ltd.,
Suwon-si (KR)

(72) Inventors: Md. Saifur Rahman, Plano, TX (US);
Eko Onggosanusi, Coppell, TX (US)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 309 days.

(21) Appl. No.: 18/431,555

(22) Filed: Feb. 2, 2024

(65) Prior Publication Data

US 2024/0340887 A1      Oct. 10, 2024

Related U.S. Application Data

(60) Provisional application No. 63/537,716, filed on Sep.
11, 2023, provisional application No. 63/459,917,
(Continued)

(51) Int. Cl.
*H04W 72/1268* (2023.01)
*H04B 7/06* (2006.01)

(52) U.S. Cl.
CPC ........ *H04W 72/1268* (2013.01); *H04B 7/063*
(2013.01); *H04B 7/0639* (2013.01)

(58) Field of Classification Search
CPC . H04W 72/1268; H04B 7/063; H04B 7/0639;
H04B 7/0404
See application file for complete search history.

(56) References Cited

U.S. PATENT DOCUMENTS 12,489,493 B2 * 12/2025   Kang .................. H04B 7/0404
2016/0142117 A1   5/2016   Rahman et al.
(Continued)

FOREIGN PATENT DOCUMENTS

EP        2396938 B1     9/2015

OTHER PUBLICATIONS

International Search Report issued May 8, 2024 regarding International Application No. PCT/KR2024/002125, 3 pages.
(Continued)

*Primary Examiner* — Chandrahas B Patel

(57) ABSTRACT

Apparatuses and methods for uplink (UL) codebook design are provided. A method performed by a user equipment (UE) is provided. The method includes receiving a configuration about an uplink (UL) codebook ($C_8$) for N=8 antenna ports partitioned into $N_g$ groups; receiving an indication indicating a transmit precoding matrix indicator (TPMI) for transmission of a physical uplink shared channel (PUSCH); and transmitting the PUSCH based on the indicated TPMI. The TPMI indicates a precoding matrix (W) from the UL codebook ($C_8$) and the precoding matrix (W) is based on up to K submatrices. Each of the K submatrices is a full-coherent (FC) precoding matrix for $$P = \frac{N}{N_g}$$

antenna ports and is associated with one of the $N_g$ groups, $K \in \{1, \ldots, N_g\}$ and $N_g \in \{2, 4\}$.

20 Claims, 8 Drawing Sheets

Related U.S. Application Data filed on Apr. 17, 2023, provisional application No. 63/458,854, filed on Apr. 12, 2023, provisional application No. 63/449,267, filed on Mar. 1, 2023, provisional application No. 63/446,686, filed on Feb. 17, 2023.

(56)  References Cited

U.S. PATENT DOCUMENTS

| | | |
|---|---|---|
| 2021/0105724 A1 | 4/2021 | Huang et al. |
| 2021/0143874 A1 | 5/2021 | Park et al. |
| 2022/0166475 A1 | 5/2022 | Park et al. |
| 2025/0373290 A1* | 12/2025 | Zhang .................. H04B 7/0404 |

OTHER PUBLICATIONS

"LTE; Evolved Universal Terrestrial Radio Access (E-UTRA); Physical channels and modulation (3GPP TS 36.211 version 17.1.0 Release 17)", ETSI TS 136 211 V17.1.0, May 2022, 252 pages.

"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.

"LTE; Evolved Universal Terrestrial Radio Access (E-UTRA); Physical layer procedures (3GPP TS 36.213 version 17.1.0 Release 17)", ETSI TS 136 213 V17.1.0, May 2022, 586 pages.

"LTE; Evolved Universal Terrestrial Radio Access (E-UTRA); Medium Access Control (MAC) protocol specification (3GPP TS 36.321 version 17.1.0 Release 17)", ETSI TS 136 321 V17.1.0, Aug. 2022,147 pages.

"LTE; Evolved Universal Terrestrial Radio Access (E-UTRA); Radio Resource Control (RRC); Protocol specification (3GPP TS 36.331 version 17.1.0 Release 17)", ETSI TS 136 331 V17.1.0, Aug. 2022, 1135 pages.

"3rd Generation Partnership Project; Technical Specification Group Radio Access Network; NR; Physical channels and modulation (Release 17)", 3GPP TS 38.211 V17.1.0, Mar. 2022, 135 pages.

"3rd Generation Partnership Project; Technical Specification Group Radio Access Network; NR; Multiplexing and channel coding (Release 17)", 3GPP TS 38.212 V17.1.0, Mar. 2022, 197 pages.

"3rd Generation Partnership Project; Technical Specification Group Radio Access Network; NR; Physical layer procedures for control (Release 17)", 3GPP TS 38.213 V17.1.0, Mar. 2022, 245 pages.

"3rd Generation Partnership Project; Technical Specification Group Radio Access Network; NR; Physical layer procedures for data (Release 17)", 3GPP TS 38.214 V17.1.0, Mar. 2022, 225 pages.

5G; NR; Physical layer measurements (3GPP TS 38.215 version 17.1.0 Release 17), ETSI TS 138 215 V17.1.0, Apr. 2022, 32 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

* cited by examiner

| | 1 port | 2 ports | 4 ports | 6 ports |
|---|---|---|---|---|
| X-pol or dual-pol | | × | × × | × × × |
| | | (N1,N2) = (1,1) | (N1,N2) = (2,1) | (N1,N2) = (3,1) |
| Co-pol | / | / / | / / / / | / / / |
| | (N1,N2) = (1,1) | (N1,N2) = (2,1) | (N1,N2) = (4,1)   (N1,N2) = (2,2) | (N1,N2) = (6,1)   (N1,N2) = (3,2) |
| | 8 ports | 12 ports |
|---|---|---|
| X-pol or dual-pol | × × × ×   × × × × | × × × × × ×   × × × × × × |
| | (N1,N2) = (4,1)   (N1,N2) = (2,2) | (N1,N2) = (6,1)   (N1,N2) = (3,2) |
| Co-pol | / / / / / / / /   / / / / | / / / / / / / / / /   (N1,N2) = (6,2)   (N1,N2) = (4,3)   / / / / / / / / / / / / |
| | (N1,N2) = (8,1)   (N1,N2) = (4,2) | (N1,N2) = (12,1) |
FIG. 7

800

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | - | - | - | - |

Receive a configuration about an UL codebook $N = 8$ antenna ports partitioned into $N_g$ groups. ～ 910

Receive an indication indicating a TPMI for transmission of a PUSCH. ～ 920

Transmit the PUSCH based on the indicated TPMI. ～ 930

UPLINK CODEBOOK DESIGN

CROSS-REFERENCE TO RELATED APPLICATION AND CLAIM OF PRIORITY

This application claims priority under 35 U.S.C. § 119(e) to U.S. Provisional Patent Application No. 63/446,686 filed on Feb. 17, 2023, U.S. Provisional Patent Application No. 63/449,267 filed on Mar. 1, 2023, U.S. Provisional Patent Application No. 63/458,854 filed on Apr. 12, 2023, U.S. Provisional Patent Application No. 63/459,917 filed on Apr. 17, 2023, and U.S. Provisional Patent Application No. 63/537,716 filed on Sep. 11, 2023. The above-identified provisional patent applications are hereby incorporated by reference in their entirety.

TECHNICAL FIELD

The present disclosure relates generally to wireless communication systems and, more specifically, to uplink codebook design.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for uplink codebook design.

In one embodiment, a user equipment (UE) is provided. The UE includes a processor and a transceiver operably coupled to the processor. The transceiver is configured to receive a configuration about an uplink (UL) codebook ($C_8$) for N=8 antenna ports partitioned into $N_g$ groups; receive an indication indicating a transmit precoding matrix indicator (TPMI) for transmission of a physical uplink shared channel (PUSCH); and transmit the PUSCH based on the indicated TPMI. The TPMI indicates a precoding matrix (W) from the UL codebook ($C_8$) and the precoding matrix (W) is based on up to K submatrices. Each of the K submatrices is a full-coherent (FC) precoding matrix for $$P = \frac{N}{N_g}$$

antenna ports and is associated with one of the $N_g$ groups, $K \in \{1, \ldots, N_g\}$ and $N_g \in \{2, 4\}$.

In another embodiment, a base station (BS) is provided. The BS includes a processor and a transceiver operably coupled to the processor. The transceiver configured to transmit a configuration about an UL codebook ($C_8$) for N=8 antenna ports partitioned into $N_g$ groups; transmit an indication indicating a TPMI for transmission of a PUSCH; and receive the PUSCH based on the indicated TPMI. The TPMI indicates a precoding matrix (W) from the UL codebook ($C_8$) and the precoding matrix (W) is based on up to K submatrices. Each of the K submatrices is a FC precoding matrix for $$P = \frac{N}{N_g}$$

antenna ports and is associated with one of the $N_g$ groups, $K \in \{1, \ldots, N_g\}$ and $N_g \in \{2, 4\}$.

In yet another embodiment, a method performed by a UE is provided. The method includes receiving a configuration about an UL codebook ($C_8$) for N=8 antenna ports partitioned into $N_g$ groups; receiving an indication indicating a TPMI for transmission of a PUSCH; and transmitting the PUSCH based on the indicated TPMI. The TPMI indicates a precoding matrix (W) from the UL codebook ($C_8$) and the precoding matrix (W) is based on up to K submatrices. Each of the K submatrices is a FC precoding matrix for $$P = \frac{N}{N_g}$$

antenna ports and is associated with one of the $N_g$ groups, $K \in \{1, \ldots, N_g\}$ and $N_g \in \{2, 4\}$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example antenna port layout according to embodiments of the present disclosure;

FIG. 8 illustrates an example of partial coherence (PC) precoder design for rank 1 according to embodiments of the present disclosure.

DETAILED DESCRIPTION

Figure 1:
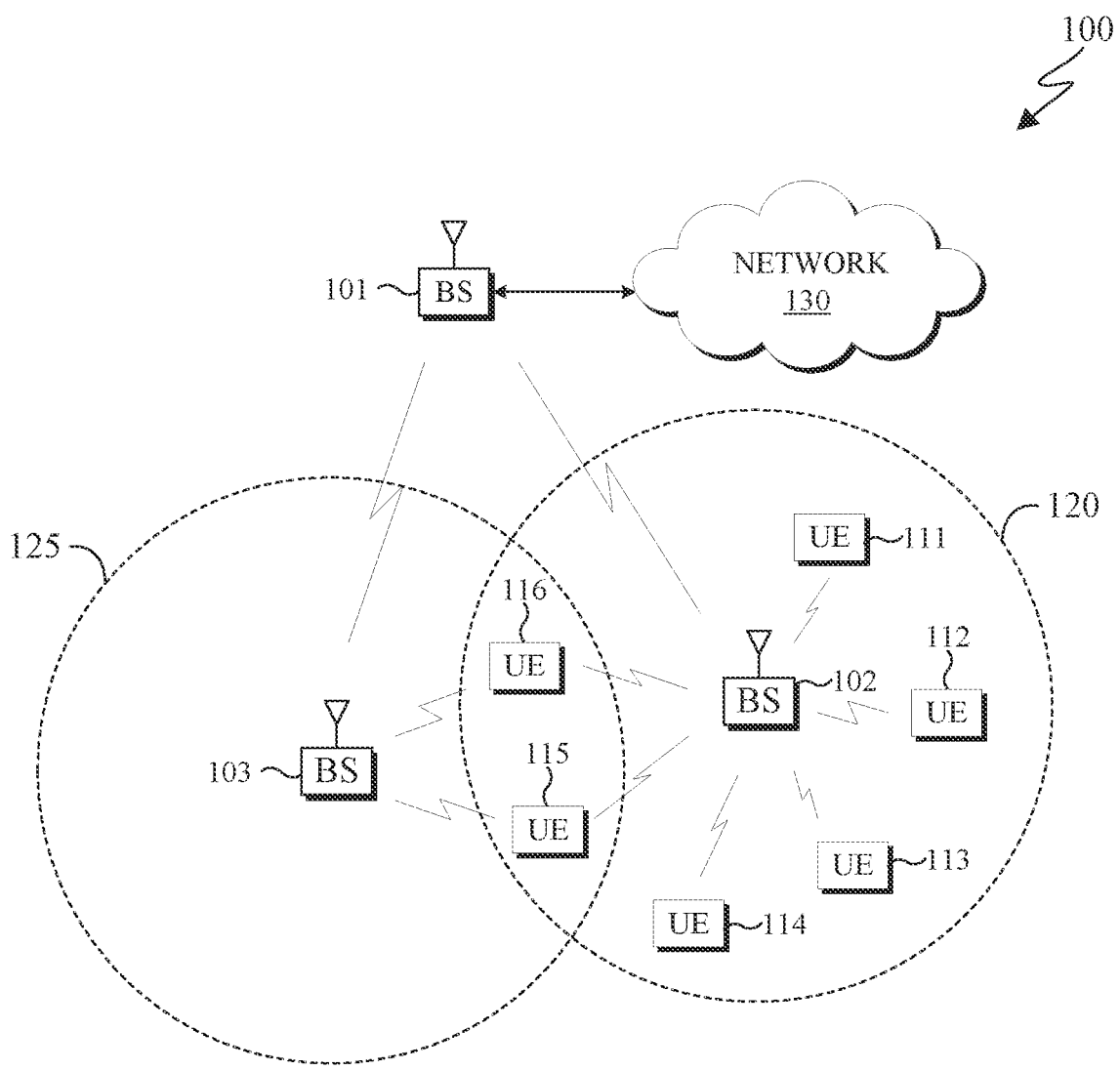
FIG. 1 illustrates an example wireless network according to embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.1.0, "E-UTRA, Physical channels and modulation" (herein "REF 1"); 3GPP TS 36.212 v17.1.0, "E-UTRA, Multiplexing and Channel coding" (herein "REF 2"); 3GPP TS 36.213 v17.1.0, "E-UTRA, Physical Layer Procedures" (herein "REF 3"); 3GPP TS 36.321 v17.1.0, "E-UTRA, Medium Access Control (MAC) protocol specification" (herein "REF 4"); 3GPP TS 36.331 v17.1.0, "E-UTRA, Radio Resource Control (RRC) protocol specification" (herein "REF 5"); 3GPP TS 38.211 v17.1.0, "NR, Physical channels and modulation" (herein "REF 6"); 3GPP TS 38.212 v17.1.0, "NR, Multiplexing and Channel coding" (herein "REF 7"); 3GPP TS 38.213 v17.1.0, "NR, Physical Layer Procedures for Control" (herein "REF 8"); 3GPP TS 38.214 v17.1.0, "NR, Physical Layer Procedures for Data" (herein "REF 39); 3GPP TS 38.215 v17.1.0, "NR, Physical Layer Measurements" (herein "REF 10"); 3GPP TS 38.321 v17.1.0, "NR, Medium Access Control (MAC) protocol specification" (herein "REF 11"); 3GPP TS 38.331 v17.1.0, "NR, Radio Resource Control (RRC) Protocol Specification (herein REF 12)".

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
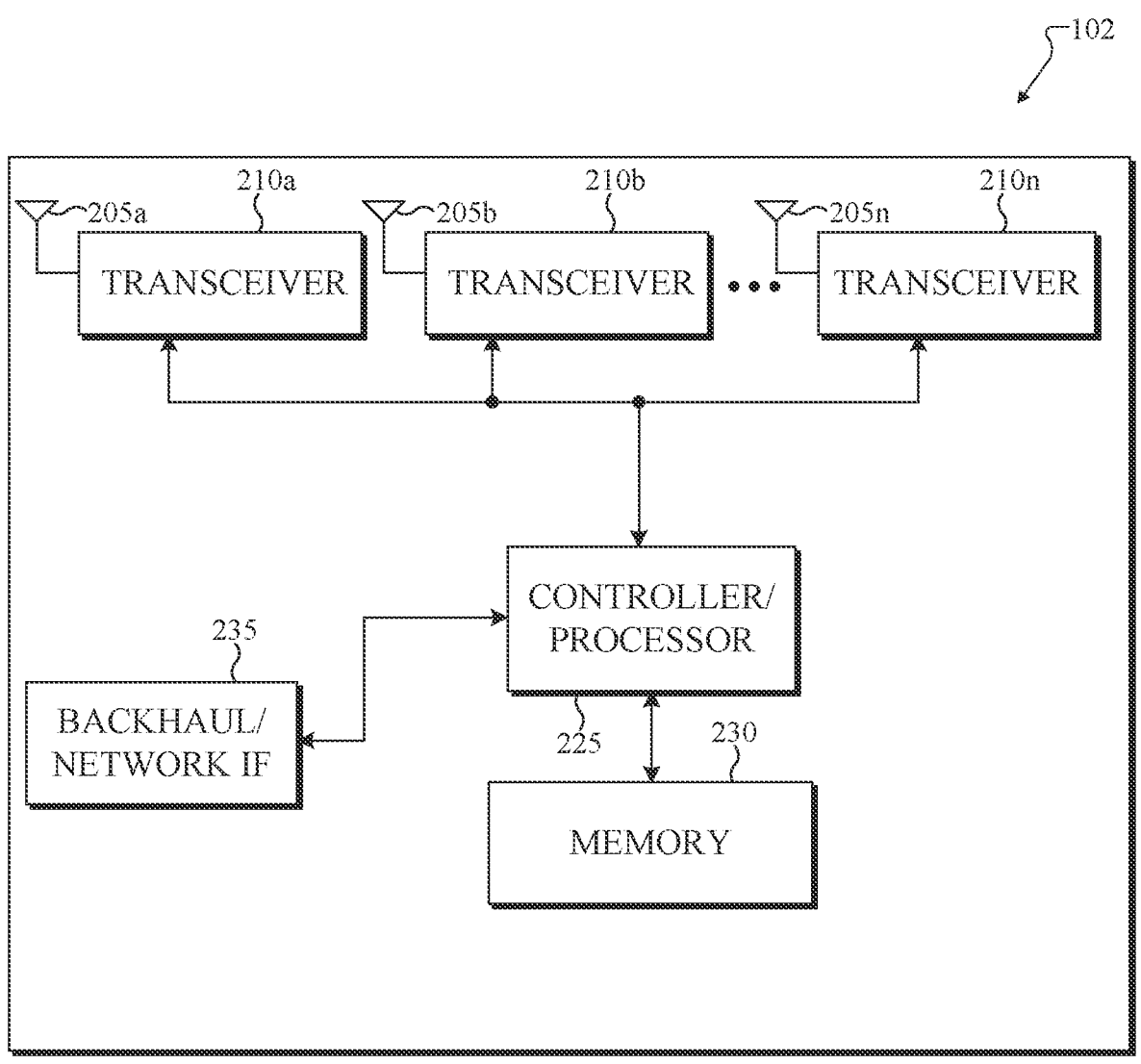
FIG. 2 illustrates an example gNodeB (gNB) according to embodiments of the present disclosure.
Figure 3:
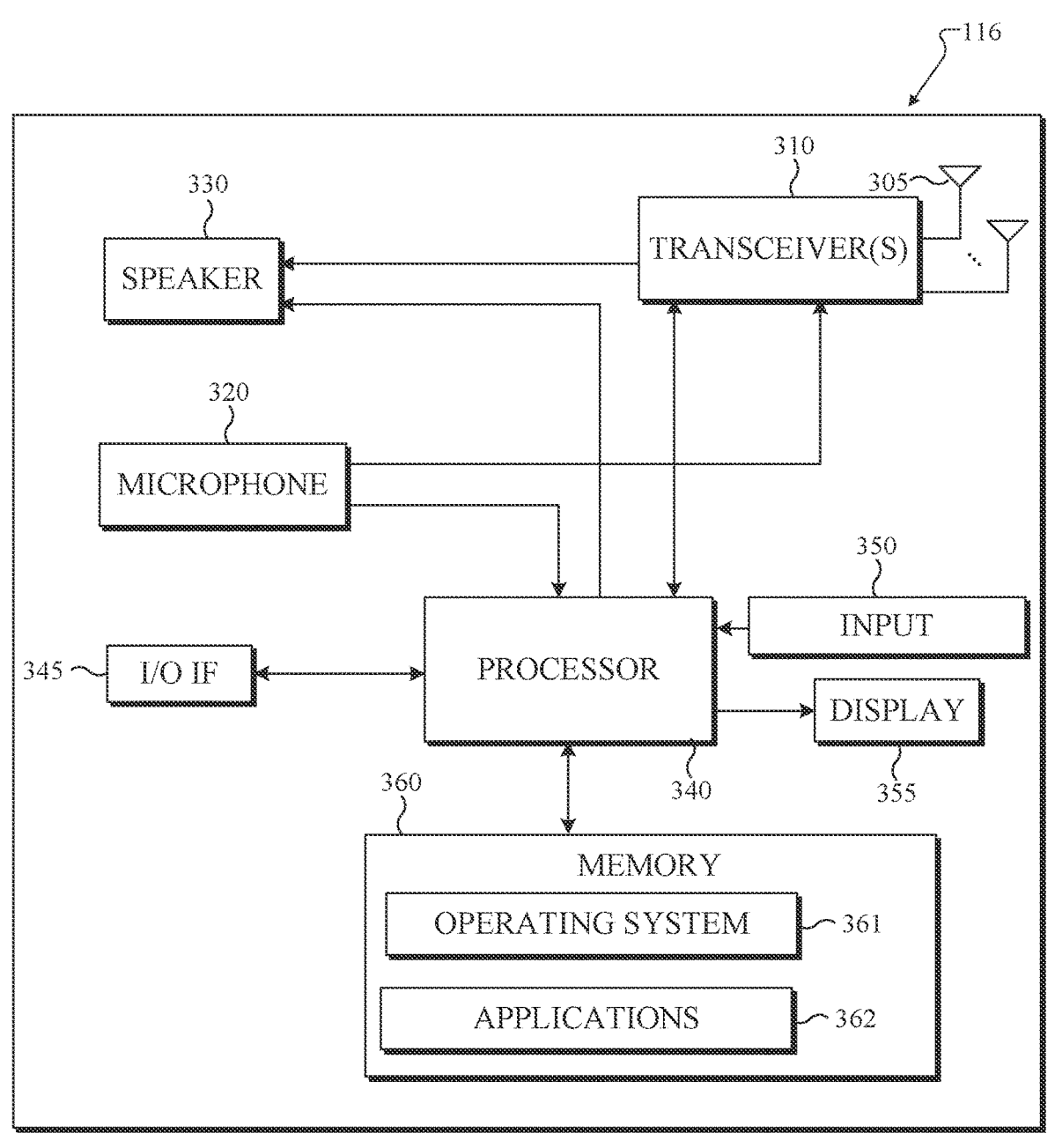
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing an uplink codebook design. In certain embodiments, one or more of the BSs 101-103 include circuitry, programing, or a combination thereof for supporting uplink codebook design.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for uplink codebook design. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes to utilize an uplink codebook design as described in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
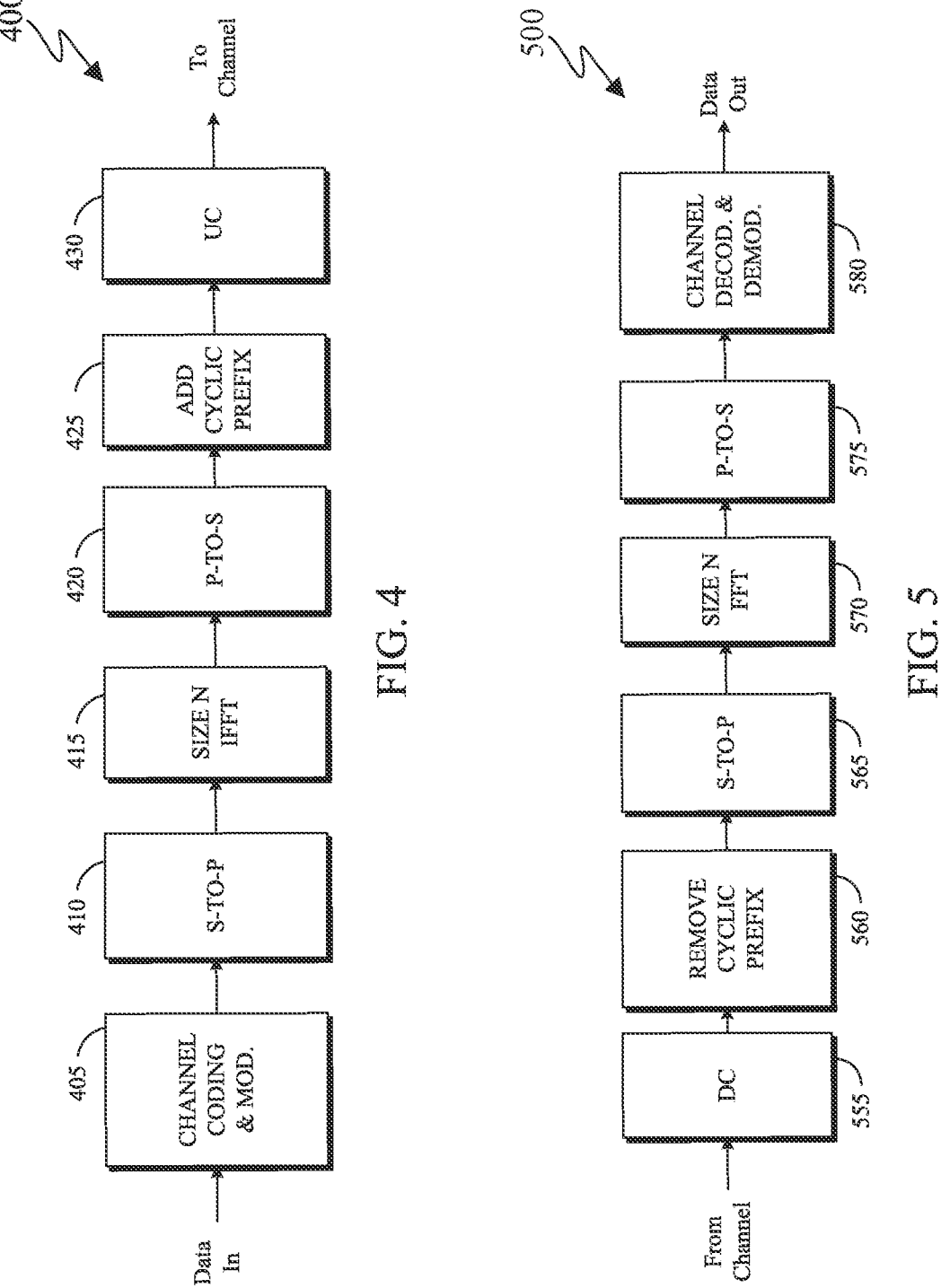
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the transmit path 400 is configured to use an uplink codebook design as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The 3GPP NR specification supports up to 32 CSI-RS antenna ports which enable an eNB (or gNB) to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase. For UL transmission, the 3GPP specification supports 1, 2, or 4 SRS antenna ports in one SRS resource, where each SRS antenna port can be mapped to one or multiple antenna elements at the UE.

Figure 6:
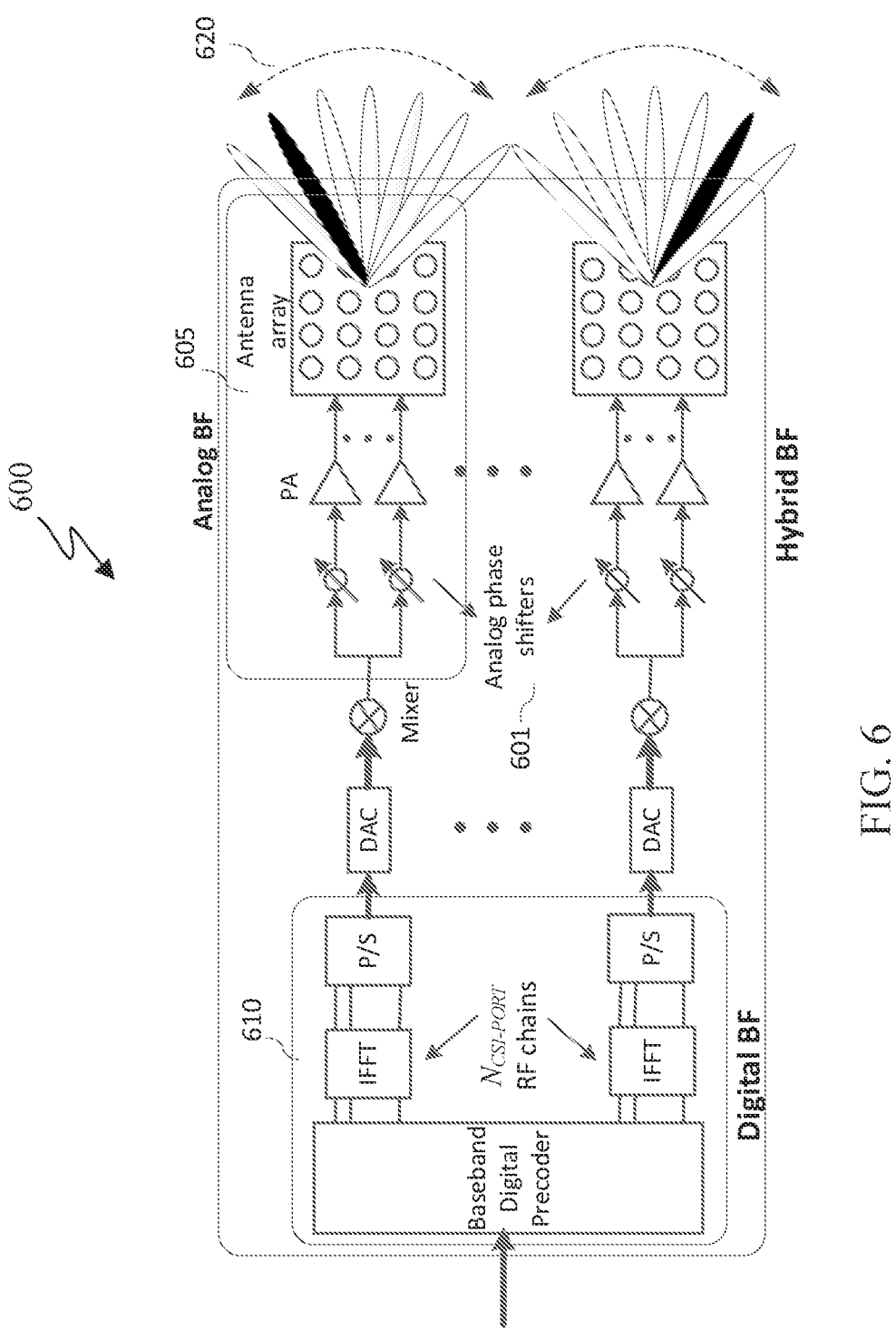
FIG. 6 illustrates an example antenna blocks or arrays forming beams according to embodiments of the present disclosure.

FIG. 6 illustrates an example antenna blocks or arrays 600 according to embodiments of the present disclosure. The embodiment of the antenna blocks or arrays 600 illustrated in FIG. 6 is for illustration only. FIG. 6 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

Embodiments of the present disclosure recognize and take into consideration that, in NR, two transmission schemes are supported for PUSCH: codebook based transmission and non-codebook based transmission. The UE is configured with codebook based transmission when the higher layer parameter txConfig in pusch-Config is set to 'codebook', the UE is configured non-codebook based transmission when the higher layer parameter txConfig is set to 'nonCodebook'.

According to Section 6.1.1.1 [REF9], the following is supported for codebook based UL transmission.

For codebook-based transmission, PUSCH can be scheduled by DCI format 0_0, DCI format 0_1, DCI format 0_2 or semi-statically configured to operate according to Clause 6.1.2.3 [REF9]. If this PUSCH is scheduled by DCI format 0_1, DCI format 0_2, or semi-statically configured to operate according to Clause 6.1.2.3 [REF9], the UE determines its PUSCH transmission precoder based on SRI, TPMI and the transmission rank, where the SRI, TPMI and the transmission rank are given by DCI fields of SRS resource indicator and Precoding information and number of layers in clause 7.3.1.1.2 and 7.3.1.1.3 of [5, REF] for DCI format 0_1 and 0_2 or given by srs-ResourceIndicator and precodingAndNumberOfLayers according to clause 6.1.2.3. The SRS-ResourceSet(s) applicable for PUSCH scheduled by DCI format 0_1 and DCI format 0_2 are defined by the entries of the higher layer parameter srs-ResourceSetToAddModList and srs-ResourceSetToAddModListDCI-0-2 in SRS-config, respectively. Only one SRS resource set can be configured in srs-ResourceSetToAddModList with higher layer parameter usage in SRS-ResourceSet set to 'codebook', and only one SRS resource set can be configured in srs-ResourceSetToAddModListDCI-0-2 with higher layer parameter usage in SRS-ResourceSet set to 'codebook'. The TPMI is used to indicate the precoder to be applied over the layers $\{0 \ldots v-1\}$ and that corresponds to the SRS resource selected by the SRI when multiple SRS resources are configured, or if a single SRS resource is configured TPMI is used to indicate the precoder to be applied over the layers $\{0 \ldots v-1\}$ and that corresponds to the SRS resource. The transmission precoder is selected from the uplink codebook that has a number of antenna ports equal to higher layer parameter nrofSRS-Ports in SRS-Config, as defined in Clause 6.3.1.5 of [4, TS 38.211]. When the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI.

For codebook-based transmission, the UE determines its codebook subsets based on TPMI and upon the reception of higher layer parameter codebookSubset in pusch-Config for PUSCH associated with DCI format 0_1 and codebookSubsetDCI-0-2 in pusch-Config for PUSCH associated with DCI format 0_2 which may be configured with 'fullyAndPartialAndNonCoherent', or 'partialAndNonCoherent', or 'nonCoherent' depending on the UE capability. When higher layer parameter ul-FullPowerTransmission is set to 'fullpowerMode2' and the higher layer parameter codebookSubset or the higher layer parameter codebookSubsetForDCI-Format0-2 is set to 'partialAndNonCoherent', and when the SRS-resourceSet with usage set to "codebook" includes at least one SRS resource with 4 ports and one SRS resource with 2 ports, the codebookSubset associated with the 2-port SRS resource is 'nonCoherent'. The maximum transmission rank may be configured by the higher layer parameter maxRank in pusch-Config for PUSCH scheduled with DCI format 0_1 and maxRank-ForDCIFormat0_2 for PUSCH scheduled with DCI format 0_2.

A UE reporting its UE capability of 'partialAndNonCoherent' transmission may not expect to be configured by either codebookSubset or codebookSubsetForDCI-Format0-2 with 'fullyAndPartialAndNonCoherent'.

A UE reporting its UE capability of 'nonCoherent' transmission may not expect to be configured by either codebookSubset or codebookSubsetForDCI-Format0-2 with 'fullyAndPartialAndNonCoherent' or with 'partialAndNonCoherent'.

A UE may not expect to be configured with the higher layer parameter codebookSubset or the higher layer parameter codebookSubsetForDCI-Format0-2 set to 'partialAndNonCoherent' when higher layer parameter nrofSRS-Ports in an SRS-ResourceSet with usage set to 'codebook' indicates that the maximum number of the configured SRS antenna ports in the SRS-ResourceSet is two.

For codebook-based transmission, only one SRS resource can be indicated based on the SRI from within the SRS resource set. Except when higher layer parameter ul-FullPowerTransmission is set to 'fullpowerMode2', the maximum number of configured SRS resources for codebook-based transmission is 2. If aperiodic SRS is configured for a UE, the SRS request field in DCI triggers the transmission of aperiodic SRS resources.

A UE may not expect to be configured with higher layer parameter ul-FullPowerTransmission set to 'fullpowerMode1' and codebookSubset or codebookSubsetDCI-0-2 set to 'fullAndPartialAndNonCoherent' simultaneously.

The UE may transmit PUSCH using the same antenna port(s) as the SRS port(s) in the SRS resource indicated by the DCI format 0_1 or 0_2 or by configuredGrantConfig according to clause 6.1.2.3.

The DM-RS antenna ports $\{p_0, \ldots, \tilde{p}_{v-1}\}$ in Clause 6.4.1.1.3 of [4, TS38.211] are determined according to the ordering of DM-RS port(s) given by Tables 7.3.1.1.2-6 to 7.3.1.1.2-23 in Clause 7.3.1.1.2 of [5, TS 38.212].

Except when higher layer parameter ul-FullPowerTransmission is set to 'fullpowerMode2', when multiple SRS resources are configured by SRS-ResourceSet with usage set to 'codebook', the UE may expect that higher layer parameters nrofSRS-Ports in SRS-Resource in SRS-ResourceSet may be configured with the same value for all these SRS resources.

In the rest of the disclosure, 'fullAndPartialAndNonCoherent', 'partialAndNonCoherent', and 'Non-Coherent' are referred to codebookSubsets depending on three coherence type/capability, where the term 'coherence' implies all or a subset of antenna ports at the UE that can be used to transmit a layer coherently. In particular, the term 'full-coherence' (FC) implies all antenna ports at the UE that can be used to transmit a layer coherently.

the term 'partial-coherence' (PC) implies a subset (at least two but less than all) of antenna ports at the UE that can be used to transmit a layer coherently.

the term 'non-coherence' (NC) implies only one antenna port at the UE that can be used to transmit a layer.

When the UE is configured with codebookSubset='fullAndPartialAndNonCoherent', the UL codebook includes all three types (FC, PC, NC) of precoding matrices; when the UE is configured with codebookSubset='partialAndNonCoherent', the UL codebook includes two types (PC, NC) of precoding matrices; and when the UE is configured with codebookSubset='nonCoherent', the UL codebook includes only one type (NC) of precoding matrices.

According to Section 6.3.1.5 of REF7, for non-codebook-based UL transmission, the precoding matrix W equals the identity matrix. For codebook-based UL transmission, the precoding matrix W is given by W=1 for single-layer transmission on a single antenna port, otherwise by Table 1 to Table 6, which are copied below.

The rank (or number of layers) and the corresponding precoding matrix W are indicated to the UE using TRI and TPMI, respectively. In one example, this indication is joint via a field 'Precoding information and number of layers' in DCI, e.g., using DCI format 0_1. In another example, this indication is via higher layer RRC signaling. In one example, the mapping between a field 'Precoding information and number of layers' and TRI/TPMI is according to Section 7.3.1.1.2 of [REF10].

TABLE 1

Precoding matrix W for single-layer transmission using two antenna ports.

| TPMI index | W (ordered from left to right in increasing order of TPMI index) |
|---|---|
| 0-5 | $\frac{1}{\sqrt{2}}\begin{bmatrix}1\\0\end{bmatrix}\quad \frac{1}{\sqrt{2}}\begin{bmatrix}0\\1\end{bmatrix}\quad \frac{1}{\sqrt{2}}\begin{bmatrix}1\\1\end{bmatrix}\quad \frac{1}{\sqrt{2}}\begin{bmatrix}1\\-1\end{bmatrix}\quad \frac{1}{\sqrt{2}}\begin{bmatrix}1\\j\end{bmatrix}\quad \frac{1}{\sqrt{2}}\begin{bmatrix}1\\-j\end{bmatrix}\quad -\quad -$ |

TABLE 2

Precoding matrix W for single-layer transmission using four antenna ports with transform precoding disabled.

| TPMI index | W (ordered from left to right in increasing order of TPMI index) |
|---|---|
| 0-7 | $\frac{1}{2}\begin{bmatrix}1\\0\\0\\0\end{bmatrix}\ \frac{1}{2}\begin{bmatrix}0\\1\\0\\0\end{bmatrix}\ \frac{1}{2}\begin{bmatrix}0\\0\\1\\0\end{bmatrix}\ \frac{1}{2}\begin{bmatrix}0\\0\\0\\1\end{bmatrix}\ \frac{1}{2}\begin{bmatrix}1\\0\\1\\0\end{bmatrix}\ \frac{1}{2}\begin{bmatrix}1\\0\\-1\\0\end{bmatrix}\ \frac{1}{2}\begin{bmatrix}1\\0\\j\\0\end{bmatrix}\ \frac{1}{2}\begin{bmatrix}1\\0\\-j\\0\end{bmatrix}$ |
| 8-15 | $\frac{1}{2}\begin{bmatrix}0\\1\\0\\1\end{bmatrix}\ \frac{1}{2}\begin{bmatrix}0\\1\\0\\-1\end{bmatrix}\ \frac{1}{2}\begin{bmatrix}0\\1\\0\\j\end{bmatrix}\ \frac{1}{2}\begin{bmatrix}0\\1\\0\\-j\end{bmatrix}\ \frac{1}{2}\begin{bmatrix}1\\1\\1\\1\end{bmatrix}\ \frac{1}{2}\begin{bmatrix}1\\1\\j\\j\end{bmatrix}\ \frac{1}{2}\begin{bmatrix}1\\1\\-1\\-1\end{bmatrix}\ \frac{1}{2}\begin{bmatrix}1\\1\\-j\\-j\end{bmatrix}$ |
| 16-23 | $\frac{1}{2}\begin{bmatrix}1\\j\\1\\j\end{bmatrix}\ \frac{1}{2}\begin{bmatrix}1\\j\\j\\-1\end{bmatrix}\ \frac{1}{2}\begin{bmatrix}1\\j\\-1\\-j\end{bmatrix}\ \frac{1}{2}\begin{bmatrix}1\\j\\-j\\1\end{bmatrix}\ \frac{1}{2}\begin{bmatrix}1\\-1\\1\\-1\end{bmatrix}\ \frac{1}{2}\begin{bmatrix}1\\-1\\j\\-j\end{bmatrix}\ \frac{1}{2}\begin{bmatrix}1\\-1\\-1\\1\end{bmatrix}\ \frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}\ \frac{1}{2}\begin{bmatrix}1\\-j\\j\\1\end{bmatrix}\ \frac{1}{2}\begin{bmatrix}1\\-j\\-1\\j\end{bmatrix}\ \frac{1}{2}\begin{bmatrix}1\\-j\\-j\\-1\end{bmatrix}\quad -\quad -\quad -\quad -$ |

TABLE 3

Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1&0\\0&1\end{bmatrix}\qquad \frac{1}{2}\begin{bmatrix}1&1\\1&-1\end{bmatrix}\qquad \frac{1}{2}\begin{bmatrix}1&1\\j&-j\end{bmatrix}$ |

14

TABLE 4

Precoding matrix W for two-layer transmission using four antenna ports with transform precoding disabled.

| TPMI index | W (ordered from left to right in increasing order of TPMI index) |
|---|---|
| 0-3 | $\frac{1}{2}\begin{bmatrix}1&0\\0&1\\0&0\\0&0\end{bmatrix}\ \frac{1}{2}\begin{bmatrix}1&0\\0&0\\0&1\\0&0\end{bmatrix}\ \frac{1}{2}\begin{bmatrix}1&0\\0&0\\0&0\\0&1\end{bmatrix}\ \frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}\ \frac{1}{2}\begin{bmatrix}0&0\\0&0\\1&0\\0&1\end{bmatrix}\ \frac{1}{2}\begin{bmatrix}1&0\\0&1\\1&0\\0&-j\end{bmatrix}\ \frac{1}{2}\begin{bmatrix}1&0\\0&1\\1&0\\0&j\end{bmatrix}$ |

TABLE 4-continued

Precoding matrix W for two-layer transmission using four antenna ports with transform precoding disabled.

| TPMI index | W (ordered from left to right in increasing order of TPMI index) |
|---|---|
| 8-11 | $\frac{1}{2}\begin{bmatrix}1&0\\0&1\\-j&0\\0&1\end{bmatrix}\ \frac{1}{2}\begin{bmatrix}1&0\\0&1\\-j&0\\0&-1\end{bmatrix}\ \frac{1}{2}\begin{bmatrix}1&0\\0&1\\-1&0\\0&j\end{bmatrix}\ \frac{1}{2}\begin{bmatrix}1&0\\0&1\\-1&0\\0&j\end{bmatrix}$ |

15

TABLE 4-continued

Precoding matrix W for two-layer transmission using four antenna ports
with transform precoding disabled.

| TPMI index | W (ordered from left to right in increasing order of TPMI index) |
|---|---|
| 12-15 | $$\frac{1}{2}\begin{bmatrix}1&0\\0&1\\j&0\\0&1\end{bmatrix}\quad \frac{1}{2}\begin{bmatrix}1&0\\0&1\\j&0\\0&-1\end{bmatrix}\quad \frac{1}{2\sqrt{2}}\begin{bmatrix}1&1\\1&1\\1&-1\\1&-1\end{bmatrix}\quad \frac{1}{2\sqrt{2}}\begin{bmatrix}1&1\\1&1\\j&-j\\j&-j\end{bmatrix}$$ |
| 16-19 | $$\frac{1}{2\sqrt{2}}\begin{bmatrix}1&1\\j&j\\1&-1\\j&-j\end{bmatrix}\quad \frac{1}{2\sqrt{2}}\begin{bmatrix}1&1\\j&j\\j&-j\\-1&1\end{bmatrix}\quad \frac{1}{2\sqrt{2}}\begin{bmatrix}1&1\\-1&-1\\1&-1\\-1&1\end{bmatrix}\quad \frac{1}{2\sqrt{2}}\begin{bmatrix}1&1\\-1&-1\\j&-j\\-j&j\end{bmatrix}$$ |
| 20-21 | $$\frac{1}{2\sqrt{2}}\begin{bmatrix}1&1\\-j&-j\\1&-1\\-j&j\end{bmatrix}\quad \frac{1}{2\sqrt{2}}\begin{bmatrix}1&1\\-j&-j\\j&-j\\1&-1\end{bmatrix}\quad\quad -\quad\quad\quad -$$ |

TABLE 5

Precoding matrix W for three-layer transmission using four antenna ports with
transform precoding disabled.

| TPMI index | W (ordered from left to right in increasing order of TPMI index) |
|---|---|
| 0-3 | $$\frac{1}{2}\begin{bmatrix}1&0&0\\0&1&0\\0&0&1\\0&0&0\end{bmatrix}\quad \frac{1}{2}\begin{bmatrix}1&0&0\\0&1&0\\1&0&0\\0&0&1\end{bmatrix}\quad \frac{1}{2}\begin{bmatrix}1&0&0\\0&1&0\\-1&0&0\\0&0&1\end{bmatrix}\quad \frac{1}{2\sqrt{3}}\begin{bmatrix}1&1&1\\1&-1&1\\1&1&-1\\1&-1&-1\end{bmatrix}$$ |
| 4-6 | $$\frac{1}{2\sqrt{3}}\begin{bmatrix}1&1&1\\1&-1&1\\j&j&-j\\j&-j&-j\end{bmatrix}\quad \frac{1}{2\sqrt{3}}\begin{bmatrix}1&1&1\\-1&1&-1\\1&1&-1\\-1&1&1\end{bmatrix}\quad \frac{1}{2\sqrt{3}}\begin{bmatrix}1&1&1\\-1&1&-1\\j&j&-j\\-j&j&j\end{bmatrix}\quad -$$ |

TABLE 6

Precoding matrix W for four-layer transmission using four antenna ports with
transform precoding disabled.

| TPMI index | W (ordered from left to right in increasing order of TPMI index) |
|---|---|
| 0-3 | $$\frac{1}{2}\begin{bmatrix}1&0&0&0\\0&1&0&0\\0&0&1&0\\0&0&0&1\end{bmatrix}\quad \frac{1}{2\sqrt{2}}\begin{bmatrix}1&1&0&0\\0&0&1&1\\1&-1&0&0\\0&0&1&-1\end{bmatrix}\quad \frac{1}{2\sqrt{2}}\begin{bmatrix}1&1&0&0\\0&0&1&1\\j&-j&0&0\\0&0&j&-j\end{bmatrix}\quad \frac{1}{4}\begin{bmatrix}1&1&1&1\\1&-1&1&-1\\1&1&-1&-1\\1&-1&-1&1\end{bmatrix}$$ |
| 4 | $$\frac{1}{4}\begin{bmatrix}1&1&1&1\\1&-1&1&-1\\j&j&-j&-j\\j&-j&-j&j\end{bmatrix}\quad\quad -\quad\quad\quad -\quad\quad\quad -$$ |

16

The subset of TPMI indices for the three coherence types are summarized in Table 7 and Table 8, where rank=r corresponds to (and is equivalent to) r layers.

TABLE 7

Total power of precoding matrix W for 2 antenna ports

| | Non-Coherent (NC) TPMIs | | Full-Coherent (FC) TPMIs | |
|---|---|---|---|---|
| Rank | TPMI indices | Total power | TPMI indices | Total power |
| 1 | 0-1 | ½ | 2-5 | 1 |
| 2 | 0 | 1 | 1-2 | 1 |

TABLE 8

Total power of precoding matrix W for 4 antenna ports

| | Non-Coherent (NC) TPMIs | | Partial-Coherent (PC) TPMIs | | Full-Coherent (FC) TPMIs | |
|---|---|---|---|---|---|---|
| Rank | TPMI indices | Total power | TPMI indices | Total power | TPMI indices | Total power |
| 1 | 0-3 | ¼ | 4-11 | ½ | 12-27 | 1 |
| 2 | 0-5 | ½ | 6-13 | 1 | 14-21 | 1 |

TABLE 8-continued

| | Total power of precoding matrix W for 4 antenna ports | | | | | |
|---|---|---|---|---|---|---|
| | Non-Coherent (NC) TPMIs | | Partial-Coherent (PC) TPMIs | | Full-Coherent (FC) TPMIs | |
| Rank | TPMI indices | Total power | TPMI indices | Total power | TPMI indices | Total power |
| 3 | 0 | $\frac{3}{4}$ | 1-2 | 1 | 3-6 | 1 |
| 4 | 0 | 1 | 1-2 | 1 | 3-4 | 1 |

The corresponding supported codebookSubsets are summarized in Table 9 and Table 10.

TABLE 9

| | TPMI indices for codebookSubsets for 2 antenna ports | |
|---|---|---|
| Rank | Non-Coherent | fullAndPartialAndNonCoherent |
| 1 | 0-1 | 0-5 |
| 2 | 0 | 0-2 |

TABLE 10

| | TPMI indices for codebookSubsets for 4 antenna ports | | |
|---|---|---|---|
| Rank | Non-Coherent | partialAndNonCoherent | fullAndPartialAndNon-Coherent |
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

The present disclosure recognizes that in up to Rel. 17 NR, for UL transmission, the 3GPP specification supports 1, 2, or 4 SRS antenna ports in one SRS resource. In more advanced UL MIMO systems (e.g., in Rel. 18 and beyond), the number of SRS antenna ports can be more than 4, e.g., 6, 8, or even 12, and 16, especially for devices such as CPE, FWA, and vehicular UEs. The codebook-based UL transmission for such devices requires enhancements, e.g., codebook for >=4 antenna ports and related signaling for efficient UL MIMO operations. This disclosure provides example embodiments for potential enhancements. In particular, it provided examples of full coherent precoders and partial coherent precoders for UL codebook for 8 antenna ports, based on the legacy (Rel. 15 DL Type I or Rel. UL 4Tx/2Tx codebooks). The scope of the disclosure is not limited to only these embodiments but includes any extensions or combinations of the proposed embodiments.

Accordingly, various embodiments of the present disclosure provide mechanisms for codebook-based UL transmission for multiple antenna ports, including UL codebook design for 8 antenna ports that can be grouped into $N_g \in \{1, 2, 4, 8\}$ groups. In one embodiment, for the full-coherent type, the Rel. 15 DL Type I codebook (all or a subset) is used to obtain full coherence (FC) precoders for the 8Tx UL codebook, and for partial-coherent, the Rel. 15 UL codebook for 4 and/or 2 antenna ports is used to obtain PC precoders for the 8Tx UL codebook. In addition, various embodiments of the present disclosure provide design principles and examples on FC and PC precoder design for the 8Tx UL codebook. Further, various embodiments of the present disclosure provide mechanisms for UL codebook design for 8 antenna ports that can be grouped into $N_g \in \{2, 4\}$ groups. Further still, various embodiments of the present disclosure provide design principles and examples on PC precoder design for the 8Tx UL codebook based on a legacy (Rel. 15) NR 4Tx UL codebook. In addition, various embodiments of the present disclosure provide mechanisms to reduce codebook size and/or signaling overhead.

In one example, the present disclosure assumes all antenna ports of the UE belong to a single antenna panel (i.e., they are co-located, for example, at one plane, side, or edge of the UE). We further assume that $N_1$ and $N_2$ are the number of antenna ports with the same polarization in the first and second dimensions, respectively. For 2D antenna port layouts, we have $N_1 > 1$, $N_2 > 1$, and for ID antenna port layouts, we either have $N_1 > 1$ and $N_2 = 1$ or $N_2 > 1$ and $N_1 = 1$. In the rest of the disclosure, 1D antenna port layouts with $N_1 > 1$ and $N_2 = 1$ is considered. The disclosure, however, is applicable to the other ID port layouts with $N_2 > 1$ and $N_1 = 1$. Also, in the rest of the disclosure, we assume that $N_1 \geq N_2$. The disclosure, however, is applicable to the case when $N_1 < N_2$, and the embodiments for $N_1 > N_2$ applies to the case $N_1 < N_2$ by swapping/switching $(N_1, N_2)$ with $(N_2, N_1)$. For a (single-polarized) co-polarized antenna port layout, the total number of antenna ports is $N_1 N_2$ and for a dual-polarized antenna port layout, the total number of antenna ports is $2N_1 N_2$. An illustration of antenna port layouts for {2, 4, 6, 8, 12} antenna ports at UE is shown in Table 11.

FIG. 7 illustrates an example antenna port layout 700 according to embodiments of the present disclosure. The embodiment of the antenna port layout 700 illustrated in FIG. 7 is for illustration only. FIG. 7 does not limit the scope of this disclosure to any particular implementation of the antenna port layout 700.

Let s denote the number of antenna polarizations (or groups of antenna ports with the same polarization). Then, for co-polarized antenna ports, s=1, and for dual- or cross (X)-polarized antenna ports s=2. So, the total number of antenna ports $P = s N_1 N_2$. In one example, the antenna ports at the UE refers to SRS antenna ports (either in one SRS resource or across multiple SRS resources).

In one embodiment, the UL codebook W for P antenna ports at the UE is based on pre-coding vectors which are according to one of the two alternatives in Table 11 depending on whether the antenna ports are co-polarized or cross-/dual-polarized.

TABLE 11

| | Pre-coding vectors | |
|---|---|---|
| | Co-pol | Dual-pol |
| | $v_{l,m} = \dfrac{v_{l,m}}{\sqrt{N_1 N_2}}$ | $v_{l,m,n} = \dfrac{1}{\sqrt{2N_1 N_2}} \begin{bmatrix} v_{l,m} \\ \varphi_n v_{l,m} \end{bmatrix}$ |

Here, $v_{l,m}$ is a Kronecker product ($\otimes$) of vectors $w_l$ and $u_m$ of lengths $N_1$ and $N_2$, respectively. In one example, $w_l$ and $u_m$ are oversampled DFT vectors, i.e., $$w_l = \left[\ 1\ \ e^{j\frac{2\pi l}{O_1 N_1}}\ \ e^{j\frac{4\pi l}{O_1 N_1}}\ \ \ldots\ \ e^{j\frac{2\pi l(N_1-1)}{O_1 N_1}}\right]^T$$

$$u_m = \begin{cases} \left[\ 1\ \ e^{j\frac{2\pi m}{O_2 N_2}}\ \ \ldots\ \ e^{j\frac{2\pi m(N_2-1)}{O_2 N_2}}\right] & N_2 > 1 \\ 1 & N_2 = 1 \end{cases}$$

where $O_1$ and $O_2$ are oversampling factors in two dimensions, and $v_{l,m}$ is then given by $$v_{l,m} = w_l \otimes u_m = \left[\; u_m \quad e^{j\frac{2\pi l}{O_1 N_1}} u_m \quad \ldots \quad e^{j\frac{2\pi l(N_1-1)}{O_1 N_1}} u_m \;\right]^T$$

In one example, both $O_1$, $O_2 \in \{2, 4, 8\}$. In one example, $O_1$ and $O_2$ can take the same values as Rel. 15 NR Type I codebook (cf. 5.2.2.1, TS 38.214), i.e., $(O_1, O_2) = (4,4)$ when $N_2 > 1$, and, i.e., $(O_1, O_2) = (4, 1)$ when $N_2 = 1$. Alternatively, they take different values from the Rel. 15 Type I NR codebook, for example, $(O_1, O_2) = (2, 2)$ when $N_2 > 1$, and, i.e., $(O_1, O_2) = (2, 1)$ when $N_2 = 1$. In one example, $O_1$ and $O_2$ is configurable (e.g., via higher layer).

The quantity $\varphi_n$ is a co-phase for dual-polarized antenna port layouts. In one example, $\varphi_n = e^{j\pi n/2}$, where $n \in \{0, 1, 2, 3\}$ implying that $\varphi_n$ belongs to QPSK alphabet $\{1, j, -1, -j\}$.

In one example, the values of $N_1$ and $N_2$ are configured, e.g., with the higher layer parameter n1-n2-ul. The supported configurations of $(N_1, N_2)$ for a given number of antenna ports (P) is given in Table 12.

TABLE 12

| Configurations of $(N_1, N_2)$ | | |
|---|---|---|
| Number of antenna ports, P | Dual-pol $(N_1, N_2)$ | Co-pol $(N_1, N_2)$ |
| 2 | (1, 1) | (2, 1) |
| 4 | (2, 1) | (2, 2), (4, 1) |
| 6 | (3, 1) | (3, 2), (6, 1) |
| 8 | (2, 2), (4, 1) | (4, 2), (8, 1) |
| 12 | (3, 2), (6, 1) | (4, 3), (6, 2), (12, 1) |
| 16 | (4, 2), (8, 1) | (8, 2), (4, 4), (16, 1) |

In one example, the values of $N_1$ and $N_2$ are fixed for a given number of antenna ports. For example, $(N_1, N_2) = (P, 1)$ for co-pol and $$\left(\frac{P}{2}, 1\right)$$

for dual-pol antenna. In one example, only one $(N_1, N_2)$ is supported for each value of P, where the supported $(N_1, N_2)$ is one of pairs in Table 12.

The dual-polarized antenna layout is assumed in the rest of the disclosure. The number of antenna ports is assumed to be P=8 in the rest of the disclosure.

In one example, P antenna ports can be divided into multiple groups. Let $N_g$ be the number of antenna port groups. When each group comprises the same number of antenna ports, then each groups has the antenna layout with $(N_1, N_2)$ value as shown in Table 13.

TABLE 13

| $N_g$ | $(N_1, N_2)$ |
|---|---|
| 1 | (4, 1), (2, 2) |
| 2 | (2, 1) |
| 4 | (1, 1) |
| 8 | Not applicable |

In one example, $N_g = 1$ corresponds to a single antenna panel. In one example, $N_g = 1$ corresponds to a full coherent (FC) UE or FC antenna layout.

In one example, $N_g = 2$ corresponds to two antenna panels. In one example, $N_g = 2$ corresponds to a partial coherent (PC) UE or PC antenna layout.

In one example, $N_g = 4$ corresponds to four antenna panels. In one example, $N_g = 4$ corresponds to a partial coherent (PC) UE or PC antenna layout.

In one example, $N_g = 8$ corresponds to eight antenna panels. In one example, $N_g = 8$ corresponds to a non-coherent (NC) UE or NC antenna layout.

In one embodiment, the UL codebook includes full-coherent (FC) precoding matrices, and a FC precoding matrix can be defined as a matrix with all non-zero elements/entries. Similar to Rel. 15 UL codebook for 4 antenna ports, the UL codebook for >4 antenna ports (e.g., 8 antenna ports) either includes precoding matrices from the DL Type I codebook, or are based on the DL Type I codebook framework.

In one example, the included FC precoding matrices are determined using the same values of $(i_{1,1}, i_{1,2})$ for a subset of supported rank values, and can change from one subset of rank values to another subset of rank values.

For example, when a first subset of rank values is $\{1, 2\}$, the supported values of $(i_{1,1}, i_{1,2})$ can be from a set S1.

For example, when a first subset of rank values is $\{3, 4\}$, the supported values of $(i_{1,1}, i_{1,2})$ can be from a set S2.

For example, when a first subset of rank values is $\{5,6\}$, the supported values of $(i_{1,1}, i_{1,2})$ can be from a set S3.

For example, when a first subset of rank values is $\{7,8\}$, the supported values of $(i_{1,1}, i_{1,2})$ can be from a set S4.

In one example, S1, . . . , S4 are different (cf. Table 14). In one example, S1, . . . , S3 are different, and S3=S4 (cf. Table 15).

TABLE 14

| FC precoding matrices based on DL Type I codebook indices | | | | | |
|---|---|---|---|---|---|
| | 8 ports: $(N_1, N_2) = (4, 1)$ | | 8 ports: $(N_1, N_2) = (2, 2)$ | | |
| Rank | $O_1$ | $i_{1,1}$ | $(O_1, O_2)$ | $i_{1,1}$ | $i_{1,2}$ |
| 1 | 1 | 0, 1, 2, 3 | (2, 2) | 0, 1, 2, 3 | 0, 1, 2, 3 |
| 2 | 1 | 0, 1, 2, 3 | (2, 2) | 0, 1, 2, 3 | 0, 1, 2, 3 |
| 3 | 1 | 0, 1, 2 | (2, 2) | 0, 1, 2 | 0, 1, 2 |
| 4 | 1 | 0, 1, 2 | (2, 2) | 0, 1, 2 | 0, 1, 2 |
| 5 | 1 | 0, 2 or 0, 1 | (2, 2) | 0, 2 or 0, 1 | 0, 2 or 0, 1 |
| 6 | 1 | 0, 2 or 0, 1 | (2, 2) | 0, 2 or 0, 1 | 0, 2 or 0, 1 |
| 7 | 1 | 0 | (2, 2) | 0 | 0 |
| 8 | 1 | 0 | (2, 2) | 0 | 0 |

TABLE 15

| FC precoding matrices based on DL Type I codebook indices | | | | | |
|---|---|---|---|---|---|
| | 8 ports: $(N_1, N_2) = (4, 1)$ | | 8 ports: $(N_1, N_2) = (2, 2)$ | | |
| Rank | $O_1$ | $i_{1,1}$ | $(O_1, O_2)$ | $i_{1,1}$ | $i_{1,2}$ |
| 1 | 1 | 0, 1, 2, 3 | (2, 2) | 0, 1, 2, 3 | 0, 1, 2, 3 |
| 2 | 1 | 0, 1, 2, 3 | (2, 2) | 0, 1, 2, 3 | 0, 1, 2, 3 |
| 3 | 1 | 0, 2 or 0, 1 | (2, 2) | 0, 2 or 0, 1 | 0, 2 or 0, 1 |
| 4 | 1 | 0, 2 or 0, 1 | (2, 2) | 0, 2 or 0, 1 | 0, 2 or 0, 1 |
| 5 | 1 | 0 | (2, 2) | 0 | 0 |
| 6 | 1 | 0 | (2, 2) | 0 | 0 |
| 7 | 1 | 0 | (2, 2) | 0 | 0 |
| 8 | 1 | 0 | (2, 2) | 0 | 0 |

In one example, the included FC precoding matrices are determined based on the values of $(i_{1,1}, i_{1,2})$, where $i_{1,1} \in \{0, 1, \ldots, O_1 N_1\}$ and $i_{1,2} \in \{0, 1, \ldots, O_2 N_2\}$, where multiple $(O_1, O_2)$ are supported.

In one example, one of the supported $(O_1, O_2)$ is configured to the UE, e.g., via RRC, or indicated via MAC CE, or via DCI (e.g., UL-DCI).

In one example, the UE via its capability reporting reports one or multiple values of $(O_1, O_2)$ that it can support, and the UE then can be configured with one $(O_1, O_2)$ value subject to the UE capability reporting. In one example, the UE may not support $(O_1, O_2)$ such that the codebook comprises 8PSK or 16PSK entries, i.e., can only support $(O_1, O_2)$ such that the codebook comprises QPSK or BSK entries.

In one example, the included FC precoding matrices are determined such that the number of FC TPMIs=2 times the number of FC TPMIs in Rel. 15 4Tx UL codebook.

In one embodiment, the UL codebook includes partial-coherent (PC) precoding matrices, and a PC precoding matrix can be defined as a matrix whose each column comprises both zero and non-zero entries, e.g., at least two non-zero and remaining zero elements/entries in each column.

In one embodiment, the UE reports a UE capability information about its support for the UL codebook for 8 antenna ports. The UE is configured with an UL codebook subject to (based on) the UE capability information.

In one example, the UE capability information includes information about the value of $N_g$, where the value of $N_g$ can be from $\{1, 2, 4\}$ or $\{1, 2, 4, 8\}$.

In one example, only one value of $N_g$ can be reported by the UE via the UE capability information.

In one example, one or more than value of $N_g$ can be reported by the UE via the UE capability information.

When the UE reports one value, it can be from $\{1, 2, 4\}$ or $\{1, 2, 4, 8\}$. When the UE reports multiple values, at least one of the following examples is used.

In one example, when the UE reports multiple values, they are restricted to be only $N_g$=2, 4.

In one example, when the UE reports multiple values, they are restricted to be only $N_g$=1, 2.

In one example, when the UE reports multiple values, they are restricted to be only $N_g$=1,4.

In one example, when the UE reports multiple values, they are restricted to be only $N_g$=1, 2, 4.

In one example, the UE can report one or multiple values from $\{1, 2, 4\}$ or $\{1, 2, 4, 8\}$.

In one example, when the UE reports $N_g$=1, it also reports one or multiple values of $(N_1, N_2)$.

In one example, the UE can only report one value of $(N_1, N_2)$, either (2, 2) or (4, 1).

In one example, the UE can only report one or two values value of $(N_1, N_2)$, i.e., either (2, 2) or (4, 1), both (2, 2) and (4, 1).

In one example, the UE capability information includes information about coherence type.

In one example, when the UE reports a coherence type=full-coherent or full-coherence In one example, the UE capability information includes coherence type=FC only.

In one example, the UE capability information includes coherence type=FC and $(N_1, N_2)$ value from $\{(2, 2), (4, 1)\}$.

In one example, the UE reports only one $(N_1, N_2)$ value, either (2, 2) or (4, 1).

In one example, the UE can either report one $(N_1, N_2)$ value, (2, 2) or (4, 1), or two values for $(N_1, N_2)$, i.e., both of (2, 2) and (4, 1).

In one example, when the UE reports a coherence type=partial-coherent or partial-coherence In one example, the UE capability information includes coherence type=PC only. In this case, the value of $N_g$ (number of PC antenna groups) can be fixed, e.g., 2 or 4, or configured (e.g., via RRC).

In one example, the UE capability information includes coherence type=PC1 or PC2, where PC1 implies $N_g$=2 PC antenna groups, and PC2 implies $N_g$=4 PC antenna groups.

In one example, the UE capability information includes coherence type=PC and (N1,N2)=(2, 1) or (1, 1)

In one example, the UE can only report one value of $(N_1, N_2)$, either (2, 1) or (1, 1).

In one example, the UE can only report one or two values value of $(N_1, N_2)$, i.e., either (2, 1) or (1, 1), both (2, 1) and (1, 1).

In one example, the UE capability information includes coherence type and (N1,N2), where coherence type=PC1 or PC2, and (N1,N2)=(2, 1) or (1, 1). Here, PC1 implies $N_g$=2 PC antenna groups, and PC2 implies $N_g$=4 PC antenna groups, In one example, the UE can only report one value of $(N_1, N_2)$, either (2, 1) or (1, 1).

In one example, the UE can only report one or two values value of $(N_1, N_2)$, i.e., either (2, 1) or (1, 1), both (2, 1) and (1, 1).

In one example, when the UE reports a coherence type=non-coherent or non-coherence.

In one example, the UE capability information includes coherence type=NC only.

In one example, the UE capability information includes information about coherence type and $N_g$.

In one example, when the UE reports a coherence type=full-coherent or full-coherence.

In one example, the UE capability information includes coherence type=FC and $N_g$=1.

In one example, the UE capability information includes coherence type=FC, $N_g$=1 (for FC precoders) and one value $N_g$>1, e.g., $N_g$=2 or 4 (for PC precoders) or 8 (for NC precoders).

In one example, the UE capability information includes coherence type=FC, $N_g$=1 (for FC precoders) and one value $N_g$>1 (e.g., $N_g$=2 or 4 or 8) or two $N_g$>1 values (e.g., $\{2, 4\}$) (for PC precoders) or three $N_g$>1 values (e.g., $\{2, 4, 8\}$) (for PC and NC precoders).

In one example, the UE capability information includes coherence type=FC, $N_g$=1 (for FC precoders), one value $N_g$>1, e.g., $N_g$=2 or 4 (for PC precoders), and also includes $(N_1, N_2)$ value from $\{(2, 2), (4, 1)\}$.

In one example, the UE reports only one $(N_1, N_2)$ value, either (2, 2) or (4, 1).

In one example, the UE can either report one $(N_1, N_2)$ value, (2, 2) or (4, 1), or two values for $(N_1, N_2)$, i.e., both of (2, 2) and (4, 1).

In one example, the UE capability information includes coherence type=FC, $N_g$=1 (for FC precoders), one value $N_g$>1 (e.g., $N_g$=2 or 4) or two $N_g$>1 values (e.g., $\{2, 4\}$) (for PC precoders), and also includes $(N_1, N_2)$ value from $\{(2, 2), (4, 1)\}$.

In one example, the UE reports only one $(N_1, N_2)$ value, either (2, 2) or (4, 1).

In one example, the UE can either report one $(N_1, N_2)$ value, (2, 2) or (4, 1), or two values for $(N_1, N_2)$, i.e., both of (2, 2) and (4, 1).

In one example, when the UE reports a coherence type=partial-coherent or partial-coherence In one example, the UE capability information includes coherence type=PC and $N_g$=2 or 4.

In one example, the UE reports only one $N_g$ value, e.g., 2 or 4.

In one example, the UE can either report one $N_g$ value, e.g., 2 or 4, or two values for $N_g$, i.e., both 2 and 4.

In one example, the UE capability information includes coherence type=PC and $(N_g, N_1, N_2)$=(2, 2, 1) or (4, 1, 1).

In one example, the UE reports only one $(N_g, N_1, N_2)$ value, e.g., (2, 2, 1) or (4, 1, 1).

In one example, the UE can either report one $(N_g, N_1, N_2)$ value, e.g., (2, 2, 1) or (4, 1, 1), or two values for $(N_g, N_1, N_2)$, i.e., both (2, 2, 1) and (4, 1, 1).

In one example, the UE capability information includes coherence type=PC and $N_g$=2 or 4 or 8.

In one example, the UE reports only one $N_g$ value, e.g., 2 or 4 or 8.

In one example, the UE can either report one $N_g$ value, e.g., 2 or 4 or 8, or two values for {2, 4, 8}.

In one example, the UE can either report one $N_g$ value, e.g., 2 or 4 or 8, or two values for {2, 4, 8}, or three values {2.4.8}.

In one example, the UE capability information includes coherence type=PC and $(N_g, N_1, N_2)$=(2, 2, 1) or (4, 1, 1) or (8, -, -).

In one example, the UE reports only one $(N_g, N_1, N_2)$ value, e.g., (2, 2, 1) or (4, 1, 1) or (8, -, -).

In one example, the UE can either report one $(N_g, N_1, N_2)$ value, e.g., (2, 2, 1) or (4, 1, 1), or two values for $(N_g, N_1, N_2)$, from {(2, 2, 1), (4, 1, 1), (8, -, -)}.

In one example, the UE can either report one $(N_g, N_1, N_2)$ value, e.g., (2, 2, 1) or (4, 1, 1), or two values for $(N_g, N_1, N_2)$, from {(2, 2, 1), (4, 1, 1), (8, -, -)} or three value {(2, 2, 1), (4, 1, 1), (8, -, -)}.

In one example, when the UE reports a coherence type=non-coherent or non-coherence.

In one example, the UE capability information includes coherence type=NC and $N_g$=8.

TABLE 16

| Number of coherence types | codebookSubset | $N_g =$ 1 | $N_g =$ 2 | $N_g =$ 4 | $N_g =$ 8 |
|---|---|---|---|---|---|
| 1 | S1 | FC | | | |
| | S2 | | PC1 | | |
| | S3 | | | PC2 | |
| | S4 | | | | NC |
| 2 | S5 | FC | PC1 | | |
| | S6 | FC | | PC2 | |
| | S7 | FC | | | NC |
| | S8 | | PC1 | PC2 | |
| | S9 | | PC1 | | NC |
| | S10 | | | PC2 | NC |
| 3 | S11 | FC | PC1 | PC2 | |
| | S12 | FC | PC1 | | NC |
| | S13 | FC | | PC2 | NC |
| | S14 | | PC1 | PC2 | NC |
| 3 | S15 | FC | PC1 | PC2 | NC |

In one embodiment, the UE is configured, e.g., via higher layer, an UL codebook for 8 antenna ports subject to the UE capability information provided by the UE, the details of the UE capability information is as described in earlier.

In one example, a higher layer RRC parameter similar to the legacy (Rel. 15) parameter codebookSubset, is used for this purpose. Let codebookSubset-r18 be the parameter for codebook subsets for 8Tx codebook. In the following, a PC UE with Ng=2 is referred to as PC1, and a PC UE with Ng=4 is referred to as PC2. An example of all possible codebook subsets is shown in Table 16. In one example, a FC UE can support or configured with a codebook subset according to any of subsets S1-S15. In one example, a PC UE can support or configured with a codebook subset according to any subset from {S2, S3, S4, S8, S9, S10, S14}. In one example, a PC UE supporting only Ng=2 can support or configured with a codebook subset according to any subset from {S2, S3, S4, S8, S9, S10, S14}. In one example, a PC UE supporting only Ng=4 can support or configured with a codebook subset according to any subset from {S3, S4, S10}. In one example, a NC UE can support or configured with a codebook subset according to only S4.

In one example, the UE can be configured with (via codebookSubset-r18) an UL codebook which includes precoding matrices of only one coherence type (e.g., only one of FC, PC, and NC). Note that this example applies to all FC, PC, and NC UEs.

In one example, for a FC UE, the UL codebook can be configured to be subset S1=FC.

In one example, for a FC UE, the UL codebook can be configured to be either subset S1=FC or S2=PC1.

In one example, for a FC UE, the UL codebook can be configured to be either subset S1=FC or S2=PC2.

In one example, for a FC UE, the UL codebook can be configured to be either subset S1=FC or S2=PC1 or S3=PC2.

In one example, for a FC UE, the UL codebook can be configured to be either subset S1=FC or S4=NC.

In one example, for a FC UE, the UL codebook can be configured to be either subset S1=FC or S2=PC1 or S4=NC.

In one example, for a FC UE, the UL codebook can be configured to be either subset S1=FC or S3=PC2 or S4=NC.

In one example, for a FC UE, the UL codebook can be configured to be either subset S1=FC or S2=PC1 or S3=PC2, or S4=NC.

In one example, for a PC UE, the UL codebook can be configured to be either subset S2=PC1.

In one example, for a PC UE, the UL codebook can be configured to be either subset S3=PC2.

In one example, for a PC UE, the UL codebook can be configured to be either subset S2=PC1 or S3=PC2, In one example, for a PC UE, the UL codebook can be configured to be either subset S2=PC1 or S4=NC.

In one example, for a PC UE, the UL codebook can be configured to be either subset S3=PC2 or S4=NC. In one example, for a PC UE, the UL codebook can be configured to be either subset S2=PC1 or S3=PC2, or S4=NC.

In one example, for a NC UE, the UL codebook can be configured to be S4=NC.

In one example, for a FC UE, if the UE supports multiple (N1,N2) values, e.g., (4, 1) and (2, 2), then the UE can also be configured with one value (N1,N2), e.g., (4, 1) or (2, 2).

In one example, for a PC UE, if the UE supports multiple (N1,N2) values, e.g., (2, 1) and (1, 1), then the UE can also be configured with one (N1,N2), e.g., (2, 1) or (1, 1).

In one example, for a PC UE, if the UE supports multiple $N_g$ values, e.g., 2 and 4, then the UE can also be configured with one $N_g$ value, e.g., 2 or 4.

In one example, the UE can be configured with (via codebookSubset-r18) an UL codebook which includes precoding matrices of two coherence types (e.g., two of FC, PC, and NC). Note that this applies to FC or PC UEs, but not to NC UEs (since a NC UE can't support FC/PC precoders).

In one example, for a FC UE, the UL codebook can be configured to be subset S5=FC and PC1 (including both FC and PC2 precoding matrices).

In one example, for a FC UE, the UL codebook can be configured to be subset S6=FC and PC2.

In one example, for a FC UE, the UL codebook can be configured to be subset S7=FC and NC.

In one example, for a PC UE, the UL codebook can be configured to be subset S8=PC1 and PC2.

In one example, for a PC UE, the UL codebook can be configured to be subset S9=PC1 and NC.

In one example, for a PC UE, the UL codebook can be configured to be subset S10=PC2 and NC.

In one example, the UE can be configured with (via codebookSubset-r18) an UL codebook which includes precoding matrices of three coherence types (e.g., two of FC, PC, and NC). Note that this applies to FC or PC UEs, but not to NC UEs (since a NC UE can't support FC/PC precoders).

In one example, for a FC UE, the UL codebook can be configured to be subset S11=FC, PC1, and PC2 (including FC, PC1, and PC2 precoding matrices).

In one example, for a FC UE, the UL codebook can be configured to be subset S12=FC, PC1, and NC.

In one example, for a FC UE, the UL codebook can be configured to be subset S13=FC, PC2, and NC.

In one example, for a PC UE, the UL codebook can be configured to be subset S14=PC1, PC2, and NC.

In one example, for a FC UE, the UL codebook can be configured to be subset S15=FC, PC1, PC2, and NC.

In one example, for a FC UE, the UE can be configured with (via codebookSubset-r18) an UL codebook which includes one of the two PC subsets (PC1 or PC2), not both, i.e., codebook subset can be S5, or S6, or S12, or S13, but can't be S8, S11, S14, S15.

In one example, a FC UE can support both PC1 and PC2 (Ng=2 and Ng=4). So, the UE can support Ng={1, 2, 4} or {1, 2, 4, 8}. The UE then can be configured with a codebook subset such that Ng is from {1,x} or {1,x,8}, where x is configured, x=2 or 4 or {2, 4}. The FC UE reports via capability which one of the two PC (Ng=2, 4). Therefore, {1,x} or {1,x,8}, where x is up to UE capability. The FC UE reports via capability which one of the two PC or both of the two PC (Ng=2, 4).

In one example, for a PC UE, the UE can be configured with (via codebookSubset-r18) an UL codebook which includes one of two PC subsets (PC1 or PC2) corresponding to Ng=2 or Ng=4, not both, i.e., codebook subset can be S2, or S3, or S9, or S10, but can't be S8, or S14.

In one example, a PC UE supporting Ng=2 doesn't support a codebook subset precoders for Ng=4 or Ng={4, 8}. Hence, it can only support S2 or S4, or S9.

In one example, a PC UE supporting Ng=2 can also support a codebook subset precoders for Ng=4 or Ng={4, 8}. Hence, it can only support S2, S3, S4, S8, S9, S10, S14.

In one example, a PC UE supporting Ng=2 reports via UE capability whether it also supports Ng=4 precoders or codebooksubset.

In one example, a PC UE supporting Ng=4 doesn't support a codebook subset precoders for Ng=8. Hence, it can only support S3.

In one example, a PC UE supporting Ng=4 can also support a codebook subset precoders for Ng=8. Hence, it can only support S3, S4, S10.

In one example, a PC UE supporting Ng=4 reports via UE capability whether it also supports Ng=8 precoders or codebooksubset.

In one example, the codebookSubset can only include at most two coherence types. In one example, FC, or PC, or PC1, or PC2, or NC or, FC+NC, or PC+NC or PC1+NC, or PC2+NC (i.e., S1, S2, S3, S4, S5, S6, S7, S8, S9, S10).

In one example, the codebookSubset can only be configured from one for the following five subsets.

S15 with FC1: FC1+PC1+PC2+NC, where FC1 corresponds to (N1,N2)=(4, 1)

S15 with FC2: FC2+PC1+PC2+NC, where FC1 corresponds to (N1,N2)=(2, 2)

S14: PC1+PC2+NC

S10: PC2+NC

S4: NC

In one example, the following codebooks are supported, hence can be configured depending on UE coherence capability and antenna structures.

A UE with FC1 can support a total of 4 codebook subsets (S15 with FC1, or S14, or S10, or S4).

A UE with FC2 can support a total of 4 codebook subsets (S15 with FC2, or S14, or S10, or S4).

A UE with PC1 can support a total of 3 codebook subsets (S14, or S10, or S4).

A UE with PC2 can support a total of 2 codebook subsets (S10, or S4).

A UE with NC can support a total of 1 codebook subset (S4).

In one example, the following codebooks are supported, hence can be configured depending on UE coherence capability and antenna structures.

A UE with FC1 can support a total of 3 (S12 with FC1, or S13 with FC1, or S9, or S10)

A UE with FC2 can support a total of 3 (S12 with FC2, or S13 with FC2, or S9, or S10)

A UE with PC1 can support a total of 2 (S9 or S4)

A UE with PC2 can support a total of 2 (S10 or S4)

NC support 1 (S4)

In one embodiment, a FC UE (or a UE reporting being capable FC UL transmission) with 8 antenna ports can have antenna structure with $N_g$=1, and $(N_1, N_2)$=(2, 2) or (4, 1), as described above. However, only $(N_1, N_2)$=(2, 2) is supported, i.e., $(N_1, N_2)$=(4, 1) is not supported, which means that the NR specification will not specify the codebook and UE behavior for the case $(N_1, N_2)$=(4, 1). This implies that there is only one type of FC precoding matrices included in the 8Tx UL codebook for 8 antenna ports, and that corresponds to the precoding matrices for $(N_1, N_2)$=(2, 2).

In one example, the one type of FC precoding matrices corresponds to $(N_1, N_2)$=(2, 2), and 8Tx UL codebook includes FC precoding matrices for $(N_1, N_2)$=(2, 2) that are determined based on (CB1) the Rel. 15 DL Type I codebook with $(N_1, N_2)$=(2, 2), and there is no precoding matrices for $(N_1, N_2)$=(4, 1). In this case, a FC UE can only report (e.g., via UE capability) the support for $(N_1, N_2)$=(2, 2), and can't or doesn't report the support for $(N_1, N_2)$=(4, 1).

In one example, the one type of FC precoding matrices corresponds to $(N_1, N_2)$=(2, 2), and 8Tx UL codebook includes FC precoding matrices for $(N_1, N_2)$=(2, 2) that are determined based on (CB2) the Rel-15 NR UL 2Tx/4Tx codebooks and/or 8×1 antenna selection vector(s), and there is no precoding matrices for $(N_1, N_2)$=(4, 1). In this case, a FC UE can only report (e.g., via UE capability) the support for $(N_1, N_2)$=(2, 2), and can't or doesn't report the support for $(N_1, N_2)$=(4, 1).

In one embodiment, a FC UE (or a UE reporting being capable FC UL transmission) with 8 antenna ports can have antenna structure with $N_g$=1, and $(N_1, N_2)$=(2, 2) or (4, 1), as described above. Both $(N_1, N_2)$=(2, 2) and (4, 1) are supported. However, there is only one type of FC precoding matrices included in the 8Tx UL codebook for 8 antenna ports, and this is for both $(N_1, N_2)$=(2, 2) and (4, 1).

In one example, the one type of FC precoding matrices corresponds to $(N_1, N_2)=(2, 2)$, and the 8Tx UL codebook includes FC precoding matrices for $(N_1, N_2)=(2, 2)$ that are determined based on (CB1) the Rel. 15 DL Type I codebook with $(N_1, N_2)=(2, 2)$, and there is no precoding matrices for $(N_1, N_2)=(4, 1)$. In this case, a FC UE can only report (e.g., via UE capability) the support for $(N_1, N_2)=(2, 2)$, and can't or doesn't report the support for $(N_1, N_2)=(4, 1)$.

In one example, the one type of FC precoding matrices corresponds to $(N_1, N_2)=(2, 2)$, and 8Tx UL codebook includes FC precoding matrices for $(N_1, N_2)=(2, 2)$ that are determined based on (CB2) the Rel-15 NR UL 2Tx/4Tx codebooks and/or 8×1 antenna selection vector(s), and there is no precoding matrices for $(N_1, N_2)=(4, 1)$. In this case, a FC UE can only report (e.g., via UE capability) the support for $(N_1, N_2)=(2, 2)$, and can't or doesn't report the support for $(N_1, N_2)=(4, 1)$.

This is regardless of whether the UE reports $(N_1, N_2)=(2, 2)$ or $(4, 1)$, i.e., even when the UE reports $(N_1, N_2)=(4, 1)$, the configured 8Tx UL codebook includes FC precoding matrices for the case of $(N_1, N_2)=(2, 2)$.

Likewise, this is regardless of whether the UE is configured with $(N_1, N_2)=(2, 2)$ or $(4, 1)$, i.e., even when the UE is configured with $(N_1, N_2)=(4, 1)$, the configured 8Tx UL codebook includes FC precoding matrices for the case of $(N_1, N_2)=(2, 2)$.

In one embodiment, a FC UE (or a UE reporting being capable FC UL transmission) with 8 antenna ports can have antenna structure with $N_g=1$, and $(N_1, N_2)=(2, 2)$ or $(4, 1)$, as described above. Both $(N_1, N_2)=(2, 2)$ and $(4, 1)$ are supported. However, there is only one type of FC precoding matrices included in the 8Tx UL codebook for 8 antenna ports, and this is for both $(N_1, N_2)=(2, 2)$ and $(4, 1)$. The only one type of FC precoding matrices corresponds to the 8Tx UL codebook that includes FC precoding matrices determined based on a combination or mixture of (CB1) and (CB2).

In one example, (CB1) is based on the Rel. 15 DL Type I codebook with $(N_1, N_2)=(2, 2)$, and (CB2) is based on the NR Rel-15 UL 2TX/4TX codebooks and/or 8×1 antenna selection vector(s) for $(N_1, N_2)=(4, 1)$.

In one example, (CB1) is based on the Rel. 15 DL Type I codebook with $(N_1, N_2)=(4, 1)$, and (CB2) is based on the NR Rel-15 UL 2TX/4TX codebooks and/or 8×1 antenna selection vector(s) for $(N_1, N_2)=(4, 1)$.

In one example, (CB1) is based on the Rel. 15 DL Type I codebook with $(N_1, N_2)=(2, 2)$, and (CB2) is based on the NR Rel-15 UL 2TX/4TX codebooks and/or 8×1 antenna selection vector(s) for $(N_1, N_2)=(2, 2)$.

In one example, (CB1) is based on the Rel. 15 DL Type I codebook with $(N_1, N_2)=(4, 1)$, and (CB2) is based on the NR Rel-15 UL 2TX/4TX codebooks and/or 8×1 antenna selection vector(s) for $(N_1, N_2)=(2, 2)$.

In one example, for the case of one or more examples herein, the CB1 portion (subset) of the FC precoding matrices can be configured only when the UE reports (e.g., via UE capability, separate or joint) that it can support the CB1 portion (subset). That is, if the UE can't support the CB1 portion, then only CB2 portion (subset) of the FC precoding matrices can be configured in the UL codebook. In one example, this UE capability reporting is applicable to the case when $(N_1, N_2)=(4, 1)$.

In one example, when $(N_1, N_2)=(2, 2)$, only one of CB1 or CB2 portion of the FC precoding matrices corresponding to $(N_1, N_2)=(2, 2)$ can be configured in the UL codebook.

This is regardless of whether the UE reports $(N_1, N_2)=(2, 2)$ or $(4, 1)$, i.e., even when the UE reports $(N_1, N_2)=(4, 1)$, the configured 8Tx UL codebook includes FC precoding matrices for the case of $(N_1, N_2)=(2, 2)$.

Likewise, this is regardless of whether the UE is configured with $(N_1, N_2)=(2, 2)$ or $(4, 1)$, i.e., even when the UE is configured with $(N_1, N_2)=(4, 1)$, the configured 8Tx UL codebook includes FC precoding matrices for the case of $(N_1, N_2)=(2, 2)$.

In one embodiment, a FC UE (or a UE reporting being capable FC UL transmission) with 8 antenna ports can have antenna structure with $N_g=1$, and $(N_1, N_2)=(2, 2)$ or $(4, 1)$, as described above. Both $(N_1, N_2)=(2, 2)$ and $(4, 1)$ are supported, and there is two types (CB1 and CB2) of FC precoding matrices included in the 8Tx UL codebook for 8 antenna ports, one for each of $(N_1, N_2)=(2, 2)$ and $(4, 1)$, where (CB1) is based on the Rel. 15 DL Type I codebook with $(N_1, N_2)=(2, 2)$, and (CB2) is based on the Rel. 15 DL Type I codebook with $(N_1, N_2)=(4, 1)$.

In one example, the UE reports (e.g., via UE capability) whether one of (CB1) and (CB2), and also one of $(N_1, N_2)=(2, 2)$ and $(4, 1)$. The UE is then configured with the UL codebook, CB1 or CB2, depending on the UE capability reporting.

In one example, for $(N_1, N_2)=(2, 2)$, CB1 is used as the UL codebook, and for $(N_1, N_2)=(4, 1)$, the UE reports (e.g., via UE capability) whether it supports (CB2). If the UE supports, then the UE can be configured with the UL codebook, CB2; otherwise, the UE is configured with the UL codebook CB1.

In one example, for $(N_1, N_2)=(2, 2)$, CB1 is used as the UL codebook, and for $(N_1, N_2)=(4, 1)$, the UE reports (e.g., via UE capability) whether it supports (CB1 or CB2). The UE is then configured with the UL codebook, CB1 or CB2, depending on the UE capability reporting.

In one embodiment, a FC UE (or a UE reporting being capable FC UL transmission) with 8 antenna ports can have antenna structure with $N_g=1$, and $(N_1, N_2)=(2, 2)$ or $(4, 1)$, as described above. Both $(N_1, N_2)=(2, 2)$ and $(4, 1)$ are supported, and there are three types (CB1, CB2 and CB3) of FC precoding matrices included in the 8Tx UL codebook for 8 antenna ports, where (CB1) is based on the Rel. 15 DL Type I codebook with $(N_1, N_2)=(2, 2)$, (CB2) is based on the Rel. 15 DL Type I codebook with $(N_1, N_2)=(4, 1)$, and (CB3) is based on NR Rel-15 UL 2TX/4TX codebooks and/or 8×1 antenna selection vector(s) for $(N_1, N_2)=(4, 1)$.

In one example, for $(N_1, N_2)=(2, 2)$, CB1 is used as the UL codebook, and for $(N_1, N_2)=(4, 1)$, the UE reports (e.g., via UE capability) whether it supports (CB2). If the UE supports, then the UE can be configured with the UL codebook, CB2; otherwise, the UE is configured with the UL codebook CB3.

In one example, for $(N_1, N_2)=(2, 2)$, CB1 is used as the UL codebook, and for $(N_1, N_2)=(4, 1)$, the UE reports (e.g., via UE capability) whether it supports (CB2 or CB3). The UE is then configured with the UL codebook, CB2 or CB3, depending on the UE capability reporting.

Considering that the TPMI indication can be WB and it is indicated via UL-DCI, the 8Tx TPMI payload (i.e., overall codebook size for 8 antenna ports) can be restricted, for example, 1-2 bits more than 4Tx TPMI overhead (which is at most 6 bits).

In one embodiment, the codebook for 8 antenna ports includes full coherent precoders or precoding matrices, as described above, that are selected from FC precoders, or precoding matrices included in Rel. 15 DL Type 1 single panel codebook. There are two aspects that can be considered in this selection in order to reduce the TPMI payload (when compared with selecting the whole DL Type I single panel codebook).

Codebook Parameters:

CodebookMode: in DL Type I codebook, codebookMode1 corresponds to L=1 (single DFT beam) and codebookMode2 corresponds to L=4. Similar to FC precoders in Rel. 15 UL 4Tx codebook, the number of DFT beams can be fixed to 1 (i.e., L=1). This can be saved up to 2 bits when compared with L=4.

Oversampling factors $(O_1, O_2)$: similar to Rel.15 4Tx UL codebook, the oversampling can be less (e.g., 1 or 2) than DL Type I codebook (i.e., 4). For example, the oversampling factors can be chosen such that $N_i O_i=1$, 2 and $N_i>1$, where x can be 4 or 8. The value can x can be chosen based on performance evaluation. Or it can be fixed.

Codebook subsampling: to reduce the TPMI payload, the Rel. 15 Type I codebook can be subsampled by a factor of N, implying that a subset of Rel. 15 Type I codebook is used as FC precoders in 8Tx UL codebook. For instance, the subsampling factor can be N=1 for rank 1-2, and N=2 for rank 3-4, and N=4 for rank 5-8. An example of the subsampling can be as follows:

(i11, i12):

{0, 1, 2, 3} for rank 1-2

{0, 2} for rank 3-4

{0} for rank 5-8 i13 (rank 2-4): only i13=0 i2:

{0, 1, 2, 3} for rank 1,

{0, 1} for rank 2-4, and

{0} for rank 5-8

In another example of subsampling, a subset of Rel. 15 Type I codebook is used as FC precoders in 8Tx UL codebook as follows.

Rank 1-2: N=1 (no subsampling)

Rank 3-4: N=2 (subsampling by 2)

Rank 5-8: N=4 (subsampling by 4)

In one example of subsampling, at least one of the following examples is used/configured. Two oversampling factors (0) are also considered. Ten different examples of subsampling (CB0-CB9) are considered as summarized in Table 17.

In one example: for rank 1 only, at least one of the following examples of subsampling is used.

O=1: CB0, CB4, CB5, CB6

O=2: CB0, CB4, CB5, CB6

In one example: for rank 1 and 2 only, at least one of the following examples of subsampling is used.

O=1: CB0, CB4, CB5, CB6

O=2: CB0, CB4, CB5, CB6

In one example: for rank 1, 2, 3, and 4 only, at least one of the following examples of subsampling is used.

O=1: CB0-CB9, $i_{1,3}$=0

O=2: CB0-CB9, $i_{1,3}$=0

O=1: CB0-CB9, $i_{1,3}$=0, 1, 2

O=2: CB0-CB9, $i_{1,3}$=0, 1, 2

In one example, at least two values for $(O_1, O_2)$ is included/considered where a first of the two values of $(O_1, O_2)=(1, 1)$ and a second of the two values is such that at least one of $O_1$ and $O_2$ is more than 1 (e.g., 2 or 4), e.g., $(O_1, O_2)=(2, 2)$ or $(2, 1)$, or $(4, 1)$ or $(4,2)$ or $(4,4)$. In one example, one of the two values is configured, e.g., via higher layer RRC, or MACCE or DCI. In one example, a first value is always supported, i.e., any UE with 8 antenna ports must support the first value. However, the second value is optional for a UE, i.e., the UE can report (e.g., via UE capability, either separate/dedicated capability or as a component of a capability with multiple components) whether it supports the second value, and only when the UE supports the other value, the other value can be used/configured.

In one example, the second value $(O_1, O_2)=(2, 2)$ can be used/configured only when $(N_1, N_2)=(2, 2)$. That is, $(O_1, O_2)=(1, 1)$ when $(N_1, N_2)=(4, 1)$, and $(O_1, O_2)=(1, 1)$ or $(2, 2)$ when $(N_1, N_2)=(2, 2)$.

In one example, the second value is $(O_1, O_2)=(2, 2)$ when $(N_1, N_2)=(2, 2)$ and the second value of $(O_1, O_2)=(2, 1)$ when $(N_1, N_2)=(4, 1)$. That is, $(O_1, O_2)=(1, 1)$ or $(2, 1)$ when $(N_1, N_2)=(4, 1)$, and $(O_1, O_2)=(1, 1)$ or $(2, 2)$ when $(N_1, N_2)=(2, 2)$.

In one example, the second value $(O_1, O_2)=(2, 1)$ can be used/configured only when $(N_1, N_2)=(2, 2)$. That is, $(O_1, O_2)=(1, 1)$ when $(N_1, N_2)=(4, 1)$, and $(O_1, O_2)=(1, 1)$ or $(2, 1)$ when $(N_1, N_2)=(2, 2)$.

In one example, the second value is $(O_1, O_2)=(2, 1)$ when $(N_1, N_2)=(2, 2)$ and the second value of $(O_1, O_2)=(2, 1)$ when $(N_1, N_2)=(4, 1)$. That is, $(O_1, O_2)=(1, 1)$ or $(2, 1)$ when $(N_1, N_2)=(4, 1)$, and $(O_1, O_2)=(1, 1)$ or $(2, 1)$ when $(N_1, N_2)=(2, 2)$.

In one example, the second value of $(O_1, O_2)=(4,2)$ can be used/configured only when $(N_1, N_2)=(2, 2)$. That is, $(O_1, O_2)=(1, 1)$ when $(N_1, N_2)=(4, 1)$, and $(O_1, O_2)=(1, 1)$ or $(4,2)$ when $(N_1, N_2)=(2, 2)$.

In one example, the second value is $(O_1, O_2)=(4,2)$ when $(N_1, N_2)=(2, 2)$ and the second value of $(O_1, O_2)=(4, 1)$ when $(N_1, N_2)=(4, 1)$. That is, $(O_1, O_2)=(1, 1)$ or $(4, 1)$ when $(N_1, N_2)=(4, 1)$, and $(O_1, O_2)=(1, 1)$ or $(4,2)$ when $(N_1, N_2)=(2, 2)$.

In one example, the second value of $(O_1, O_2)=(4,4)$ can be used/configured only when $(N_1, N_2)=(2, 2)$. That is, $(O_1, O_2)=(1, 1)$ when $(N_1, N_2)=(4, 1)$, and $(O_1, O_2)=(1, 1)$ or $(4,4)$ when $(N_1, N_2)=(2, 2)$.

In one example, the second value is $(O_1, O_2)=(4,4)$ when $(N_1, N_2)=(2, 2)$ and the second value of $(O_1, O_2)=(4, 1)$ when $(N_1, N_2)=(4, 1)$. That is, $(O_1, O_2)=(1, 1)$ or $(4, 1)$ when $(N_1, N_2)=(4, 1)$, and $(O_1, O_2)=(1, 1)$ or $(4,4)$ when $(N_1, N_2)=(2, 2)$.

In one example, the second value is used/configured according to at least one of the above examples subject to a condition on rank value.

In one example, the condition is based on the higher layer parameter maxRank which indicates the max number of layers (or rank value) for UL (PUSCH) transmission. In one example, when maxRank≤t, the second value can be used/configured (as described above); otherwise (maxRank>t) the second value can't be used/configured (implying only (1, 1) can be used/configured). Here, t is a threshold (e.g., 1 or 2 or 4), which can be fixed, or configured (from a set of supported values, e.g., {1, 2}), or can be reported by the UE via UE capability (e.g., UE reports a value of from a set of supported values, e.g., {1, 2}).

In one example, the condition is based on the higher layer parameter maxRank which indicates the max number of layers (or rank value) for UL (PUSCH) transmission. In one example, when maxRank∈S, the second value can be used/configured (as described above); otherwise (maxRank∉S) the second value can't be used/configured (implying only (1, 1) can be used/configured). Here, S is a set of values (e.g., {1}, {1, 2}, {1, 2, 3}, {1, 2, 3, 4}), which can be fixed, or configured (from a set of supported values, e.g., {1, 2}), or can be reported by the UE via UE capability (e.g., UE reports a value of from a set of supported values, e.g., {1, 2}).

In one example, the condition is based on the higher layer parameter maxRank and a UE capability. That is, the UE reports whether it can support the second value, and only when the UE supports the second value can be used/configured if a condition on maxRank value is met, where the condition is according to one of the examples as described above.

In one example, the codebook size is according to at least one of the following examples.

For rank 1 only: codebook size=14-16 bits (CB0, CB4, or CB6)

For rank 1 and 2 only: rank 1-2 codebook size=24 (CB0 or CB34)

For rank 1, 2, 3, and 4 only: rank 1-4 codebook size=64 (CB1 or CB32)

TABLE 17

|  | Rank 1-1 | Rank 3-4 | Evaluation 1: rank 1 only | Evaluation 2: dynamic rank 1-2 | Evaluation 3: dynamic rank 1-4 |
|---|---|---|---|---|---|
| CB0 | No subsampling | No subsampling | Y | Y | Y |
| CB1 | No subsampling | Subsampling by 2, even-numbered | | | Y |
| CB2 | No subsampling | Subsampling by 2, odd-numbered | | | Y |
| CB3 | No subsampling | Subsampling by 2, random | | | Y |
| CB4 | Subsampling by 2, even-numbered | Subsampling by 4, even-numbered | Y | Y | Y |
| CB5 | Subsampling by 2, odd-numbered | Subsampling by 4, odd-numbered | Y | Y | Y |
| CB6 | Subsampling by 2, random | Subsampling by 2, random | Y | Y | Y |
| CB7 | Subsampling by 2, even-numbered | Subsampling by 8, even-numbered | | | Y |
| CB8 | Subsampling by 2, odd-numbered | Subsampling by 8, odd-numbered | | | Y |
| CB9 | Subsampling by 2, random | Subsampling by 8, random | | | Y |

In one embodiment, the codebook for 8 antenna ports includes partial coherent precoders or precoding matrices, as described above, that are based on the precoders, or precoding matrices included in Rel. 15 UL 4Tx or UL 2Tx codebooks (Table 1-Table 6).

The partial coherent precoders for $N_g=2$ can be constructed according to one of the following alternatives.

Alt1: based on UL 4Tx codebook

Rank 1: one 4Tx rank 1 TPMI+indication of 1 of the 2 groups

FC only

Rank 2: depending on distribution of layers across groups

Ex1 (all layers in one group): one 4Tx rank 2 TPMI+indication of 1 of the 2 groups 1. FC only Ex2 (one layer per group): two 4Tx rank 1 TPMIs, one for each group 1. Ex2a: both FC 2. Ex2b: one FC and one PC Rank>3: similar to rank 2

Alt2: based on UL 2Tx codebook+co-phase across 2Tx TPMIs (to obtain a 4Tx precoder)

Rank 1: two 2Tx rank 1 TPMIs+one rank 1 co-phase+ indication of 1 of the 2 groups FC only Rank 2: depending on distribution of layers across groups Ex3 (all layers in one group): two 2Tx rank 2 TPMIs+rank 2 co-phase+indication of 1 of the 2 groups Ex4 (one layer per group): Two pairs of (two 2Tx rank 1 TPMIs+one rank 1 co-phase), one pair for each group 1. Ex4a: both FC 2. Ex4b: one FC and one PC Rank>3: similar to rank 2

Alt3: based on both UL 2Tx and 4Tx codebooks

Rank 1: a combination based on examples in Alt1 and Alt2

Ex5: one 4Tx rank 1 TPMI

Ex6: two 2Tx rank 1 TPMIs+co-phase across 2Tx TPMIs

Rank 2: a combination based on examples in Alt1 and Alt2

Rank>3: similar to rank 2

Among these alternatives, Alt1 is the simplest and makes the most sense since the antenna ports within a group are expected to be coherent. So, Rel. 15 UL 4Tx precoders can be considered as the starting point for $N_g=2$. In particular, the FC precoders in the UL 4Tx codebook can be used to design the 8Tx UL codebook for $N_g=2$.

For $N_g=4$, there are two alternatives:

Alt1: Rel.15 UL 4Tx partial-coherent precoders

Alt2: Rel. 15 UL 2Tx full-coherent precoders

Either alternative seems plausible as the starting point. One advantage of Alt1 though is that Rel.15 4Tx PC precoders based design can reduce the number of candidate precoders significantly, when compared with 2Tx full-coherent based design.

FIG. 8 illustrates an example of partial coherence (PC) precoder design for rank 1 800 according to embodiments of the present disclosure. The embodiment of the example of partial coherence (PC) precoder design for rank 1 800 illustrated in FIG. 8 is for illustration only. FIG. 8 does not limit the scope of this disclosure to any particular implementation of the antenna blocks or arrays.

An example of the PC precoder design for rank 1 is shown in FIG. 8.

$N_g$=2: based on FC precoders (shown in red boxes)
   1 FC precoder:

$$\text{group 1 } \begin{bmatrix} g \\ 0 \end{bmatrix} \left( g \text{ from TPMI12-27} \right)$$

$$\text{group 2 } \begin{bmatrix} 0 \\ g \end{bmatrix} \left( g \text{ from TPMI12-27} \right)$$

2 FC precoders:

$$\begin{bmatrix} g_1 \\ g_2 \end{bmatrix} \left( g_i \text{ from TPMI12-27} \right)$$

$N_g$=4: based on PC 4Tx precoders (shown in blue boxes)
   1 PC precoder:

$$\text{group 1 } \begin{bmatrix} g \\ 0 \end{bmatrix} \left( g \text{ from TPMI4-7} \right)$$

$$\text{group 2 } \begin{bmatrix} g \\ 0 \end{bmatrix} \left( g \text{ from TPMI8-11} \right)$$

$$\text{group 3 } \begin{bmatrix} 0 \\ g \end{bmatrix} \left( g \text{ from TPMI4-7} \right)$$

$$\text{group 4 } \begin{bmatrix} 0 \\ g \end{bmatrix} \left( g \text{ from TPMI8-11} \right)$$

2 PC precoders:

$$\begin{bmatrix} g_1 \\ g_2 \end{bmatrix} \left( g_i \text{ from TPMI4-11} \right)$$

In one embodiment, the codebook for 8 antenna ports when $N_g$=2 includes precoders or precoding matrices that are constructed based on the full-coherent (FC) TPMIs of the Rel. 15 UL 4Tx codebook (cf. Table 8). Let $n_i$ denote the number of antenna ports associated with the i-th antenna group, where i=1, 2. In one example $$n_i = \frac{N}{N_g} = \frac{8}{2} = 4.$$

Let $l_i$ denote the number of layer(s) associated with the i-th antenna group, where i=0, 1, . . . , min(r, $n_i$) such that $$\sum_{i=1}^{2} l_i = l_1 + l_2 = r,$$

where r=number of layers (rank value). When $n_i$=4, $l_i \in \{0, 1, \ldots, \min(r, 4)\}$.
   When r=1, $l_i \in \{0, 1\}$ such that $l_1+l_2=1$.
   When r=2, $l_i \in \{0, 1, 2\}$ such that $l_1+l_2=2$.
   When r=3, $l_i \in \{0, 1, 2, 3\}$ such that $l_1+l_2=3$.
   When r=4, $l_i \in \{0, 1, \ldots, 4\}$ such that $l_1+l_2=4$.
   When r=5, $l_i \in \{0, 1, \ldots, 4\}$ such that $l_1+l_2=5$.
   When r=6, $l_i \in \{0, 1, \ldots, 4\}$ such that $l_1+l_2=6$.

When r=7, $l_i \in \{0, 1, \ldots, 4\}$ such that $l_1+l_2=7$.
   When r=8, $l_i \in \{0, 1, \ldots, 4\}$ such that $l_1+l_2=8$.

The candidate values of $(l_1, l_2)$ can be divided into two cases, case A in which all layers are associated with one group (implying one of $l_1$ and $l_2$ is 0 and the other is non-zero), and case B in which layers are split across two antenna groups, a subset of layers to each antenna group. Example candidate values are tabulated in Table 18.

TABLE 18

| Rank (r) | Case A: $(l_1, l_2)$, all layers in one antenna group | Case B: $(l_1, l_2)$, layers split across 2 antenna groups |
|---|---|---|
| 1 | (1, 0), (0, 1) | |
| 2 | (2, 0), (0, 2) | (1, 1) |
| 3 | (3, 0), (0, 3) | (2, 1), (1, 2) |
| 4 | (4, 0), (0, 4) | (2, 2), (3, 1), (1, 3) |
| 5 | | (4, 1), (1, 4), (2, 3), (3, 2) |
| 6 | | (4, 2), (2, 4), (3, 3) |
| 7 | | (4, 3), (3, 4) |
| 8 | | (4, 4) |

In one example, for rank $r \in \{1 \ldots 8\}$, the codebook for 8 antenna ports when $N_g$=2 includes precoders or precoding matrices that are constructed based on the rank s full-coherent (FC) TPMIs of the Rel. 15 UL 4Tx codebook, where s=min(4, r), i.e., when rank $r \in \{1, \ldots, 3\}$, s=r, and when rank $r \in \{4, \ldots, 8\}$, s=4. If $l_i$=x>0, then precoders for layers 1, . . . , x from rank s 4Tx FC precoding matrix is used (or associated with) for i-th group. Let $W_{4,r,I}$ (Row; Col) denote a submatrix of the rank r 4Tx precoding matrix $W_{4,r,I}$ indicated by the rank r 4Tx TPMI I, the submatrix corresponds to (is associated with) the row indices Row=[$a_1, \ldots a_2$] and the column indices Col=[$b_1, \ldots, b_i$] of the 4Tx precoding matrix indicated by the 4Tx TPMI I. Note that $W_{4,r,I}$ is a 4×r matrix. In the following, $0_{x,y}$ denotes an all-zero matrix of size x×y, e.g., $$\begin{bmatrix} 0 \\ 0 \\ 0 \\ 0 \end{bmatrix}$$

when x=4 and y=1.

In one example, for brevity, the subscript 4 in $W_{4,r,I}$ can be dropped/omitted and index I=i+$s_r$ where i=0, 1, 2, . . . , and $s_r$ is the TPMI value of the first FC 4Tx precoding matrix of rank r, i.e., $W_{4,r,I}=\overline{W}_{r,i}$,
   when r=1, $W_{4,1,I}=\overline{W}_{1,i}$ and I=i+12,
   when r=2, $W_{4,2,I}=\overline{W}_{2,i}$ and I=i+14,
   when r=3, $W_{4,3,I}=\overline{W}_{3,i}$ and I=i+3,
   when r=4, $W_{4,4,I}=\overline{W}_{4,i}$ and I=i+3, The corresponding matrices $\overline{W}_{r,i}$ are shown in Table 19 through Table 22.

TABLE 19 matrix $\overline{W}_{1,i}$ for rank 1, Ng = 2

| i | $\overline{W}_{1,i}$ (ordered from left to right in increasing order of i) |
|---|---|

0-7
$$\frac{1}{2}\begin{bmatrix}1\\1\\1\\1\end{bmatrix} \quad \frac{1}{2}\begin{bmatrix}1\\1\\j\\j\end{bmatrix} \quad \frac{1}{2}\begin{bmatrix}1\\1\\-1\\-1\end{bmatrix} \quad \frac{1}{2}\begin{bmatrix}1\\1\\-j\\-j\end{bmatrix} \quad \frac{1}{2}\begin{bmatrix}1\\j\\1\\j\end{bmatrix} \quad \frac{1}{2}\begin{bmatrix}1\\j\\j\\-1\end{bmatrix} \quad \frac{1}{2}\begin{bmatrix}1\\j\\-1\\-j\end{bmatrix} \quad \frac{1}{2}\begin{bmatrix}1\\j\\-j\\1\end{bmatrix}$$

8-15
$$\frac{1}{2}\begin{bmatrix}1\\-1\\1\\-1\end{bmatrix} \quad \frac{1}{2}\begin{bmatrix}1\\-1\\j\\-j\end{bmatrix} \quad \frac{1}{2}\begin{bmatrix}1\\-1\\-1\\1\end{bmatrix} \quad \frac{1}{2}\begin{bmatrix}1\\-1\\-j\\j\end{bmatrix} \quad \frac{1}{2}\begin{bmatrix}1\\-j\\1\\-j\end{bmatrix} \quad \frac{1}{2}\begin{bmatrix}1\\-j\\j\\1\end{bmatrix} \quad \frac{1}{2}\begin{bmatrix}1\\-j\\-1\\j\end{bmatrix} \quad \frac{1}{2}\begin{bmatrix}1\\-j\\-j\\-1\end{bmatrix}$$

TABLE 20 matrix $\overline{W}_{2,i}$ for rank 2, Ng = 2

| i | $\overline{W}_{2,i}$ (ordered from left to right in increasing order of i) |
|---|---|

0-3
$$\frac{1}{2\sqrt{2}}\begin{bmatrix}1&1\\1&1\\1&-1\\1&-1\end{bmatrix} \quad \frac{1}{2\sqrt{2}}\begin{bmatrix}1&1\\1&1\\j&-j\\j&-j\end{bmatrix} \quad \frac{1}{2\sqrt{2}}\begin{bmatrix}1&1\\j&j\\1&-1\\j&-j\end{bmatrix} \quad \frac{1}{2\sqrt{2}}\begin{bmatrix}1&1\\j&j\\j&-j\\-1&1\end{bmatrix}$$

4-7
$$\frac{1}{2\sqrt{2}}\begin{bmatrix}1&1\\-1&-1\\1&-1\\-1&1\end{bmatrix} \quad \frac{1}{2\sqrt{2}}\begin{bmatrix}1&1\\-1&-1\\j&-j\\-j&j\end{bmatrix} \quad \frac{1}{2\sqrt{2}}\begin{bmatrix}1&1\\-j&-j\\1&-1\\-j&-j\end{bmatrix} \quad \frac{1}{2\sqrt{2}}\begin{bmatrix}1&1\\-j&-j\\j&-j\\1&-1\end{bmatrix}$$

TABLE 21 matrix $\overline{W}_{3,i}$ for rank 3, Ng = 2

| i | $\overline{W}_{3,i}$ (ordered from left to right in increasing order of i) |
|---|---|

0-3
$$\frac{1}{2\sqrt{3}}\begin{bmatrix}1&1&1\\1&-1&1\\1&1&-1\\1&-1&-1\end{bmatrix} \quad \frac{1}{2\sqrt{3}}\begin{bmatrix}1&1&1\\1&-1&1\\j&j&-j\\j&-j&-j\end{bmatrix} \quad \frac{1}{2\sqrt{3}}\begin{bmatrix}1&1&1\\-1&1&-1\\1&1&-1\\-1&1&1\end{bmatrix} \quad \frac{1}{2\sqrt{3}}\begin{bmatrix}1&1&1\\-1&1&-1\\j&j&-j\\-j&j&j\end{bmatrix}$$

TABLE 22 matrix $\overline{W}_{4,i}$ for rank 4, Ng = 2

| i | $\overline{W}_{4,i}$ (ordered from left to right in increasing order of i) |
|---|---|

0-1
$$\frac{1}{4}\begin{bmatrix}1&1&1&1\\1&-1&1&-1\\1&1&-1&-1\\1&-1&-1&1\end{bmatrix} \quad \frac{1}{4}\begin{bmatrix}1&1&1&1\\1&-1&1&-1\\j&j&-j&-j\\j&-j&-j&j\end{bmatrix}$$

The mapping of the antenna ports to antenna groups are according to at least one of the examples.

In one example (numbering A), the antenna group i=1 maps to (corresponds to) antenna ports 1, 2, 3, 4 (or 0, 1, 2, 3), and the antenna group i=2 maps to (corresponds to) antenna ports 5, 6, 7, 8 (or 4, 5, 6, 7).

In one example (numbering B), the antenna group i=1 maps to (corresponds to) antenna ports 1, 2, 5, 6 (or 0, 1, 4, 5), and the antenna group i=2 maps to (corresponds to) antenna ports 3, 4, 7, 8 (or 2, 3, 6, 7).

In one example, the precoding matrix $W=W_B$ for numbering scheme B can be obtained by row permutation (ordering) of the precoding matrix $W=W_A$ for numbering scheme A. For example, $$W_B = W_{f(j)} = W'_j = W_A$$

where the subscripts j and $i_j=f(j)$ denote the row of the respective matrix; f(j) is given by Table 23;

TABLE 23

The port mapping function f(j) for transmission using 8 antenna ports

| j | f(j): $N_g = 2$ |
|---|---|
| 0 | 0 |
| 1 | 1 |
| 2 | 4 |
| 3 | 5 |
| 4 | 2 |
| 5 | 3 |

TABLE 23-continued

The port mapping function f(j) for transmission using 8 antenna ports

| j | f(j): $N_g = 2$ |
|---|---|
| 6 | 6 |
| 7 | 7 |

In the following, the 8Tx precoding matrices for both examples of port numbering are provided.

In one example, when rank r=1, the codebook for 8 antenna ports when $N_g=2$ includes all of or at least one of the precoders shown in Table 24 and Table 25. In one example, the normalized or multiplication factor $M_1=\frac{1}{2}$ in the 4Tx UL precoders are not included when the 8Tx precoders are constructed. The tables below are according to this example. In one example, the factor $M_1$ is included, and hence in this case a multiplication factor $M_1$ is included (multiplied to) in each precoder in the tables below. In another example, a multiplication factor $$P_1 = \frac{1}{\sqrt{2}} M_1$$

is included in (multiplied to) each precoder in the tables below. In another example, a multiplication factor $$N_1 = \frac{1}{2\sqrt{2}}$$

is included in (multiplied to) each precoder in the tables below.

TABLE 24

| port numbering scheme (A) | | | |
|---|---|---|---|
| Rank 1 4Tx FC TPMIs $(l_1, l_2)$ (I) | | 8Tx precoders | 8Tx precoders (without scaling) |
| (1, 0) | 12-27 | $\begin{bmatrix} W_{4,1,I}([1\dots 4], [1]) \\ 0_{4,1} \end{bmatrix}$ | $\begin{bmatrix} 1 \\ 1 \\ 1 \\ 1 \\ 0 \\ 0 \\ 0 \\ 0 \end{bmatrix}, \begin{bmatrix} 1 \\ 1 \\ j \\ j \\ 0 \\ 0 \\ 0 \\ 0 \end{bmatrix}, \begin{bmatrix} 1 \\ 1 \\ -1 \\ -1 \\ 0 \\ 0 \\ 0 \\ 0 \end{bmatrix}, \begin{bmatrix} 1 \\ 1 \\ -j \\ -j \\ 0 \\ 0 \\ 0 \\ 0 \end{bmatrix}, \begin{bmatrix} 1 \\ j \\ 1 \\ j \\ 0 \\ 0 \\ 0 \\ 0 \end{bmatrix}, \begin{bmatrix} 1 \\ j \\ j \\ -1 \\ 0 \\ 0 \\ 0 \\ 0 \end{bmatrix}, \begin{bmatrix} 1 \\ j \\ -1 \\ -j \\ 0 \\ 0 \\ 0 \\ 0 \end{bmatrix}, \begin{bmatrix} 1 \\ j \\ -j \\ 1 \\ 0 \\ 0 \\ 0 \\ 0 \end{bmatrix}$ $\begin{bmatrix} 1 \\ -1 \\ 1 \\ -1 \\ 0 \\ 0 \\ 0 \\ 0 \end{bmatrix}, \begin{bmatrix} 1 \\ -1 \\ j \\ -j \\ 0 \\ 0 \\ 0 \\ 0 \end{bmatrix}, \begin{bmatrix} 1 \\ -1 \\ -1 \\ 1 \\ 0 \\ 0 \\ 0 \\ 0 \end{bmatrix}, \begin{bmatrix} 1 \\ -1 \\ -j \\ j \\ 0 \\ 0 \\ 0 \\ 0 \end{bmatrix}, \begin{bmatrix} 1 \\ -j \\ 1 \\ -j \\ 0 \\ 0 \\ 0 \\ 0 \end{bmatrix}, \begin{bmatrix} 1 \\ -j \\ j \\ 1 \\ 0 \\ 0 \\ 0 \\ 0 \end{bmatrix}, \begin{bmatrix} 1 \\ -j \\ -1 \\ j \\ 0 \\ 0 \\ 0 \\ 0 \end{bmatrix}, \begin{bmatrix} 1 \\ -j \\ -j \\ -1 \\ 0 \\ 0 \\ 0 \\ 0 \end{bmatrix}$ |
| (0, 1) | 12-27 | $\begin{bmatrix} 0_{4,1} \\ W_{4,1,I}([1\dots 4], [1]) \end{bmatrix}$ | $\begin{bmatrix} 0 \\ 0 \\ 0 \\ 0 \\ 1 \\ 1 \\ 1 \\ 1 \end{bmatrix}, \begin{bmatrix} 0 \\ 0 \\ 0 \\ 0 \\ 1 \\ 1 \\ j \\ j \end{bmatrix}, \begin{bmatrix} 0 \\ 0 \\ 0 \\ 0 \\ 1 \\ 1 \\ -1 \\ -1 \end{bmatrix}, \begin{bmatrix} 0 \\ 0 \\ 0 \\ 0 \\ 1 \\ 1 \\ -j \\ -j \end{bmatrix}, \begin{bmatrix} 0 \\ 0 \\ 0 \\ 0 \\ 1 \\ j \\ 1 \\ j \end{bmatrix}, \begin{bmatrix} 0 \\ 0 \\ 0 \\ 0 \\ 1 \\ j \\ j \\ -1 \end{bmatrix}, \begin{bmatrix} 0 \\ 0 \\ 0 \\ 0 \\ 1 \\ j \\ -1 \\ -j \end{bmatrix}, \begin{bmatrix} 0 \\ 0 \\ 0 \\ 0 \\ 1 \\ j \\ -j \\ 1 \end{bmatrix}$ $\begin{bmatrix} 0 \\ 0 \\ 0 \\ 0 \\ 1 \\ -1 \\ 1 \\ -1 \end{bmatrix}, \begin{bmatrix} 0 \\ 0 \\ 0 \\ 0 \\ 1 \\ -1 \\ j \\ -j \end{bmatrix}, \begin{bmatrix} 0 \\ 0 \\ 0 \\ 0 \\ 1 \\ -1 \\ -1 \\ 1 \end{bmatrix}, \begin{bmatrix} 0 \\ 0 \\ 0 \\ 0 \\ 1 \\ -1 \\ -j \\ j \end{bmatrix}, \begin{bmatrix} 0 \\ 0 \\ 0 \\ 0 \\ 1 \\ -j \\ 1 \\ -j \end{bmatrix}, \begin{bmatrix} 0 \\ 0 \\ 0 \\ 0 \\ 1 \\ -j \\ j \\ 1 \end{bmatrix}, \begin{bmatrix} 0 \\ 0 \\ 0 \\ 0 \\ 1 \\ -j \\ -1 \\ j \end{bmatrix}, \begin{bmatrix} 0 \\ 0 \\ 0 \\ 0 \\ 1 \\ -j \\ -j \\ -1 \end{bmatrix}$ |

TABLE 25

| port numbering scheme (B) | | | |
|---|---|---|---|
| Rank 1 4Tx $(l_1, l_2)$ FC TPMIs (I) | | 8Tx precoders | 8Tx precoders (without scaling) |
| (1, 0) | 12-27 | $\begin{bmatrix} W_{4,1,I}([1, 2], [1]) \\ 0_2 \\ W_{4,1,I}([3, 4], [1]) \\ 0 \end{bmatrix}$ | $\begin{bmatrix} 1 \\ 1 \\ 0 \\ 0 \\ 1 \\ 1 \\ 0 \\ 0 \end{bmatrix}, \begin{bmatrix} 1 \\ 1 \\ 0 \\ 0 \\ j \\ j \\ 0 \\ 0 \end{bmatrix}, \begin{bmatrix} 1 \\ 1 \\ 0 \\ 0 \\ -1 \\ -1 \\ 0 \\ 0 \end{bmatrix}, \begin{bmatrix} 1 \\ 1 \\ 0 \\ 0 \\ -j \\ -j \\ 0 \\ 0 \end{bmatrix}, \begin{bmatrix} 1 \\ j \\ 0 \\ 0 \\ 1 \\ j \\ 0 \\ 0 \end{bmatrix}, \begin{bmatrix} 1 \\ j \\ 0 \\ 0 \\ j \\ -1 \\ 0 \\ 0 \end{bmatrix}, \begin{bmatrix} 1 \\ j \\ 0 \\ 0 \\ -1 \\ -j \\ 0 \\ 0 \end{bmatrix}, \begin{bmatrix} 1 \\ j \\ 0 \\ 0 \\ -j \\ 1 \\ 0 \\ 0 \end{bmatrix},$ |

US 12,677,275 B2

TABLE 25-continued port numbering scheme (B)

Rank 1 4Tx
$(l_1, l_2)$ FC TPMIs (I) 8Tx precoders    8Tx precoders (without scaling)

(0, 1) 12-27
$$\begin{bmatrix} 0_2 \\ W_{4,1,I}([1,2],[1]) \\ 0_2 \\ W_{4,1,I}([3,4],[1]) \end{bmatrix}$$

In one example, the single-layer codebook for $N_g=2$ includes all of or a subset of precoders in Table 26.

TABLE 26

Intermediate precoding matrix W' for Ng = 2 and single-layer

| Rank 1 4Tx FC $(l_1, l_2)$ TPMI (I) | TPMI index i | Intermediate precoder matrix W' |
|---|---|---|
| (1, 0) 12-27 | 0-15 | $\begin{bmatrix} W_{4,1,I}([1...4],[1]) \\ 0_{4,1} \end{bmatrix} = \frac{1}{\sqrt{2}}\begin{bmatrix} W_{1,i} \\ 0_{4\times1} \end{bmatrix}$ |
| (0, 1) 12-27 | 16-31 | $\begin{bmatrix} 0_{4,1} \\ W_{4,1,I}([1...4],[1]) \end{bmatrix} = \frac{1}{\sqrt{2}}\begin{bmatrix} W_{1,i} \\ 0_{4\times1} \end{bmatrix}$ |

In one example, when rank r=2, the codebook for 8 antenna ports when $N_g=2$ includes all of or at least one of the precoding matrices shown in Table 27 and Table 28. In one example, the normalized or multiplication factor $$M_2 = \frac{1}{2\sqrt{2}}$$

in the 4Tx UL precoding matrices are not included when the 8Tx precoding matrices are constructed. The tables below are according to this example. In one example, the factor $M_2$ is included, and hence in this case a multiplication factor $M_2$ is included (multiplied to) in each precoder in the tables below. In another example, a multiplication factor $$P_2 = \frac{1}{\sqrt{2}}M_2$$

is included in (multiplied to) each precoder in the tables below. In another example, a multiplication factor $N_2=\frac{1}{4}$ is included in (multiplied to) each precoder in the tables below.

TABLE 27 port numbering scheme (A)

Rank 2 4Tx FC
$(l_1, l_2)$ TPMIs (I)   8Tx precoders    8Tx precoders (without scaling)

(2, 0) 14-21
$$\begin{bmatrix} W_{4,2,I}([1...4],[1,2]) \\ 0_{4,2} \end{bmatrix}$$

TABLE 27-continued port numbering scheme (A)

| Rank 2 4Tx FC $(l_1, l_2)$ TPMIs (I) | 8Tx precoders | 8Tx precoders (without scaling) |
|---|---|---|
| | | $\begin{bmatrix} 1 & 1 \\ -1 & -1 \\ 1 & -1 \\ -1 & 1 \\ 0 & 0 \\ 0 & 0 \\ 0 & 0 \\ 0 & 0 \end{bmatrix}, \begin{bmatrix} 1 & 1 \\ -1 & -1 \\ j & -j \\ -j & j \\ 0 & 0 \\ 0 & 0 \\ 0 & 0 \\ 0 & 0 \end{bmatrix}, \begin{bmatrix} 1 & 1 \\ -j & -j \\ 1 & -1 \\ -j & j \\ 0 & 0 \\ 0 & 0 \\ 0 & 0 \\ 0 & 0 \end{bmatrix}, \begin{bmatrix} 1 & 1 \\ -j & -j \\ j & -j \\ 1 & -1 \\ 0 & 0 \\ 0 & 0 \\ 0 & 0 \\ 0 & 0 \end{bmatrix}$ |
| (0, 2) 14-21 | $\begin{bmatrix} 0_{4,2} \\ W_{4,2,I}([1\ldots 4], [1, 2]) \end{bmatrix}$ | $\begin{bmatrix} 0 & 0 \\ 0 & 0 \\ 0 & 0 \\ 0 & 0 \\ 1 & 1 \\ 1 & 1 \\ 1 & -1 \\ 1 & -1 \end{bmatrix}, \begin{bmatrix} 0 & 0 \\ 0 & 0 \\ 0 & 0 \\ 0 & 0 \\ 1 & 1 \\ 1 & 1 \\ j & -j \\ j & -j \end{bmatrix}, \begin{bmatrix} 0 & 0 \\ 0 & 0 \\ 0 & 0 \\ 0 & 0 \\ 1 & 1 \\ j & j \\ 1 & -1 \\ j & -j \end{bmatrix}, \begin{bmatrix} 0 & 0 \\ 0 & 0 \\ 0 & 0 \\ 0 & 0 \\ 1 & 1 \\ j & j \\ j & -j \\ -1 & 1 \end{bmatrix},$ |
| | | $\begin{bmatrix} 0 & 0 \\ 0 & 0 \\ 0 & 0 \\ 0 & 0 \\ 1 & 1 \\ -1 & -1 \\ 1 & -1 \\ -1 & 1 \end{bmatrix}, \begin{bmatrix} 0 & 0 \\ 0 & 0 \\ 0 & 0 \\ 0 & 0 \\ 1 & 1 \\ -1 & -1 \\ j & -j \\ -j & j \end{bmatrix}, \begin{bmatrix} 0 & 0 \\ 0 & 0 \\ 0 & 0 \\ 0 & 0 \\ 1 & 1 \\ -j & -j \\ 1 & -1 \\ -j & j \end{bmatrix}, \begin{bmatrix} 0 & 0 \\ 0 & 0 \\ 0 & 0 \\ 0 & 0 \\ 1 & 1 \\ -j & -j \\ j & -j \\ 1 & -1 \end{bmatrix}$ |
| (1, 1) 14-21 | $\begin{bmatrix} W_{4,2,I}([1\ldots 4], [1]) & 0_{4,1} \\ 0_{4,1} & W_{4,2,I}([1\ldots 4], [2]) \end{bmatrix}$ | $\begin{bmatrix} 1 & 0 \\ 1 & 0 \\ 1 & 0 \\ 1 & 0 \\ 0 & 1 \\ 0 & 1 \\ 0 & -1 \\ 0 & -1 \end{bmatrix}, \begin{bmatrix} 1 & 0 \\ 1 & 0 \\ j & 0 \\ j & 0 \\ 0 & 1 \\ 0 & 1 \\ 0 & -j \\ 0 & -j \end{bmatrix}, \begin{bmatrix} 1 & 0 \\ j & 0 \\ 1 & 0 \\ j & 0 \\ 0 & 1 \\ 0 & j \\ 0 & -1 \\ 0 & -j \end{bmatrix}, \begin{bmatrix} 1 & 0 \\ j & 0 \\ j & 0 \\ -1 & 0 \\ 0 & 1 \\ 0 & j \\ 0 & -j \\ 0 & 1 \end{bmatrix},$ |
| | | $\begin{bmatrix} 1 & 0 \\ -1 & 0 \\ 1 & 0 \\ -1 & 0 \\ 0 & 1 \\ 0 & -1 \\ 0 & -1 \\ 0 & 1 \end{bmatrix}, \begin{bmatrix} 1 & 0 \\ -1 & 0 \\ j & 0 \\ -j & 0 \\ 0 & 1 \\ 0 & -1 \\ 0 & -j \\ 0 & j \end{bmatrix}, \begin{bmatrix} 1 & 0 \\ -j & 0 \\ 1 & 0 \\ -j & 0 \\ 0 & 1 \\ 0 & -j \\ 0 & -1 \\ 0 & j \end{bmatrix}, \begin{bmatrix} 1 & 0 \\ -j & 0 \\ j & 0 \\ 1 & 0 \\ 0 & 1 \\ 0 & -j \\ 0 & -j \\ 0 & -1 \end{bmatrix}$ |

TABLE 28 port numbering scheme (B)

| 4Tx FC $(l_1, l_2)$ TPMIs (I) | 8Tx precoders | 8Tx precoders (without scaling) |
|---|---|---|
| (2, 0) 14-21 | $\begin{bmatrix} W_{4,2,I}([1, 2], [1, 2]) \\ 0_{2,2} \\ W_{4,2,I}([3, 4], [1, 2]) \\ 0_{2,2} \end{bmatrix}$ | $\begin{bmatrix} 1 & 1 \\ 1 & 1 \\ 0 & 0 \\ 0 & 0 \\ 1 & -1 \\ 1 & -1 \\ 0 & 0 \\ 0 & 0 \end{bmatrix}, \begin{bmatrix} 1 & 1 \\ 1 & 1 \\ 0 & 0 \\ 0 & 0 \\ j & -j \\ j & -j \\ 0 & 0 \\ 0 & 0 \end{bmatrix}, \begin{bmatrix} 1 & 1 \\ j & j \\ 0 & 0 \\ 0 & 0 \\ 1 & -1 \\ j & -j \\ 0 & 0 \\ 0 & 0 \end{bmatrix}, \begin{bmatrix} 1 & 1 \\ j & j \\ 0 & 0 \\ 0 & 0 \\ j & -j \\ -1 & 1 \\ 0 & 0 \\ 0 & 0 \end{bmatrix},$ |

TABLE 28-continued

| port numbering scheme (B) | | | |
|---|---|---|---|
| 4Tx FC | | | |
| $(l_1, l_2)$ TPMIs (I) | 8Tx precoders | | 8Tx precoders (without scaling) |

$$\begin{bmatrix} 1 & 1 \\ -1 & -1 \\ 0 & 0 \\ 0 & 0 \\ 1 & -1 \\ -1 & 1 \\ 0 & 0 \\ 0 & 0 \end{bmatrix}, \begin{bmatrix} 1 & 1 \\ -1 & -1 \\ 0 & 0 \\ 0 & 0 \\ j & -j \\ -j & j \\ 0 & 0 \\ 0 & 0 \end{bmatrix}, \begin{bmatrix} 1 & 1 \\ -j & -j \\ 0 & 0 \\ 0 & 0 \\ 1 & -1 \\ -j & j \\ 0 & 0 \\ 0 & 0 \end{bmatrix}, \begin{bmatrix} 1 & 1 \\ -j & -j \\ 0 & 0 \\ 0 & 0 \\ j & -j \\ 1 & -1 \\ 0 & 0 \\ 0 & 0 \end{bmatrix},$$

(0, 2) 14-21

$$\begin{bmatrix} 0_{2,2} \\ W_{4,2,I}([1, 2], [1, 2]) \\ 0_2 \\ W_{4,2,I}([3, 4], [1, 2]) \end{bmatrix}$$

$$\begin{bmatrix} 0 & 0 \\ 0 & 0 \\ 1 & 1 \\ 1 & 1 \\ 0 & 0 \\ 0 & 0 \\ 1 & -1 \\ 1 & -1 \end{bmatrix}, \begin{bmatrix} 0 & 0 \\ 0 & 0 \\ 1 & 1 \\ 1 & 1 \\ 0 & 0 \\ 0 & 0 \\ j & -j \\ j & -j \end{bmatrix}, \begin{bmatrix} 0 & 0 \\ 0 & 0 \\ 1 & 1 \\ j & j \\ 0 & 0 \\ 0 & 0 \\ 1 & -1 \\ j & -j \end{bmatrix}, \begin{bmatrix} 0 & 0 \\ 0 & 0 \\ 1 & 1 \\ j & j \\ 0 & 0 \\ 0 & 0 \\ j & -j \\ -1 & 1 \end{bmatrix},$$

$$\begin{bmatrix} 0 & 0 \\ 0 & 0 \\ 1 & 1 \\ -1 & -1 \\ 0 & 0 \\ 0 & 0 \\ 1 & -1 \\ -1 & 1 \end{bmatrix}, \begin{bmatrix} 0 & 0 \\ 0 & 0 \\ 1 & 1 \\ -1 & -1 \\ 0 & 0 \\ 0 & 0 \\ j & -j \\ -j & j \end{bmatrix}, \begin{bmatrix} 0 & 0 \\ 0 & 0 \\ 1 & 1 \\ -j & -j \\ 0 & 0 \\ 0 & 0 \\ 1 & -1 \\ -j & j \end{bmatrix}, \begin{bmatrix} 0 & 0 \\ 0 & 0 \\ 1 & 1 \\ -j & -j \\ 0 & 0 \\ 0 & 0 \\ j & -j \\ 1 & -1 \end{bmatrix}$$

(1, 1) 14-21

$$\begin{bmatrix} W_{4,2,I}([1, 2], [1]) & 0_{2,1} \\ 0_{2,1} & W_{4,2,I}([1, 2], [2]) \\ W_{4,2,I}([3, 4], [1]) & 0_2 \\ 0_2 & W_{4,2,I}([3, 4], [2]) \end{bmatrix}$$

$$\begin{bmatrix} 1 & 0 \\ 1 & 0 \\ 0 & 1 \\ 0 & 1 \\ 1 & 0 \\ 1 & 0 \\ 0 & -1 \\ 0 & -1 \end{bmatrix}, \begin{bmatrix} 1 & 0 \\ 1 & 0 \\ 0 & 1 \\ 0 & 1 \\ j & 0 \\ j & 0 \\ 0 & -j \\ 0 & -j \end{bmatrix}, \begin{bmatrix} 1 & 0 \\ j & 0 \\ 0 & 1 \\ 0 & j \\ 1 & 0 \\ j & 0 \\ 0 & -1 \\ 0 & -j \end{bmatrix}, \begin{bmatrix} 1 & 0 \\ j & 0 \\ 0 & 1 \\ 0 & j \\ j & 0 \\ -1 & 0 \\ 0 & -j \\ 0 & 1 \end{bmatrix},$$

$$\begin{bmatrix} 1 & 0 \\ -1 & 0 \\ 0 & 1 \\ 0 & -1 \\ 1 & 0 \\ -1 & 0 \\ 0 & -1 \\ 0 & 1 \end{bmatrix}, \begin{bmatrix} 1 & 0 \\ -1 & 0 \\ 0 & 1 \\ 0 & -1 \\ j & 0 \\ -j & 0 \\ 0 & -j \\ 0 & j \end{bmatrix}, \begin{bmatrix} 1 & 0 \\ -j & 0 \\ 0 & 1 \\ 0 & -j \\ 1 & 0 \\ -j & 0 \\ 0 & -1 \\ 0 & j \end{bmatrix}, \begin{bmatrix} 1 & 0 \\ -j & 0 \\ 0 & 1 \\ 0 & -j \\ j & 0 \\ 1 & 0 \\ 0 & -j \\ 0 & -1 \end{bmatrix}$$

In one example, the two-layer codebook for Ng=2 includes all of or a subset of precoders in Table 29.

TABLE 29

| Intermediate precoding matrix W' Ng = 2 and two-layer | | | |
|---|---|---|---|
| Rank 2 | | | |
| 4Tx FC | TPMI | | |
| $(l_1, l_2)$ TPMIs (I) | index i | Intermediate precoder matrix W' | |
| (2, 0) 14-21 | 0-7 | $\begin{bmatrix} W_{2,4,I}([1\dots 4], [1, 2]) \\ 0_{4,2} \end{bmatrix} = \frac{1}{\sqrt{2}} \begin{bmatrix} \overline{W}_{2,i} \\ 0_{4\times 2} \end{bmatrix}$ | |
| (0, 2) 14-21 | 8-15 | $\begin{bmatrix} 0_{4,2} \\ W_{4,2,I}([1\dots 4], [1, 2]) \end{bmatrix} = \frac{1}{\sqrt{2}} \begin{bmatrix} 0_{4\times 2} \\ \overline{W}_{2,(i-8)} \end{bmatrix}$ | |
| (1, 1) 14-21 | 0, 1, 4, 5, 8, 9, 12, 13 | $\begin{bmatrix} W_{4,2,I}([1\dots 4], [1]) & 0_{4,1} \\ 0_{4,1} & W_{4,2,I}([1\dots 4], [2]) \end{bmatrix}$ | |

TABLE 29-continued

| Intermediate precoding matrix W' Ng = 2 and two-layer | | | |
|---|---|---|---|
| Rank 2 | | | |
| 4Tx FC | TPMI | | |
| $(l_1, l_2)$ TPMIs (I) | index i | Intermediate precoder matrix W' | |

$$= \begin{bmatrix} W_{4,1,i}([1\dots 4], [1]) & 0_{4,1} \\ 0_{4,1} & W_{4,1,i+2}([1\dots 4], [2]) \end{bmatrix}$$

$$= \frac{1}{\sqrt{2}} \begin{bmatrix} \overline{W}_{1,i} & 0_{4\times 1} \\ 0_{4\times 1} & \overline{W}_{1,i+2} \end{bmatrix}$$

In one example, a rank 2 8Tx precoder for $N_g$=2 and layer split $(l_1, l_2)$=(1, 1) is constructed based on rank 2 4Tx FC TPMIs (TPMI 14-21), where a rank 2 4Tx FC TPMI indicates a 4×2 precoding matrix denoted as $$p^2 = [p_1^2, p_2^2],$$

where $$p_i^2, i = 1, 2$$

are precoders for two layers (two columns). In particular, the precoder for group 1 and group 2 respectively $$p_{x_1}^2$$

and $$p_{x_2}^2,$$

where the layer to group mapping includes $\{(x_1, y_2)=(1, 1), (1, 2), (2, 1), (2, 2)\}$. So, the total number of 8Tx rank 2 precoding matrices for layer split $(l_1, l_2)=(1, 1)$ is $8*4=32$. The numbering scheme can be according to scheme (A) or (B), as described above.

In one example, a rank 2 8Tx precoder for $N_g=2$ and layer split $(l_1, l_2)=(1, 1)$ is constructed based on rank 1 4Tx FC TPMIs or rank 2 4Tx FC TPMIs (TPMI 14-21), in which when the same precoder is applied to the two groups, then one of the rank 1 4Tx FC TPMIs is used, and when different precoders are applied to the two groups, then one of the rank 2 4Tx FC TPMIs is used. In particular, the precoder for group 1 and group 2 respectively $$p_{x_1}^2$$

and $$p_{x_2}^2,$$

where the layer to group mapping includes $\{(x_1, y_2)=(1, 2), (2, 1)\}$. So, the total number of 8Tx rank 2 precoding matrices for layer split $(l_1, l_2)=(1, 1)$ is $16+8*2=32$. The numbering scheme can be according to scheme (A) or (B), as described above.

In one example, a rank 2 8Tx precoder for $N_g=2$ and layer split $(l_1, l_2)=(1, 1)$ is constructed based on a pair of TPMIs, a rank 2 4Tx FC TPMIs corresponding to oversampling $O_1=1$ (i.e., TPMI 14, 15, 18, 19), and the corresponding orthogonal rank 2 TPMI (e.g., TPMI pairs (14, 18), (14, 19), (15, 18), (15, 19)). In particular, the precoder for group 1 and group 2 respectively $$p_{x_1}^2$$

and $$p_{x_2}^2,$$

where the layer to group mapping includes $\{(x_1, y_2)=(1, 1), (1, 2), (2, 1), (2, 2)\}$ and an index of one of the two rank 2 TPMIs. So, the total number of 8Tx rank 2 precoding matrices for layer split $(l_1, l_2)=(1, 1)$ is $2*4=8$. The numbering scheme can be according to scheme (A) or (B), as described above.

In one example, a rank 2 8Tx precoder for $N_g=2$ and layer split $(l_1, l_2)=(1, 1)$ is constructed based on a pair of TPMIs, a rank 2 4Tx FC TPMIs corresponding to oversampling $O_1=1$ (i.e., TPMI 14, 15, 18, 19), and the corresponding orthogonal rank 2 TPMI (e.g., TPMI pairs (14, 18), (14, 19), (15, 18), (15, 19)). In particular, the precoder for group 1 and group 2 respectively $$p_{x_1}^2$$

and $$p_{x_2}^2,$$

where the layer to group mapping includes $\{(x_1, y_2)=(1_1, 1_1), (1_2, 1_2), (2_1, 2_1), (2_2, 2_2), (1_1, 2_1), (2_1, 1_1), (1_2, 2_2), (2_2, 1_2), (1_1, 2_2), (2_1, 1_2)\}$, where the notation $i_j$ indicates i-the layer (column) of the j-th of the two rank 2 TPMIs. So, the total number of 8Tx rank 2 precoding matrices for layer split $(l_1, l_2)=(1, 1)$ is $2*10=20$. The numbering scheme can be according to scheme (A) or (B), as described above.

In one example, when rank r=3, the codebook for 8 antenna ports when $N_g=2$ includes all of or at least one of the precoding matrices shown in Table 30 and Table 31. In one example, the normalized or multiplication factor $$M_3 = \frac{1}{2\sqrt{3}}$$

in the 4Tx UL precoding matrices are not included when the 8Tx precoding matrices are constructed. The tables below are according to this example. In one example, the factor $M_3$ is included, and hence in this case a multiplication factor $M_3$ is included (multiplied to) in each recoder in the tables below. In another example, a multiplication factor $$P_3 = \frac{1}{\sqrt{2}} M_3$$

is included in (multiplied to) each precoder in the tables below. In another example, a multiplication factor $$N_3 = \frac{1}{2\sqrt{6}}$$

is included in (multiplied to) each precoder in the tables below.

TABLE 30 port numbering scheme (A)

| Rank 3 4Tx FC TPMIs $(l_1, l_2)$ | (I) | 8Tx precoders | 8Tx precoders (without scaling) |
|---|---|---|---|

(3, 0), 3-6

8Tx precoders:
$$\begin{bmatrix} W_{4,3,I}([1\ldots4], [1, 2, 3]) \\ 0_{4,3} \end{bmatrix}$$

8Tx precoders (without scaling):
$$\begin{bmatrix} 1 & 1 & 1 \\ 1 & -1 & 1 \\ 1 & 1 & -1 \\ 1 & -1 & -1 \\ 0 & 0 & 0 \\ 0 & 0 & 0 \\ 0 & 0 & 0 \\ 0 & 0 & 0 \end{bmatrix},\ \begin{bmatrix} 1 & 1 & 1 \\ 1 & -1 & 1 \\ j & j & -j \\ j & -j & -j \\ 0 & 0 & 0 \\ 0 & 0 & 0 \\ 0 & 0 & 0 \\ 0 & 0 & 0 \end{bmatrix},\ \begin{bmatrix} 1 & 1 & 1 \\ -1 & 1 & -1 \\ 1 & 1 & -1 \\ -1 & 1 & 1 \\ 0 & 0 & 0 \\ 0 & 0 & 0 \\ 0 & 0 & 0 \\ 0 & 0 & 0 \end{bmatrix},\ \begin{bmatrix} 1 & 1 & 1 \\ -1 & 1 & -1 \\ j & j & -j \\ -j & j & j \\ 0 & 0 & 0 \\ 0 & 0 & 0 \\ 0 & 0 & 0 \\ 0 & 0 & 0 \end{bmatrix}$$

(0, 3), 3-6

8Tx precoders:
$$\begin{bmatrix} 0_{4,3} \\ W_{4,3,I}([1\ldots4], [1, 2, 3]) \end{bmatrix}$$

8Tx precoders (without scaling):
$$\begin{bmatrix} 0 & 0 & 0 \\ 0 & 0 & 0 \\ 0 & 0 & 0 \\ 0 & 0 & 0 \\ 1 & 1 & 1 \\ 1 & -1 & 1 \\ 1 & 1 & -1 \\ 1 & -1 & -1 \end{bmatrix},\ \begin{bmatrix} 0 & 0 & 0 \\ 0 & 0 & 0 \\ 0 & 0 & 0 \\ 0 & 0 & 0 \\ 1 & 1 & 1 \\ 1 & -1 & 1 \\ j & j & -j \\ j & -j & -j \end{bmatrix},\ \begin{bmatrix} 0 & 0 & 0 \\ 0 & 0 & 0 \\ 0 & 0 & 0 \\ 0 & 0 & 0 \\ 1 & 1 & 1 \\ -1 & 1 & -1 \\ 1 & 1 & -1 \\ -1 & 1 & 1 \end{bmatrix},\ \begin{bmatrix} 0 & 0 & 0 \\ 0 & 0 & 0 \\ 0 & 0 & 0 \\ 0 & 0 & 0 \\ 1 & 1 & 1 \\ -1 & 1 & -1 \\ j & j & -j \\ -j & j & j \end{bmatrix}$$

(2, 1), 3-6

8Tx precoders:
$$\begin{bmatrix} W_{4,3,I}([1\ldots4], [1, 2]) & 0_{4,1} \\ 0_{4,2} & W_{4,3,I}([1\ldots4], 3]) \end{bmatrix}$$

8Tx precoders (without scaling):
$$\begin{bmatrix} 1 & 1 & 1 \\ 1 & -1 & 1 \\ 1 & 1 & -1 \\ 1 & -1 & -1 \\ 0 & 0 & 1 \\ 0 & 0 & 1 \\ 0 & 0 & -1 \\ 0 & 0 & -1 \end{bmatrix},\ \begin{bmatrix} 1 & 1 & 1 \\ 1 & -1 & 1 \\ j & j & -1 \\ j & -j & -1 \\ 0 & 0 & 1 \\ 0 & 0 & 1 \\ 0 & 0 & -j \\ 0 & 0 & -j \end{bmatrix},\ \begin{bmatrix} 1 & 1 & 0 \\ -1 & 1 & 0 \\ 1 & 1 & 0 \\ -1 & 1 & 0 \\ 0 & 0 & 1 \\ 0 & 0 & -1 \\ 0 & 0 & -1 \\ 0 & 0 & 1 \end{bmatrix},\ \begin{bmatrix} 1 & 1 & 0 \\ -1 & 1 & 0 \\ j & j & 0 \\ -j & j & 0 \\ 0 & 0 & 1 \\ 0 & 0 & -1 \\ 0 & 0 & -j \\ 0 & 0 & j \end{bmatrix}$$

(1, 2), 3-6

8Tx precoders:
$$\begin{bmatrix} W_{4,3,I}([1\ldots4], [1]) & 0_{4,2} \\ 0_{4,1} & W_{4,3,I}([1\ldots4], 2, 3]) \end{bmatrix}$$

8Tx precoders (without scaling):
$$\begin{bmatrix} 1 & 0 & 0 \\ 1 & 0 & 0 \\ 1 & 0 & 0 \\ 1 & 0 & 0 \\ 0 & 1 & 1 \\ 0 & -1 & 1 \\ 0 & 1 & -1 \\ 0 & -1 & -1 \end{bmatrix},\ \begin{bmatrix} 1 & 0 & 0 \\ 1 & 0 & 0 \\ j & 0 & 0 \\ j & 0 & 0 \\ 0 & 1 & 1 \\ 0 & -1 & 1 \\ 0 & j & -j \\ 0 & -j & -j \end{bmatrix},\ \begin{bmatrix} 1 & 0 & 0 \\ -1 & 0 & 0 \\ 1 & 0 & 0 \\ -1 & 0 & 0 \\ 0 & 1 & 1 \\ 0 & 1 & -1 \\ 0 & 1 & -1 \\ 0 & 1 & 1 \end{bmatrix},\ \begin{bmatrix} 1 & 0 & 0 \\ -1 & 0 & 0 \\ j & 0 & 0 \\ -j & 0 & 0 \\ 0 & 1 & 1 \\ 0 & 1 & -1 \\ 0 & j & -j \\ 0 & 1 & 1 \end{bmatrix}$$

TABLE 31 port numbering scheme (B)

| 4Tx FC TPMIs $(l_1, l_2)$ | (I) | 8Tx precoders | 8Tx precoders (without scaling) |
|---|---|---|---|

(3, 0), 3-6

8Tx precoders:
$$\begin{bmatrix} W_{4,3,I}([1, 2], [1, 2, 3]) \\ 0_{2,3} \\ W_{4,3,I}([3, 4], [1, 2, 3]) \\ 0_{2,3} \end{bmatrix}$$

8Tx precoders (without scaling):
$$\begin{bmatrix} 1 & 1 & 1 \\ 1 & -1 & 1 \\ 0 & 0 & 0 \\ 0 & 0 & 0 \\ 1 & 1 & -1 \\ 1 & -1 & -1 \\ 0 & 0 & 0 \\ 0 & 0 & 0 \end{bmatrix},\ \begin{bmatrix} 1 & 1 & 1 \\ 1 & -1 & 1 \\ 0 & 0 & 0 \\ 0 & 0 & 0 \\ j & j & -j \\ j & -j & -j \\ 0 & 0 & 0 \\ 0 & 0 & 0 \end{bmatrix},\ \begin{bmatrix} 1 & 1 & 1 \\ -1 & 1 & -1 \\ 0 & 0 & 0 \\ 0 & 0 & 0 \\ 1 & 1 & -1 \\ -1 & 1 & 1 \\ 0 & 0 & 0 \\ 0 & 0 & 0 \end{bmatrix},\ \begin{bmatrix} 1 & 1 & 1 \\ -1 & 1 & -1 \\ 0 & 0 & 0 \\ 0 & 0 & 0 \\ j & j & -j \\ -j & j & j \\ 0 & 0 & 0 \\ 0 & 0 & 0 \end{bmatrix}$$

(0, 3), 3-6

8Tx precoders:
$$\begin{bmatrix} 0_{2,3} \\ W_{4,3,I}([1, 2], [1, 2, 3]) \\ 0_{2,3} \\ W_{4,3,I}([3, 4], [1, 2, 3]) \end{bmatrix}$$

8Tx precoders (without scaling):
$$\begin{bmatrix} 0 & 0 & 0 \\ 0 & 0 & 0 \\ 1 & 1 & 1 \\ 1 & -1 & 1 \\ 0 & 0 & 0 \\ 0 & 0 & 0 \\ 1 & 1 & -1 \\ 1 & -1 & -1 \end{bmatrix},\ \begin{bmatrix} 0 & 0 & 0 \\ 0 & 0 & 0 \\ 1 & 1 & 1 \\ 1 & -1 & 1 \\ 0 & 0 & 0 \\ 0 & 0 & 0 \\ j & j & -j \\ j & -j & -j \end{bmatrix},\ \begin{bmatrix} 0 & 0 & 0 \\ 0 & 0 & 0 \\ 1 & 1 & 1 \\ -1 & 1 & -1 \\ 0 & 0 & 0 \\ 0 & 0 & 0 \\ 1 & 1 & -1 \\ -1 & 1 & 1 \end{bmatrix},\ \begin{bmatrix} 0 & 0 & 0 \\ 0 & 0 & 0 \\ 1 & 1 & 1 \\ -1 & 1 & -1 \\ 0 & 0 & 0 \\ 0 & 0 & 0 \\ j & j & -j \\ -j & j & j \end{bmatrix}$$

TABLE 31-continued

| | | | |
|---|---|---|---|
| | | port numbering scheme (B) | |

| 4Tx FC ($l_1$, $l_2$) TPMIs (I) | 8Tx precoders | 8Tx precoders (without scaling) |
|---|---|---|
| (2, 1) 3-6 | $\begin{bmatrix} W_{4,3,I}([1,2],[1,2]) & 0_{2,1} \\ 0_{2,2} & W_{4,3,I}([1,2],[3]) \\ W_{4,3,I}([3,4],[1,2]) & 0_{2,1} \\ 0_{2,2} & W_{4,3,I}([3,4],[3]) \end{bmatrix}$ | $\begin{bmatrix} 1 & 1 & 0 \\ 1 & -1 & 0 \\ 0 & 0 & 1 \\ 0 & 0 & 1 \\ 1 & 1 & 0 \\ 1 & -1 & 0 \\ 0 & 0 & -1 \\ 0 & 0 & -1 \end{bmatrix},\begin{bmatrix} 1 & 1 & 0 \\ 1 & -1 & 0 \\ 0 & 0 & 1 \\ 0 & 0 & 1 \\ j & j & 0 \\ j & -j & 0 \\ 0 & 0 & -j \\ 0 & 0 & -j \end{bmatrix},\begin{bmatrix} 1 & 1 & 0 \\ -1 & 1 & 0 \\ 0 & 0 & 1 \\ 0 & 0 & -1 \\ 1 & 1 & 0 \\ -1 & 1 & 0 \\ 0 & 0 & -1 \\ 0 & 0 & 1 \end{bmatrix},\begin{bmatrix} 1 & 1 & 0 \\ -1 & 1 & 0 \\ 0 & 0 & 1 \\ 0 & 0 & -1 \\ j & j & 0 \\ -j & j & 0 \\ 0 & 0 & -j \\ 0 & 0 & j \end{bmatrix}$ |
| (1, 2) 3-6 | $\begin{bmatrix} W_{4,3,I}([1,2],[1]) & 0_{2,2} \\ 0_{2,1} & W_{4,3,I}([1,2],[2,3]) \\ W_{4,3,I}([3,4],[1]) & 0_{2,2} \\ 0_{2,1} & W_{4,3,I}([3,4],[2,3]) \end{bmatrix}$ | $\begin{bmatrix} 1 & 0 & 0 \\ 1 & 0 & 0 \\ 0 & 1 & 1 \\ 0 & -1 & 1 \\ 1 & 0 & 0 \\ 1 & 0 & 0 \\ 0 & 1 & -1 \\ 0 & -1 & -1 \end{bmatrix},\begin{bmatrix} 1 & 0 & 0 \\ 1 & 0 & 0 \\ 0 & 1 & 1 \\ 0 & -1 & 1 \\ j & 0 & 0 \\ j & 0 & 0 \\ 0 & j & -j \\ 0 & -j & -j \end{bmatrix},\begin{bmatrix} 1 & 0 & 0 \\ -1 & 0 & 0 \\ 0 & 1 & 1 \\ 0 & 1 & -1 \\ 1 & 0 & 0 \\ -1 & 0 & 0 \\ 0 & 1 & -1 \\ 0 & 1 & 1 \end{bmatrix},\begin{bmatrix} 1 & 0 & 0 \\ -1 & 0 & 0 \\ 0 & 1 & 1 \\ 0 & 1 & -1 \\ j & 0 & 0 \\ -j & 0 & 0 \\ 0 & j & -j \\ 0 & j & j \end{bmatrix}$ |

In one example, the three-layer codebook for Ng=2 includes all of or a subset of precoders in Table 32.

TABLE 32

| | 4Tx FC TPMIs (I) | TPMI index i | Intermediate precoder matrix W' |
|---|---|---|---|
| | Intermediate precoding matrix W' Ng = 2 and three-layer | | |
| ($l_1$, $l_2$) | | | |
| (3, 0) | 3-6 | 0-3 | $\left[\begin{array}{cc} W_{4,3,I}([1\ldots4],[1,2,3]) \\ 0_{4,3} \end{array}\right] = \frac{1}{\sqrt{2}}\left[\begin{array}{c} W_{3,i} \\ 0_{4\times3} \end{array}\right]$ |
| (0, 3) | 3-6 | 4-7 | $\left[\begin{array}{cc} 0_{4,3} \\ W_{4,3,I}([1\ldots4],[1,2,3]) \end{array}\right] = \frac{1}{\sqrt{2}}\left[\begin{array}{c} 0_{4\times3} \\ W_{3,(i-4)} \end{array}\right]$ |
| (1, 2) | | $i = (i_1, i_2)$ | $\left[\begin{array}{cc} W_{4,3,I}([1\ldots4],[1]) & 0_{4,2} \\ 0_{4,1} & W_{4,3,I}([1\ldots4],[2,3]) \end{array}\right]$ |
| | | | $= \left[\begin{array}{cc} W_{4,1,i_1}([1\ldots4],[1]) & 0_{4,2} \\ 0_{4,1} & W_{4,2,i_2}([1\ldots4],[1,2]) \end{array}\right]$ |
| | | | $= \frac{1}{\sqrt{2}}\left[\begin{array}{cc} W_{1,i_1} & 0_{4\times2} \\ 0_{4\times1} & W_{2,i_2} \end{array}\right]$ |
| (2, 1) | | $i = (i_1, i_2)$ | $\left[\begin{array}{cc} W_{4,3,I}([1\ldots4],[1,2]) & 0_{4,1} \\ 0_{4,2} & W_{4,3,I}([1\ldots4],[3]) \end{array}\right]$ |
| | | | $= \left[\begin{array}{cc} W_{4,2,i_2}([1\ldots4],[1,2]) & 0_{4,1} \\ 0_{4,2} & W_{4,1,i_1}([1\ldots4],[1]) \end{array}\right]$ |
| | | | $= \frac{1}{\sqrt{2}}\left[\begin{array}{cc} W_{2,i_2} & 0_{4\times1} \\ 0_{4\times2} & W_{1,i_1} \end{array}\right]$ |

In one example, a rank 3 8Tx precoder for $N_g$=2 and layer split $(l_1, l_2)$=(2, 1) or (1, 2) is constructed based on rank 3 4Tx FC TPMIs (TPMI 3-6), where a rank 3 4Tx FC TPMI indicates a 4×3 precoding matrix denoted as $$p^3 = [p_1^3, p_2^3, p_3^3],$$

where $$p_i^3, i = 1, 2, 3$$

are precoders for 3 layers (3 columns). In particular, any 2 out of 3 precoders are used for the group with 2 layers, and the remaining third precoder is used for the group with a layer. So, the total number of 8Tx rank 3 precoding matrices for layer split is 4*3=12. The numbering scheme can be according to scheme (A) or (B), as described above.

In one example, a rank 3 8Tx precoder for $N_g$=2 and layer split $(l_1, l_2)$=(2, 1) or (1, 2) is constructed based on rank 3 4Tx FC TPMIs (TPMI 3-6), where a rank 3 4Tx FC TPMI indicates a 4×3 precoding matrix denoted as $$p^3 = [p_1^3, p_2^3, p_3^3],$$

where $$p_i^3, i = 1, 2, 3$$

are precoders for 3 layers (3 columns). In particular, any 2 out of 3 precoders are used for the group with 2 layers, and any 1 out of 3 precoder is used for the group with a layer. So, the total number of 8Tx rank 3 precoding matrices for layer split is 4*(3+3)=24. The numbering scheme can be according to scheme (A) or (B), as described above.

In one example, when rank r=4, the codebook for 8 antenna ports when $N_g$=2 includes all of or at least one of the precoding matrices shown in Table 33 and Table 34. In one example, the normalized or multiplication factor $M_4$=¼ in the 4Tx UL precoding matrices are not included when the 8Tx precoding matrices are constructed. The tables below are according to this example. In one example, the factor $M_4$ is included, and hence in this case a multiplication factor $M_4$ is included (multiplied to) in each precoder in the tables below. In another example, a multiplication factor $$P_4 = \frac{1}{\sqrt{2}} M_4$$

52 is included in (multiplied to) each precoder in the tables below. In another example, a multiplication factor $$N_4 = \frac{1}{4\sqrt{2}}$$

is included in (multiplied to) each precoder in the tables below.

TABLE 33

| | | port numbering scheme (A) | |
|---|---|---|---|
| Rank 4 4Tx FC TPMIs $(l_1, l_2)$ | (I) | 8Tx precoders | 8Tx precoders (without scaling) |
| (4, 0) | 3-4 | $\begin{bmatrix} W_{4,4,I}([1...4],[1,...,4]) \\ 0_{4,4} \end{bmatrix}$ | $\begin{bmatrix} 1 & 1 & 1 & 1 \\ 1 & -1 & 1 & -1 \\ 1 & 1 & -1 & -1 \\ 1 & -1 & -1 & 1 \\ 0 & 0 & 0 & 0 \\ 0 & 0 & 0 & 0 \\ 0 & 0 & 0 & 0 \\ 0 & 0 & 0 & 0 \end{bmatrix},\begin{bmatrix} 1 & 1 & 1 & 1 \\ 1 & -1 & 1 & -1 \\ j & j & -j & -j \\ j & -j & -j & j \\ 0 & 0 & 0 & 0 \\ 0 & 0 & 0 & 0 \\ 0 & 0 & 0 & 0 \\ 0 & 0 & 0 & 0 \end{bmatrix}$ |
| (0, 4) | 3-4 | $\begin{bmatrix} 0_{4,4} \\ W_{4,4,I}([1...4],[1,...,4]) \end{bmatrix}$ | $\begin{bmatrix} 0 & 0 & 0 & 0 \\ 0 & 0 & 0 & 0 \\ 0 & 0 & 0 & 0 \\ 0 & 0 & 0 & 0 \\ 1 & 1 & 1 & 1 \\ 1 & -1 & 1 & -1 \\ 1 & 1 & -1 & -1 \\ 1 & -1 & -1 & 1 \end{bmatrix},\begin{bmatrix} 0 & 0 & 0 & 0 \\ 0 & 0 & 0 & 0 \\ 0 & 0 & 0 & 0 \\ 0 & 0 & 0 & 0 \\ 1 & 1 & 1 & 1 \\ 1 & -1 & 1 & -1 \\ j & j & -j & -j \\ j & -j & -j & j \end{bmatrix}$ |
| (3, 1) | 3-4 | $\begin{bmatrix} W_{4,4,I}([1...4],[1,2,3]) & 0_{4,1} \\ 0_{4,3} & W_{4,4,I}([1...4],4) \end{bmatrix}$ | $\begin{bmatrix} 1 & 1 & 1 & 0 \\ 1 & -1 & 1 & 0 \\ 1 & 1 & -1 & 0 \\ 1 & -1 & -1 & 0 \\ 0 & 0 & 0 & 1 \\ 0 & 0 & 0 & -1 \\ 0 & 0 & 0 & -1 \\ 0 & 0 & 0 & 1 \end{bmatrix},\begin{bmatrix} 1 & 1 & 1 & 0 \\ 1 & -1 & 1 & 0 \\ j & j & -j & 0 \\ j & -j & -j & 0 \\ 0 & 0 & 0 & 1 \\ 0 & 0 & 0 & -1 \\ 0 & 0 & 0 & -j \\ 0 & 0 & 0 & j \end{bmatrix}$ |
| (1, 3) | 3-4 | $\begin{bmatrix} W_{4,3,I}([1...4],[1]) & 0_{4,3} \\ 0_{4,1} & W_{4,4,I}([1...4],[2,3,4]) \end{bmatrix}$ | $\begin{bmatrix} 1 & 0 & 0 & 0 \\ 1 & 0 & 0 & 0 \\ 1 & 0 & 0 & 0 \\ 1 & 0 & 0 & 0 \\ 0 & 1 & 1 & 1 \\ 0 & -1 & 1 & -1 \\ 0 & 1 & -1 & -1 \\ 0 & -1 & -1 & 1 \end{bmatrix},\begin{bmatrix} 1 & 0 & 0 & 0 \\ 1 & 0 & 0 & 0 \\ j & 0 & 0 & 0 \\ j & 0 & 0 & 0 \\ 0 & 1 & 1 & 1 \\ 0 & -1 & 1 & -1 \\ 0 & j & -j & -j \\ 0 & -j & -j & j \end{bmatrix}$ |
| (2, 2) | 3-4 | $\begin{bmatrix} W_{4,4,I}([1...4],[1,2]) & 0_{4,2} \\ 0_{4,2} & W_{4,4,I}([1...4],[3,4]) \end{bmatrix}$ | $\begin{bmatrix} 1 & 1 & 0 & 0 \\ 1 & -1 & 0 & 0 \\ 1 & 1 & 0 & 0 \\ 1 & -1 & 0 & 0 \\ 0 & 0 & 1 & 1 \\ 0 & 0 & 1 & -1 \\ 0 & 0 & -1 & -1 \\ 0 & 0 & -1 & 1 \end{bmatrix},\begin{bmatrix} 1 & 1 & 0 & 0 \\ 1 & -1 & 0 & 0 \\ j & j & 0 & 0 \\ j & -j & 0 & 0 \\ 0 & 0 & 1 & 1 \\ 0 & 0 & 1 & -1 \\ 0 & 0 & -j & -j \\ 0 & 0 & -j & j \end{bmatrix}$ |

TABLE 34

| | | | port numbering scheme (B) | | | | | | | | | |
|---|---|---|---|---|---|---|---|---|---|---|---|---|

4Tx FC $(l_1, l_2)$ TPMIs (I)    8Tx precoders        8Tx precoders (without scaling)

(4, 0) 3-4

$$\begin{bmatrix} W_{4,4,I}([1, 2], [1, ..., 4]) \\ 0_{2,4} \\ W_{4,4,I}([3, 4], [1, ..., 4]) \\ 0_{2,4} \end{bmatrix} \begin{bmatrix} 1 & 1 & 1 & 1 \\ 1 & -1 & 1 & -1 \\ 0 & 0 & 0 & 0 \\ 0 & 0 & 0 & 0 \\ 1 & 1 & -1 & -1 \\ 1 & -1 & -1 & 1 \\ 0 & 0 & 0 & 0 \\ 0 & 0 & 0 & 0 \end{bmatrix}, \begin{bmatrix} 1 & 1 & 1 & 1 \\ 1 & -1 & 1 & -1 \\ 0 & 0 & 0 & 0 \\ 0 & 0 & 0 & 0 \\ j & j & -j & -j \\ j & -j & -j & j \\ 0 & 0 & 0 & 0 \\ 0 & 0 & 0 & 0 \end{bmatrix}$$

(0, 4) 3-4

$$\begin{bmatrix} 0_{2,4} \\ W_{4,4,I}([1, 2], [1, ..., 4]) \\ 0_{2,4} \\ W_{4,4,I}([3, 4], [1, ..., 4]) \end{bmatrix} \begin{bmatrix} 0 & 0 & 0 & 0 \\ 0 & 0 & 0 & 0 \\ 1 & 1 & 1 & 1 \\ 1 & -1 & 1 & -1 \\ 0 & 0 & 0 & 0 \\ 0 & 0 & 0 & 0 \\ 1 & 1 & -1 & -1 \\ 1 & -1 & -1 & 1 \end{bmatrix}, \begin{bmatrix} 0 & 0 & 0 & 0 \\ 0 & 0 & 0 & 0 \\ 1 & 1 & 1 & 1 \\ 1 & -1 & 1 & -1 \\ 0 & 0 & 0 & 0 \\ 0 & 0 & 0 & 0 \\ j & j & -j & -j \\ j & -j & -j & j \end{bmatrix}$$

(3, 1) 3-4

$$\begin{bmatrix} W_{4,4,I}([1, 2], [1, 2, 3]) & 0_{2,1} \\ 0_{2,3} & W_{4,4,I}([1, 2], [4]) \\ W_{4,4,I}([3, 4], [1, 2, 3]) & 0_{2,1} \\ 0_{2,3} & W_{4,4,I}([3, 4], [4]) \end{bmatrix} \begin{bmatrix} 1 & 1 & 1 & 0 \\ 1 & -1 & 1 & 0 \\ 0 & 0 & 0 & -1 \\ 0 & 0 & 0 & 1 \\ 1 & 1 & -1 & -1 \\ 1 & -1 & -1 & 0 \\ 0 & 0 & 0 & -1 \\ 0 & 0 & 0 & 1 \end{bmatrix}, \begin{bmatrix} 1 & 1 & 1 & 0 \\ 1 & -1 & 1 & 0 \\ 0 & 0 & 0 & -1 \\ 0 & 0 & 0 & -1 \\ j & j & -j & 0 \\ j & -j & -j & 0 \\ 0 & 0 & 0 & -j \\ 0 & 0 & 0 & j \end{bmatrix}$$

(1, 3) 3-4

$$\begin{bmatrix} W_{4,4,I}([1, 2], [1]) & 0_{2,3} \\ 0_{2,1} & W_{4,4,I}([1, 2], [2, 3, 4]) \\ W_{4,3,I}([3, 4], [1]) & 0_{2,3} \\ 0_{2,1} & W_{4,4,I}([3, 4], [2, 3, 4]) \end{bmatrix} \begin{bmatrix} 0 & 0 & 0 & 1 \\ 0 & 0 & 0 & -1 \\ 1 & 1 & 1 & 0 \\ 1 & -1 & 1 & 0 \\ 0 & 0 & 0 & -1 \\ 0 & 0 & 0 & 1 \\ 1 & 1 & -1 & 0 \\ 1 & -1 & -1 & 0 \end{bmatrix} \begin{bmatrix} 0 & 0 & 0 & 1 \\ 0 & 0 & 0 & -1 \\ 1 & 1 & 1 & 0 \\ 1 & -1 & 1 & 0 \\ 0 & 0 & 0 & -j \\ 0 & 0 & 0 & j \\ j & j & -j & 0 \\ j & -j & -j & 0 \end{bmatrix}$$

(2, 2) 3-4

$$\begin{bmatrix} W_{4,4,I}([1, 2], [1, 2]) & 0_{2,2} \\ 0_{2,2} & W_{4,4,I}([1, 2], [3, 4]) \\ W_{4,4,I}([3, 4], [1, 2]) & 0_{2,2} \\ 0_{2,2} & W_{4,4,I}([3, 4], [3, 4]) \end{bmatrix} \begin{bmatrix} 1 & 1 & 0 & 0 \\ 1 & -1 & 0 & 0 \\ 0 & 0 & 1 & 1 \\ 0 & 0 & 1 & -1 \\ 1 & 1 & 0 & 0 \\ 1 & -1 & 0 & 0 \\ 0 & 0 & -1 & -1 \\ 0 & 0 & -1 & 1 \end{bmatrix}, \begin{bmatrix} 1 & 1 & 0 & 0 \\ 1 & -1 & 0 & 0 \\ 0 & 0 & 1 & 1 \\ 0 & 0 & 1 & -1 \\ j & j & 0 & 0 \\ j & -j & 0 & 0 \\ 0 & 0 & -j & -j \\ 0 & 0 & -j & j \end{bmatrix}$$

In one example, the four-layer codebook for Ng=2 includes all of or a subset of precoders in Table 35.

TABLE 35

| | | | Intermediate precoding matrix W' Ng = 2 and four-layer | |
|---|---|---|---|---|
| 4Tx FC $(l_1, l_2)$ TPMIs (I) | TPMI index i | Intermediate precoder matrix W' | | |
| (4, 0) | 3-4 | 0-1 | $\begin{bmatrix} W_{4,4,I}([1...4], [1, ..., 4]) \\ 0_{4,4} \end{bmatrix} = \dfrac{1}{\sqrt{2}} \begin{bmatrix} \overline{W}_{4,i} \\ \overline{W}_{4\times4} \end{bmatrix}$ | |
| (0, 4) | 3-4 | 2-3 | $\begin{bmatrix} 0_{4,4} \\ W_{4,4,I}([1...4], [1, ..., 4]) \end{bmatrix} = \dfrac{1}{\sqrt{2}} \begin{bmatrix} 0_{4\times4} \\ \overline{W}_{4,(i-2)} \end{bmatrix}$ | |

TABLE 35-continued

| | | | Intermediate precoding matrix W' Ng = 2 and four-layer | |
|---|---|---|---|---|
| 4Tx FC $(l_1, l_2)$ TPMIs (I) | TPMI index i | Intermediate precoder matrix W' | | |
| (2, 2) | | i = $(i_1, i_2)$ | $\begin{bmatrix} W_{4,4,I}([1...4], [1, 2]) & 0_{4,2} \\ 0_{4,2} & W_{4,4,I}([1...4], [3, 4]) \end{bmatrix}$ | |
| | | | $= \begin{bmatrix} W_{4,2,i_1}([1...4], [1, 2]) & 0_{4,2} \\ 0_{4,2} & W_{4,2,i_2}([1...4], [1, 2]) \end{bmatrix}$ | |
| | | | $= \dfrac{1}{\sqrt{2}} \begin{bmatrix} W_{2,i_1} & 0_{4\times2} \\ 0_{4\times2} & W_{2,i_2} \end{bmatrix}$ | |

In one example, a rank 4 8Tx precoder for $N_g$=2 and layer split $(l_1, l_2)$=(2, 2) is constructed based on rank 4 4Tx FC TPMIs (TPMI 3-4), where a rank 4 4Tx FC TPMI indicates a 4×4 precoding matrix denoted as $$p^4 = [p_1^4, p_2^4, p_3^4, p_4^4],$$

where $$p_i^4, i = 1, 2, 3, 4$$

are precoders for 4 layers (4 columns). In particular, any 2 out of 4 precoders are used for one of the 2 groups, and the remaining 2 precoders are used for the other group. So, the total number of 8Tx rank 4 precoding matrices for layer split is 2*6=12. The numbering scheme can be according to scheme (A) or (B), as described above.

In one example, a rank 4 8Tx precoder for $N_g$=2 and layer split $(l_1, l_2)$=(2, 2) is constructed based on rank 4 4Tx FC TPMIs (TPMI 3-4), where a rank 4 4Tx FC TPMI indicates a 4×4 precoding matrix denoted as $$p^4 = [p_1^4, p_2^4, p_3^4, p_4^4],$$

where $$p_i^4, i = 1, 2, 3, 4$$

are precoders for 4 layers (4 columns). In particular, any 2 out of 4 precoders are used for one of the 2 groups, and any 2 out of 4 precoders are used for the other group. So, the total number of 8Tx rank 4 precoding matrices for layer split is 2*(6+6)=24. The numbering scheme can be according to scheme (A) or (B), as described above.

In one example, when rank r=5, the codebook for 8 antenna ports when $N_g$=2 includes all of or at least one of the precoding matrices shown in Table 36 and Table 37. In one example, the normalized or multiplication factor $M_4$=¼ in the 4Tx UL precoding matrices are not included when the 8Tx precoding matrices are constructed. The tables below are according to this example. In one example, the factor $M_4$ is included, and hence in this case a multiplication factor $M_4$ is included (multiplied to) in each precoder in the tables below. In another example, a multiplication factor $$P_5 = \frac{\sqrt{2}}{\sqrt{5}} M_4$$

is included in (multiplied to) each precoder in the tables below. In another example, a multiplication factor $$N_5 = \frac{1}{2\sqrt{10}}$$

is included in (multiplied to) each precoder in the tables below.

TABLE 36

| | | port numbering scheme (A) | |
|---|---|---|---|
| $(l_1, l_2)$ | Rank 4 4Tx FC TPMIs (I) | 8Tx precoders | 8Tx precoders (without scaling) |
| (4, 1) | 3-4 | $\begin{bmatrix} W_{4,4,I}([1...4], [1, ..., 4]) & 0_{4,1} \\ 0_{4,4} & W_{4,4,I}([1...4], [1]) \end{bmatrix}$ | $\begin{bmatrix} 1 & 1 & 1 & 1 & 0 \\ 1 & -1 & 1 & -1 & 0 \\ 1 & 1 & -1 & -1 & 0 \\ 1 & -1 & -1 & 1 & 0 \\ 0 & 0 & 0 & 0 & 1 \\ 0 & 0 & 0 & 0 & 1 \\ 0 & 0 & 0 & 0 & 1 \\ 0 & 0 & 0 & 0 & 1 \end{bmatrix},\ \begin{bmatrix} 1 & 1 & 1 & 1 & 0 \\ 1 & -1 & 1 & -1 & 0 \\ j & j & -j & -j & 0 \\ j & -j & -j & j & 0 \\ 0 & 0 & 0 & 0 & 1 \\ 0 & 0 & 0 & 0 & 1 \\ 0 & 0 & 0 & 0 & j \\ 0 & 0 & 0 & 0 & j \end{bmatrix}$ |
| (1, 4) | 3-4 | $\begin{bmatrix} W_{4,4,I}([1...4], [1]) & 0_{4,4} \\ 0_{4,1} & W_{4,4,I}([1...4], [1, ..., 4]) \end{bmatrix}$ | $\begin{bmatrix} 1 & 0 & 0 & 0 & 0 \\ 1 & 0 & 0 & 0 & 0 \\ 1 & 0 & 0 & 0 & 0 \\ 1 & 0 & 0 & 0 & 0 \\ 0 & 1 & 1 & 1 & 1 \\ 0 & 1 & -1 & 1 & -1 \\ 0 & 1 & 1 & -1 & -1 \\ 0 & 1 & -1 & -1 & 1 \end{bmatrix},\ \begin{bmatrix} 1 & 0 & 0 & 0 & 0 \\ 1 & 0 & 0 & 0 & 0 \\ j & 0 & 0 & 0 & 0 \\ j & 0 & 0 & 0 & 0 \\ 0 & 1 & 1 & 1 & 1 \\ 0 & 1 & -1 & 1 & -1 \\ 0 & j & j & -j & -j \\ 0 & j & -j & -j & j \end{bmatrix}$ |
| (3, 2) | 3-4 | $\begin{bmatrix} W_{4,4,I}([1...4], [1, 2, 3]) & 0_{4,2} \\ 0_{4,3} & W_{4,4,I}([1...4], [3, 4]) \end{bmatrix}$ | $\begin{bmatrix} 1 & 1 & 1 & 0 & 0 \\ 1 & -1 & 1 & 0 & 0 \\ 1 & 1 & -1 & 0 & 0 \\ 1 & -1 & -1 & 0 & 0 \\ 0 & 0 & 0 & 1 & 1 \\ 0 & 0 & 0 & 1 & -1 \\ 0 & 0 & 0 & -1 & -1 \\ 0 & 0 & 0 & -1 & 1 \end{bmatrix},\ \begin{bmatrix} 1 & 1 & 1 & 0 & 0 \\ 1 & -1 & 1 & 0 & 0 \\ j & j & -j & 0 & 0 \\ j & -j & -j & 0 & 0 \\ 0 & 0 & 0 & 1 & 1 \\ 0 & 0 & 0 & 1 & -1 \\ 0 & 0 & 0 & -j & -j \\ 0 & 0 & 0 & -j & j \end{bmatrix}$ |

TABLE 36-continued port numbering scheme (A)

| Rank 4 4Tx $(l_1, l_2)$ FC TPMIs (I) 8Tx precoders | 8Tx precoders (without scaling) |
|---|---|
| (2,3) 3-4 $\begin{bmatrix} W_{4,4,I}([1\ldots4], [1, 2]) & 0_{4,3} \\ 0_{4,2} & W_{4,4,I}([1\ldots4], [2, 3, 4]) \end{bmatrix}$ | $\begin{bmatrix} 1 & 1 & 0 & 0 & 0 \\ 1 & -1 & 0 & 0 & 0 \\ 1 & 1 & 0 & 0 & 0 \\ 1 & -1 & 0 & 0 & 0 \\ 0 & 0 & 1 & 1 & 1 \\ 0 & 0 & -1 & 1 & -1 \\ 0 & 0 & 1 & -1 & -1 \\ 0 & 0 & -1 & -1 & 1 \end{bmatrix}, \begin{bmatrix} 1 & 1 & 0 & 0 & 0 \\ 1 & -1 & 0 & 0 & 0 \\ j & j & 0 & 0 & 0 \\ j & -j & 0 & 0 & 0 \\ 0 & 0 & 1 & 1 & 1 \\ 0 & 0 & -1 & 1 & -1 \\ 0 & 0 & j & -j & -j \\ 0 & 0 & -j & -j & j \end{bmatrix}$ |

TABLE 37 port numbering scheme (B)

| $(l_1, l_2)$ 4Tx FC TPMIs (I) 8Tx precoders | 8Tx precoders (without scaling) |
|---|---|
| (4, 1) 3-4 $\begin{bmatrix} W_{4,4,I}([1, 2], [1, \ldots, 4]) & 0_{2,1} \\ 0_{2,4} & W_{4,4,I}([1, 2], [1]) \\ W_{4,4,I}([3, 4], [1, \ldots, 4]) & 0_{2,1} \\ 0_{2,4} & W_{4,4,I}([3, 4], [1]) \end{bmatrix}$ | $\begin{bmatrix} 1 & 1 & 1 & 1 & 0 \\ 1 & -1 & 1 & -1 & 0 \\ 0 & 0 & 0 & 0 & 1 \\ 0 & 0 & 0 & 0 & 1 \\ 1 & 1 & -1 & -1 & 0 \\ 1 & -1 & -1 & 1 & 0 \\ 0 & 0 & 0 & 0 & 1 \\ 0 & 0 & 0 & 0 & 1 \end{bmatrix}, \begin{bmatrix} 1 & 1 & 1 & 1 & 0 \\ 1 & -1 & 1 & -1 & 0 \\ 0 & 0 & 0 & 0 & 1 \\ 0 & 0 & 0 & 0 & 1 \\ j & j & -j & -j & 0 \\ j & -j & -j & j & 0 \\ 0 & 0 & 0 & 0 & j \\ 0 & 0 & 0 & 0 & j \end{bmatrix}$ |
| (1, 4) 3-4 $\begin{bmatrix} W_{4,4,I}([1, 2], [1]) & 0_{2,4} \\ 0_{2,1} & W_{4,4,I}([1, 2], [1, \ldots, 4]) \\ W_{4,4,I}([3, 4], [1]) & 0_{2,4} \\ 0_{2,1} & W_{4,4,I}([3, 4], [1, \ldots, 4]) \end{bmatrix}$ | $\begin{bmatrix} 1 & 0 & 0 & 0 & 0 \\ 1 & 0 & 0 & 0 & 0 \\ 0 & 1 & 1 & 1 & 1 \\ 0 & 1 & -1 & 1 & -1 \\ 1 & 0 & 0 & 0 & 0 \\ 1 & 0 & 0 & 0 & 0 \\ 0 & 1 & 1 & -1 & -1 \\ 0 & 1 & -1 & -1 & 1 \end{bmatrix}, \begin{bmatrix} 1 & 0 & 0 & 0 & 0 \\ 1 & 0 & 0 & 0 & 0 \\ 0 & 1 & 1 & 1 & 1 \\ 0 & 1 & -1 & 1 & -1 \\ j & 0 & 0 & 0 & 0 \\ j & 0 & 0 & 0 & 0 \\ 0 & j & j & -j & -j \\ 0 & j & -j & -j & j \end{bmatrix}$ |
| (3, 2) 3-4 $\begin{bmatrix} W_{4,4,I}([1, 2], [1, 2, 3]) & 0_{2,2} \\ 0_{2,3} & W_{4,4,I}([1, 2], [3, 4]) \\ W_{4,4,I}([3, 4], [1, 2, 3]) & 0_{2,2} \\ 0_{2,3} & W_{4,4,I}([3, 4], [3, 4]) \end{bmatrix}$ | $\begin{bmatrix} 1 & 1 & 1 & 1 & 0 \\ 1 & -1 & 1 & 0 & 0 \\ 0 & 0 & 0 & 1 & 1 \\ 0 & 0 & 0 & 1 & -1 \\ 1 & 1 & -1 & 0 & 0 \\ 1 & -1 & -1 & 0 & 0 \\ 0 & 0 & 0 & -1 & -1 \\ 0 & 0 & 0 & -1 & 1 \end{bmatrix}, \begin{bmatrix} 1 & 1 & 1 & 1 & 0 \\ 1 & -1 & 1 & 0 & 0 \\ 0 & 0 & 0 & 1 & 1 \\ 0 & 0 & 0 & 1 & -1 \\ j & j & -j & 0 & 0 \\ j & -j & -j & 0 & 0 \\ 0 & 0 & 0 & -j & -j \\ 0 & 0 & 0 & -j & j \end{bmatrix}$ |
| (2, 3) 3-4 $\begin{bmatrix} W_{4,4,I}([1, 2], [1, 2]) & 0_{2,3} \\ 0_{2,2} & W_{4,4,I}([1, 2], [2, 3, 4]) \\ W_{4,4,I}([3, 4], [1, 2]) & 0_{2,3} \\ 0_{2,2} & W_{4,4,I}([3, 4], [2, 3, 4]) \end{bmatrix}$ | $\begin{bmatrix} 1 & 1 & 0 & 0 & 0 \\ 1 & -1 & 0 & 0 & 0 \\ 0 & 0 & 1 & 1 & 1 \\ 0 & 0 & -1 & 1 & -1 \\ 1 & 1 & 0 & 0 & 0 \\ 1 & -1 & 0 & 0 & 0 \\ 0 & 0 & 1 & -1 & -1 \\ 0 & 0 & -1 & -1 & 1 \end{bmatrix}, \begin{bmatrix} 1 & 1 & 0 & 0 & 0 \\ 1 & -1 & 0 & 0 & 0 \\ 0 & 0 & 1 & 1 & 1 \\ 0 & 0 & -1 & 1 & -1 \\ j & j & 0 & 0 & 0 \\ j & -j & 0 & 0 & 0 \\ 0 & 0 & j & -j & -j \\ 0 & 0 & -j & -j & j \end{bmatrix}$ |

In one example, a rank 5 8Tx precoder for $N_g=2$ and layer split $(l_1, l_2)=(2, 3)$ or $(3, 2)$ is constructed based on rank 4 4Tx FC TPMIs (TPMI 3-4), where a rank 4 4Tx FC TPMI indicates a 4×4 precoding matrix denoted as $$p^4 = [p_1^4, p_2^4, p_3^4, p_4^4],$$

where $$p_i^4, i =1, 2, 3, 4$$

are precoders for 4 layers (4 columns). In particular, any 3 out of 4 precoders are used for the group with 3 layers, and the remaining 1 precoder and it's corresponding orthogonal precoder (e.g., based on rank 2 4Tx FC TPMIs) are used for the other group with 2 layers. So, the total number of 8Tx rank 5 precoding matrices for layer split is 2*3=6. The numbering scheme can be according to scheme (A) or (B), as described above.

In one example, a rank 5 8Tx precoder for $N_g=2$ and layer split $(l_1, l_2)=(2, 3)$ or $(3, 2)$ is constructed based on rank 4 4Tx FC TPMIs (TPMI 3-4), where a rank 4 4Tx FC TPMI indicates a 4×4 precoding matrix denoted as $$p^4 = [p_1^4, p_2^4, p_3^4, p_4^4],$$

where $$p_i^4, i = 1, 2, 3, 4$$

are precoders for 4 layers (4 columns). In particular, any 3 out of 4 precoders are used for the group with 3 layers, and any 2 out of 4 precoders are used for the other group. So, the total number of 8Tx rank 5 precoding matrices for layer split is 2*(3+6)=18. The numbering scheme can be according to scheme (A) or (B), as described above.

In one example, when rank r=6, the codebook for 8 antenna ports when $N_g=2$ includes all of or at least one of the precoding matrices shown in Table 38 and Table 39. In one example, the normalized or multiplication factor $M_4=\frac{1}{4}$ in the 4Tx UL precoding matrices are not included when the 8Tx precoding matrices are constructed. The tables below are according to this example. In one example, the factor $M_4$ is included, and hence in this case a multiplication factor $M_4$ is included (multiplied to) in each precoder in the tables below. In another example, a multiplication factor $$P_6 = \frac{1}{\sqrt{3}} M_4$$

is included in (multiplied to) each precoder in the tables below. In another example, a multiplication factor $$N_6 = \frac{1}{4\sqrt{3}}$$

is included in (multiplied to) each precoder in the tables below.

TABLE 38

| | | | port numbering scheme (A) | |
|---|---|---|---|---|
| Rank 4 4Tx FC TPMIs $(l_1, l_2)$ | (I) | 8Tx precoders | | 8Tx precoders (without scaling) |
| (4, 2) | 3-4 | $\begin{bmatrix} W_{4,4,I}([1...4], [1, ..., 4]) & 0_{4,2} \\ 0_{4,4} & W_{4,4,I}([1...4], [1, 2]) \end{bmatrix}$ | $\begin{bmatrix} 1 & 1 & 1 & 1 & 0 & 0 \\ 1 & -1 & 1 & -1 & 0 & 0 \\ 1 & 1 & -1 & -1 & 0 & 0 \\ 1 & -1 & -1 & 1 & 0 & 0 \\ 0 & 0 & 0 & 0 & 1 & 1 \\ 0 & 0 & 0 & 0 & 1 & -1 \\ 0 & 0 & 0 & 0 & 1 & 1 \\ 0 & 0 & 0 & 0 & 1 & -1 \end{bmatrix}$ | $\begin{bmatrix} 1 & 1 & 1 & 1 & 0 & 0 \\ 1 & -1 & 1 & -1 & 0 & 0 \\ j & j & -j & -j & 0 & 0 \\ j & -j & -j & j & 0 & 0 \\ 0 & 0 & 0 & 0 & 1 & 1 \\ 0 & 0 & 0 & 0 & 1 & -1 \\ 0 & 0 & 0 & 0 & j & j \\ 0 & 0 & 0 & 0 & j & -j \end{bmatrix}$ |
| (2, 4) | 3-4 | $\begin{bmatrix} W_{4,4,I}([1...4], [1, 2]) & 0_{4,4} \\ 0_{4,2} & W_{4,4,I}([1...4], [1, ..., 4]) \end{bmatrix}$ | $\begin{bmatrix} 1 & 1 & 0 & 0 & 0 & 0 \\ 1 & -1 & 0 & 0 & 0 & 0 \\ 1 & 1 & 0 & 0 & 0 & 0 \\ 1 & -1 & 0 & 0 & 0 & 0 \\ 0 & 0 & 1 & 1 & 1 & 1 \\ 0 & 0 & 1 & -1 & 1 & -1 \\ 0 & 0 & 1 & 1 & -1 & -1 \\ 0 & 0 & 1 & -1 & -1 & 1 \end{bmatrix}$ | $\begin{bmatrix} 1 & 1 & 0 & 0 & 0 & 0 \\ 1 & -1 & 0 & 0 & 0 & 0 \\ j & j & 0 & 0 & 0 & 0 \\ j & -j & 0 & 0 & 0 & 0 \\ 0 & 0 & 1 & 1 & 1 & 1 \\ 0 & 0 & 1 & -1 & 1 & -1 \\ 0 & 0 & j & j & -j & -j \\ 0 & 0 & j & -j & -j & j \end{bmatrix}$ |
| (3, 3) | 3-4 | $\begin{bmatrix} W_{4,4,I}([1...4], [1, 2, 3]) & 0_{4,3} \\ 0_{4,3} & W_{4,4,I}([1...4], [2, 3, 4]) \end{bmatrix}$ | $\begin{bmatrix} 1 & 1 & 1 & 0 & 0 & 0 \\ 1 & -1 & 1 & 0 & 0 & 0 \\ 1 & 1 & -1 & 0 & 0 & 0 \\ 1 & -1 & -1 & 0 & 0 & 0 \\ 0 & 0 & 0 & 1 & 1 & 1 \\ 0 & 0 & 0 & -1 & 1 & -1 \\ 0 & 0 & 0 & 1 & -1 & -1 \\ 0 & 0 & 0 & -1 & -1 & 1 \end{bmatrix}$ | $\begin{bmatrix} 1 & 1 & 1 & 0 & 0 & 0 \\ 1 & -j & 1 & 0 & 0 & 0 \\ j & j & -j & 0 & 0 & 0 \\ j & -j & -j & 0 & 0 & 0 \\ 0 & 0 & 0 & 1 & 1 & 1 \\ 0 & 0 & 0 & -1 & 1 & -1 \\ 0 & 0 & 0 & j & -j & -j \\ 0 & 0 & 0 & -j & -j & j \end{bmatrix}$ |

TABLE 39 port numbering scheme (B)

| $(l_1, l_2)$ | 4Tx FC TPMIs (I) | 8Tx precoders | 8Tx precoders (without scaling) |
|---|---|---|---|
| (4, 2) | 3-4 | $\begin{bmatrix} W_{4,4,I}([1,2],[1,\ldots,4]) & 0_{2,2} \\ 0_{2,4} & W_{4,4,I}([1,2],[1,2]) \\ W_{4,4,I}([3,4],[1,\ldots,4]) & 0_{2,2} \\ 0_{2,4} & W_{4,4,I}([3,4],[1,2]) \end{bmatrix}$ | $\begin{bmatrix} 1 & 1 & 1 & 1 & 0 & 0 \\ 1 & -1 & 1 & -1 & 0 & 0 \\ 0 & 0 & 0 & 0 & 1 & 1 \\ 0 & 0 & 0 & 0 & 1 & -1 \\ 1 & 1 & -1 & -1 & 0 & 0 \\ 1 & -1 & -1 & 1 & 0 & 0 \\ 0 & 0 & 0 & 0 & 1 & 1 \\ 0 & 0 & 0 & 0 & 1 & -1 \end{bmatrix}$ | $\begin{bmatrix} 1 & 1 & 1 & 1 & 0 & 0 \\ 1 & -1 & 1 & -1 & 0 & 0 \\ 0 & 0 & 0 & 0 & 1 & 1 \\ 0 & 0 & 0 & 0 & 1 & -1 \\ j & j & -j & -j & 0 & 0 \\ j & -j & -j & j & 0 & 0 \\ 0 & 0 & 0 & 0 & j & j \\ 0 & 0 & 0 & 0 & j & -j \end{bmatrix}$ |
| (2, 4) | 3-4 | $\begin{bmatrix} W_{4,4,I}([1,2],[1,2]) & 0_{2,4} \\ 0_{2,2} & W_{4,4,I}([1,2],[1,\ldots,4]) \\ W_{4,4,I}([3,4],[1,2]) & 0_{2,4} \\ 0_{2,2} & W_{4,4,I}([3,4],[1,\ldots,4]) \end{bmatrix}$ | $\begin{bmatrix} 1 & 1 & 0 & 0 & 0 & 0 \\ 1 & -1 & 0 & 0 & 0 & 0 \\ 0 & 0 & 1 & 1 & 1 & 1 \\ 0 & 0 & 1 & -1 & 1 & -1 \\ 1 & 1 & 0 & 0 & 0 & 0 \\ 1 & -1 & 0 & 0 & 0 & 0 \\ 0 & 0 & 1 & 1 & -1 & -1 \\ 0 & 0 & 1 & -1 & -1 & 1 \end{bmatrix}$ | $\begin{bmatrix} 1 & 1 & 0 & 0 & 0 & 0 \\ 1 & -1 & 0 & 0 & 0 & 0 \\ 0 & 0 & 1 & 1 & 1 & 1 \\ 0 & 0 & 1 & -1 & 1 & -1 \\ j & j & 0 & 0 & 0 & 0 \\ j & -j & 0 & 0 & 0 & 0 \\ 0 & 0 & j & j & -j & -j \\ 0 & 0 & j & -j & -j & j \end{bmatrix}$ |
| (3, 3) | 3-4 | $\begin{bmatrix} W_{4,4,I}([1,2],[1,2,3]) & 0_{2,3} \\ 0_{2,3} & W_{4,4,I}([1,2],[2,3,4]) \\ W_{4,4,I}([3,4],[1,2,3]) & 0_{2,3} \\ 0_{2,3} & W_{4,4,I}([3,4],[2,3,4]) \end{bmatrix}$ | $\begin{bmatrix} 1 & 1 & 1 & 0 & 0 & 0 \\ 1 & -1 & 1 & 0 & 0 & 0 \\ 0 & 0 & 0 & 1 & 1 & 1 \\ 0 & 0 & 0 & -1 & 1 & -1 \\ 1 & 1 & -1 & 0 & 0 & 0 \\ 1 & -1 & -1 & 0 & 0 & 0 \\ 0 & 0 & 0 & 1 & -1 & -1 \\ 0 & 0 & 0 & -1 & -1 & 1 \end{bmatrix}$ | $\begin{bmatrix} 1 & 1 & 0 & 0 & 0 \\ 1 & -1 & 0 & 0 & 0 \\ 0 & 0 & 1 & 1 & 1 \\ 0 & 0 & -1 & 1 & -1 \\ j & j & 0 & 0 & 0 \\ j & -j & 0 & 0 & 0 \\ 0 & 0 & j & -j & -j \\ 0 & 0 & -j & -j & j \end{bmatrix}$ |

In one example, the six-layer codebook for Ng=2 includes all of or a subset of precoders in Table 40.

TABLE 40

Intermediate precoding matrix W' Ng = 2 and six-layer

| $(l_1, l_2)$ | 4Tx FC TPMIs (I) | TPMI index i | Intermediate precoder matrix W' |
|---|---|---|---|
| (3, 3) | 3-4 | $i = (i_1, i_2)$ | $\begin{bmatrix} W_{4,4,I}([1\ldots4],[1,2,3]) & 0_{4,3} \\ 0_{4,3} & W_{4,4,I}([1\ldots4],[2,3,4]) \end{bmatrix}$ |

$$= \begin{bmatrix} W_{4,3,i_1}([1\ldots4],[1,2,3]) & 0_{4,3} \\ 0_{4,3} & W_{4,4,i_2}([1\ldots4],[2,3,4]) \end{bmatrix}$$

$$= \frac{1}{\sqrt{2}} \begin{bmatrix} \overline{W}_{3,i_1} & 0_{4\times3} \\ 0_{4\times3} & \overline{W}_{3,i_2} \end{bmatrix}$$

In one example, a rank 6 8Tx precoder for $N_g$=2 and layer split $(l_1, l_2)$=(3,3) is constructed based on rank 4 4Tx FC TPMIs (TPMI 3-4), where a rank 4 4Tx FC TPMI indicates a 4×4 precoding matrix denoted as $$p^4 = [p_1^4, p_2^4, p_3^4, p_4^4],$$

where $$p_i^4, i = 1, 2, 3, 4$$

are precoders for 4 layers (4 columns). In particular, any 3 out of 4 precoders are used for the group with 3 layers, and the remaining 1 precoder and it's corresponding orthogonal precoders (e.g., based on rank 3 4Tx FC TPMIs) are used for the other group with 3 layers. So, the total number of 8Tx rank 6 precoding matrices for layer split is 2*3=6 or 282=4. The numbering scheme can be according to scheme (A) or (B), as described above.

In one example, a rank 6 8Tx precoder for $N_g$=2 and layer split $(l_1, l_2)$=(3,3) is constructed based on rank 4 4Tx FC TPMIs (TPMI 3-4), where a rank 4 4Tx FC TPMI indicates a 4×4 precoding matrix denoted as $$p^4 = [p_1^4, p_2^4, p_3^4, p_4^4],$$

where $$p_i^4, \, i = 1, 2, 3, 4$$

are precoders for 4 layers (4 columns). In particular, any 3 out of 4 precoders are used for the group with 3 layers, and any 3 out of 4 precoders are used for the other group. So, the total number of 8Tx rank 6 precoding matrices for layer split is 12 or 8. The numbering scheme can be according to scheme (A) or (B), as described above.

In one example, when rank r=7, the codebook for 8 antenna ports when $N_g$=2 includes all of or at least one of the precoding matrices shown in Table 41 and Table 42. In one example, the normalized or multiplication factor $M_4$=¼ in the 4Tx UL precoding matrices are not included when the 8Tx precoding matrices are constructed. The tables below are according to this example. In one example, the factor $M_4$ is included, and hence in this case a multiplication factor $M_4$ is included (multiplied to) in each precoder in the tables below. In another example, a multiplication factor $$P_7 = \frac{\sqrt{2}}{\sqrt{7}} M_4$$

is included in (multiplied to) each precoder in the tables below. In another example, a multiplication factor $$N_7 = \frac{1}{2\sqrt{14}}$$

is included in (multiplied to) each precoder in the tables below.

TABLE 41

| | | | | port numbering scheme (A) | | |
|---|---|---|---|---|---|---|
| | Rank 4 | | | | | |
| | 4Tx FC | | | | | |
| | TPMIs | | | | | |
| $(l_1, l_2)$ | (I) | 8Tx precoders | | | 8Tx precoders (without scaling) | |
| (4, 3) | 3-4 | $\begin{bmatrix} W_{4,4,I}([1 \ldots 4], [1, \ldots, 4]) & 0_{4,3} \\ 0_{4,3} & W_{4,4,I}([1 \ldots 4], [1, 2, 3]) \end{bmatrix}$ | | $\begin{bmatrix} 1 & 1 & 1 & 1 & 0 & 0 & 0 \\ 1 & -1 & 1 & -1 & 0 & 0 & 0 \\ 1 & 1 & -1 & -1 & 0 & 0 & 0 \\ 1 & -1 & -1 & 1 & 0 & 0 & 0 \\ 0 & 0 & 0 & 0 & 1 & 1 & 1 \\ 0 & 0 & 0 & 0 & -1 & 1 & -1 \\ 0 & 0 & 0 & 0 & 1 & -1 & -1 \\ 0 & 0 & 0 & 0 & -1 & -1 & 1 \end{bmatrix}$, | $\begin{bmatrix} 1 & 1 & 1 & 1 & 0 & 0 & 0 \\ 1 & -1 & 1 & -1 & 0 & 0 & 0 \\ j & j & -j & -j & 0 & 0 & 0 \\ j & -j & -j & j & 0 & 0 & 0 \\ 0 & 0 & 0 & 0 & 1 & 1 & 1 \\ 0 & 0 & 0 & 0 & -1 & 1 & -1 \\ 0 & 0 & 0 & 0 & j & -j & -j \\ 0 & 0 & 0 & 0 & -j & -j & j \end{bmatrix}$ |
| (3, 4) | 3-4 | $\begin{bmatrix} W_{4,4,I}([1 \ldots 4], [1, 2, 3]) & 0_{4,4} \\ 0_{4,3} & W_{4,4,I}([1 \ldots 4], [1, \ldots, 4]) \end{bmatrix}$ | | $\begin{bmatrix} 1 & 1 & 1 & 0 & 0 & 0 & 0 \\ 1 & -1 & 1 & 0 & 0 & 0 & 0 \\ 1 & 1 & -1 & 0 & 0 & 0 & 0 \\ 1 & -1 & -1 & 0 & 0 & 0 & 0 \\ 0 & 0 & 0 & 1 & 1 & 1 & 1 \\ 0 & 0 & 0 & 1 & -1 & 1 & -1 \\ 0 & 0 & 0 & 1 & 1 & -1 & -1 \\ 0 & 0 & 0 & 1 & -1 & -1 & 1 \end{bmatrix}$, | $\begin{bmatrix} 1 & 1 & 1 & 0 & 0 & 0 & 0 \\ 1 & -1 & 1 & 0 & 0 & 0 & 0 \\ j & j & -j & 0 & 0 & 0 & 0 \\ j & -j & -j & 0 & 0 & 0 & 0 \\ 0 & 0 & 0 & 1 & 1 & 1 & 1 \\ 0 & 0 & 0 & 1 & -1 & 1 & -1 \\ 0 & 0 & 0 & j & j & -j & -j \\ 0 & 0 & 0 & j & -j & -j & j \end{bmatrix}$, |

TABLE 42

| | | | | port numbering scheme (B) | | |
|---|---|---|---|---|---|---|
| | 4Tx | | | | | |
| | FC | | | | | |
| | TPMIs | | | | | |
| $(l_1, l_2)$ | (I) | 8Tx precoders | | | 8Tx precoders (without scaling) | |
| (4, 3) | 3-4 | $\begin{bmatrix} W_{4,4,I}([1, 2], [1, \ldots, 4]) & 0_{2,3} \\ 0_{2,4} & W_{4,4,I}([1, 2], [1, 2, 3]) \\ W_{4,4,I}([3, 4], [1, \ldots, 4]) & 0_{2,4} \\ 0_{2,4} & W_{4,4,I}([3, 4], [1, 2, 3]) \end{bmatrix}$ | | $\begin{bmatrix} 1 & 1 & 1 & 1 & 0 & 0 & 0 \\ 1 & -1 & 1 & -1 & 0 & 0 & 0 \\ 0 & 0 & 0 & 0 & 1 & 1 & 1 \\ 0 & 0 & 0 & 0 & 1 & -1 & 1 \\ 1 & 1 & -1 & -1 & 0 & 0 & 0 \\ 1 & -1 & -1 & 1 & 0 & 0 & 0 \\ 0 & 0 & 0 & 0 & 1 & 1 & -1 \\ 0 & 0 & 0 & 0 & 1 & -1 & -1 \end{bmatrix}$, | $\begin{bmatrix} 1 & 1 & 1 & 1 & 0 & 0 & 0 \\ 1 & -1 & 1 & -1 & 0 & 0 & 0 \\ 0 & 0 & 0 & 0 & 1 & 1 & 1 \\ 0 & 0 & 0 & 0 & 1 & -1 & 1 \\ j & j & -j & -j & 0 & 0 & 0 \\ j & -j & -j & j & 0 & 0 & 0 \\ 0 & 0 & 0 & 0 & j & j & -j \\ 0 & 0 & 0 & 0 & j & -j & -j \end{bmatrix}$ |

TABLE 42-continued

| | | port numbering scheme (B) | | |
|---|---|---|---|---|
| $(l_1, l_2)$ | 4Tx FC TPMIs (I) | 8Tx precoders | 8Tx precoders (without scaling) | |

$(3, 4)$  3-4

$$\begin{bmatrix} W_{4,4,I}([1,2],[1,2,3]) & 0_{2,4} \\ 0_{2,3} & W_{4,4,I}([1,2],[1,\ldots,4]) \\ W_{4,4,I}([3,4],[1,2,3]) & 0_{2,4} \\ 0_{2,3} & W_{4,4,I}([3,4],[1,\ldots,4]) \end{bmatrix} \begin{bmatrix} 1 & 1 & 1 & 0 & 0 & 0 & 0 \\ 1 & -1 & 1 & 0 & 0 & 0 & 0 \\ 0 & 0 & 0 & 1 & 1 & 1 & 1 \\ 0 & 0 & 0 & 1 & -1 & 1 & -1 \\ 1 & 1 & -1 & 0 & 0 & 0 & 0 \\ 1 & -1 & -1 & 0 & 0 & 0 & 0 \\ 0 & 0 & 0 & 1 & 1 & -1 & -1 \\ 0 & 0 & 0 & 1 & -1 & -1 & 1 \end{bmatrix}, \begin{bmatrix} 1 & 1 & 1 & 0 & 0 & 0 & 0 \\ 1 & -1 & 1 & 0 & 0 & 0 & 0 \\ 0 & 0 & 0 & 1 & 1 & 1 & 1 \\ 0 & 0 & 0 & 1 & -1 & 1 & -1 \\ j & j & -j & 0 & 0 & 0 & 0 \\ j & -j & -j & 0 & 0 & 0 & 0 \\ 0 & 0 & 0 & j & j & -j & -j \\ 0 & 0 & 0 & j & -j & -j & j \end{bmatrix}$$

In one example, the seven-layer codebook for Ng=2 includes all of or a subset of precoders in Table 43.

TABLE 43

| | | | Intermediate precoding matrix W' Ng = 2 and seven-layer | |
|---|---|---|---|---|
| $(l_1, l_2)$ | 4Tx FC TPMIs (I) | TPMI index i | Intermediate precoder matrix W' | |

$(3, 4)$  3-4  $i = (i_1, i_2)$ $$\begin{bmatrix} W_{4,4,I}([1\ldots4],[1,2,3]) & 0_{4,4} \\ 0_{4,3} & W_{4,4,I}([1\ldots4],[1,\ldots,4]) \end{bmatrix}$$

$$= \begin{bmatrix} W_{4,3,i_1}([1\ldots4],[1,2,3]) & 0_{4,4} \\ 0_{4,3} & W_{4,4,i_2}([1\ldots4],[1,\ldots,4]) \end{bmatrix}$$

$$= \frac{1}{\sqrt{2}} \begin{bmatrix} \overline{W}_{3,i_1} & 0_{4\times4} \\ 0_{4\times3} & \overline{W}_{4,i_2} \end{bmatrix}$$

In one example, a rank 7 8Tx precoder for $N_g=2$ and layer split $(l_1, l_2)=(3, 4)$ or $(4,3)$ is constructed based on rank 4 4Tx FC TPMIs (TPMI 3-4), where a rank 4 4Tx FC TPMI indicates a 4×4 precoding matrix denoted as $$p^4 = [p_1^4, p_2^4, p_3^4, p_4^4],$$

where $$p_i^4, i = 1, 2, 3, 4$$

are precoders for 4 layers (4 columns). In particular, all 4 out of 4 precoders are used for the group with 4 layers, and the corresponding rank 3 precoder (e.g., based on rank 3 4Tx FC TPMIs) are used for the other group with 3 layers. So, the total number of 8Tx rank 7 precoding matrices for layer split is 2*1=2. The numbering scheme can be according to scheme (A) or (B), as described above.

In one example, a rank 7 8Tx precoder for $N_g=2$ and layer split $(l_1, l_2)=(3, 4)$ or $(4,3)$ is constructed based on rank 4 4Tx FC TPMIs (TPMI 3-4), where a rank 4 4Tx FC TPMI indicates a 4×4 precoding matrix denoted as $$p^4 = [p_1^4, p_2^4, p_3^4, p_4^4],$$

where $$p_i^4, i = 1, 2, 3, 4$$

are precoders for 4 layers (4 columns). In particular, all 4 out of 4 precoders are used for the group with 4 layers, and one of the 2 corresponding rank 3 precoders (e.g., based on rank 3 4Tx FC TPMIs) is used for the other group with 3 layers. So, the total number of 8Tx rank 7 precoding matrices for layer split is 2*2=4. The numbering scheme can be according to scheme (A) or (B), as described above.

In one example, when rank r=8, the codebook for 8 antenna ports when $N_g=2$ includes all of or at least one of the precoding matrices shown in Table 44 and Table 45. In one example, the normalized or multiplication factor $M_4=\frac{1}{4}$ in the 4Tx UL precoding matrices are not included when the 8Tx precoding matrices are constructed. The tables below are according to this example. In one example, the factor $M_4$ is included, and hence in this case a multiplication factor $M_4$ is included (multiplied to) in each precoder in the tables below. In another example, a multiplication factor $P_8=\frac{1}{4}M_4$ is included in (multiplied to) each precoder in the tables below. In another example, a multiplication factor $N_8=\frac{1}{8}$ is included in (multiplied to) each precoder in the tables below.

TABLE 44 port numbering scheme (A)

| $(l_1, l_2)$ | Rank 4 4Tx FC TPMIs (I) | 8Tx precoders | 8Tx precoders (without scaling) |
|---|---|---|---|
| (4, 4) | 3-4 | $\begin{bmatrix} W_{4,4,I}([1\ldots4],[1,\ldots,4]) & 0_{4,4} \\ 0_{4,4} & W_{4,4,I}([1\ldots4],[1,\ldots,4]) \end{bmatrix}$ | $\begin{bmatrix} 1 & 1 & 1 & 1 & 0 & 0 & 0 & 0 \\ 1 & -1 & 1 & -1 & 0 & 0 & 0 & 0 \\ 1 & 1 & -1 & -1 & 0 & 0 & 0 & 0 \\ 1 & -1 & -1 & 1 & 0 & 0 & 0 & 0 \\ 0 & 0 & 0 & 0 & 1 & 1 & 1 & 1 \\ 0 & 0 & 0 & 0 & 1 & -1 & 1 & -1 \\ 0 & 0 & 0 & 0 & 1 & 1 & -1 & -1 \\ 0 & 0 & 0 & 0 & 1 & -1 & -1 & 1 \end{bmatrix}, \begin{bmatrix} 1 & 1 & 1 & 1 & 0 & 0 & 0 & 0 \\ 1 & -1 & 1 & -1 & 0 & 0 & 0 & 0 \\ j & j & -j & -j & 0 & 0 & 0 & 0 \\ j & -j & -j & j & 0 & 0 & 0 & 0 \\ 0 & 0 & 0 & 0 & 1 & 1 & 1 & 1 \\ 0 & 0 & 0 & 0 & 1 & -1 & 1 & -1 \\ 0 & 0 & 0 & 0 & j & j & -j & -j \\ 0 & 0 & 0 & 0 & j & -j & -j & j \end{bmatrix}$ |
| (4, 4) | 3-4 | $\begin{bmatrix} W_{4,4,I}([1\ldots4],[1,\ldots,4]) & 0_{4,4} \\ 0_{4,4} & W_{4,4,I}([1\ldots4],[1,\ldots,4]) \end{bmatrix}$ | $\begin{bmatrix} 1 & 1 & 1 & 1 & 0 & 0 & 0 & 0 \\ 1 & -1 & 1 & -1 & 0 & 0 & 0 & 0 \\ 1 & 1 & -1 & -1 & 0 & 0 & 0 & 0 \\ 1 & -1 & -1 & 1 & 0 & 0 & 0 & 0 \\ 0 & 0 & 0 & 0 & 1 & 1 & 1 & 1 \\ 0 & 0 & 0 & 0 & 1 & -1 & 1 & -1 \\ 0 & 0 & 0 & 0 & j & j & -j & -j \\ 0 & 0 & 0 & 0 & j & -j & -j & j \end{bmatrix}, \begin{bmatrix} 1 & 1 & 1 & 1 & 0 & 0 & 0 & 0 \\ 1 & -1 & 1 & -1 & 0 & 0 & 0 & 0 \\ j & j & -j & -j & 0 & 0 & 0 & 0 \\ j & -j & -j & j & 0 & 0 & 0 & 0 \\ 0 & 0 & 0 & 0 & 1 & 1 & 1 & 1 \\ 0 & 0 & 0 & 0 & 1 & -1 & 1 & -1 \\ 0 & 0 & 0 & 0 & 1 & 1 & -1 & -1 \\ 0 & 0 & 0 & 0 & 1 & -1 & -1 & 1 \end{bmatrix}$ |

25

TABLE 45 port numbering scheme (B)

| $(l_1, l_2)$ | 4Tx FC TPMIs (I) | 8Tx precoders | 8Tx precoders (without scaling) |
|---|---|---|---|
| (4, 4) | 3-4 | $\begin{bmatrix} W_{4,4,I}([1,2],[1,\ldots,4]) & 0_{2,4} \\ 0_{2,4} & W_{4,4,I}([1,2],[1,\ldots,4]) \\ W_{4,4,I}([3,4],[1,\ldots,4]) & 0_{2,4} \\ 0_{2,4} & W_{4,4,I}([3,4],[1,\ldots,4]) \end{bmatrix}$ | $\begin{bmatrix} 1 & 1 & 1 & 1 & 0 & 0 & 0 & 0 \\ 1 & -1 & 1 & -1 & 0 & 0 & 0 & 0 \\ 0 & 0 & 0 & 0 & 1 & 1 & 1 & 1 \\ 0 & 0 & 0 & 0 & 1 & -1 & 1 & -1 \\ 1 & 1 & -1 & -1 & 0 & 0 & 0 & 0 \\ 1 & -1 & -1 & 1 & 0 & 0 & 0 & 0 \\ 0 & 0 & 0 & 0 & 1 & 1 & -1 & -1 \\ 0 & 0 & 0 & 0 & 1 & -1 & -1 & 1 \end{bmatrix}, \begin{bmatrix} 1 & 1 & 1 & 1 & 0 & 0 & 0 & 0 \\ 1 & -1 & 1 & -1 & 0 & 0 & 0 & 0 \\ 0 & 0 & 0 & 0 & 1 & 1 & 1 & 1 \\ 0 & 0 & 0 & 0 & 1 & -1 & 1 & -1 \\ j & j & -j & -j & 0 & 0 & 0 & 0 \\ j & -j & -j & j & 0 & 0 & 0 & 0 \\ 0 & 0 & 0 & 0 & j & j & -j & -j \\ 0 & 0 & 0 & 0 & j & -j & -j & j \end{bmatrix}$ |
| (4, 4) | 3-4 | $\begin{bmatrix} W_{4,4,I}([1,2],[1,\ldots,4]) & 0_{2,4} \\ 0_{2,4} & W_{4,4,I}([1,2],[1,\ldots,4]) \\ W_{4,4,I}([3,4],[1,\ldots,4]) & 0_{2,4} \\ 0_{2,4} & W_{4,4,I}([3,4],[1,\ldots,4]) \end{bmatrix}$ | $\begin{bmatrix} 1 & 1 & 1 & 1 & 0 & 0 & 0 & 0 \\ 1 & -1 & 1 & -1 & 0 & 0 & 0 & 0 \\ 0 & 0 & 0 & 0 & 1 & 1 & 1 & 1 \\ 0 & 0 & 0 & 0 & 1 & -1 & 1 & -1 \\ j & j & -j & -j & 0 & 0 & 0 & 0 \\ j & -j & -j & j & 0 & 0 & 0 & 0 \\ 0 & 0 & 0 & 0 & 1 & 1 & -1 & -1 \\ 0 & 0 & 0 & 0 & 1 & -1 & -1 & 1 \end{bmatrix}, \begin{bmatrix} 1 & 1 & 1 & 1 & 0 & 0 & 0 & 0 \\ 1 & -1 & 1 & -1 & 0 & 0 & 0 & 0 \\ 0 & 0 & 0 & 0 & 1 & 1 & 1 & 1 \\ 0 & 0 & 0 & 0 & 1 & -1 & 1 & -1 \\ 1 & 1 & -1 & -1 & 0 & 0 & 0 & 0 \\ 1 & -1 & -1 & 1 & 0 & 0 & 0 & 0 \\ 0 & 0 & 0 & 0 & j & j & -j & -j \\ 0 & 0 & 0 & 0 & j & -j & -j & j \end{bmatrix}$ |

In one example, the eight-layer codebook for Ng=2 includes all of or a subset of precoders in Table 46.

In one example, the mapping of the antenna ports to antenna groups are according to at least one of the examples.

TABLE 46

Intermediate precoding matrix W' Ng = 2 and eight-layer

| $(l_1, l_2)$ | 4Tx FC TPMIs (I) | TPMI index i | Intermediate precoder matrix W' |
|---|---|---|---|
| (4, 4) | 3-4 | $i = (i_1, i_2)$ | $\begin{bmatrix} W_{4,4,i_1}([1\ldots4],[1,\ldots,4]) & 0_{4,4} \\ 0_{4,4} & W_{4,4,i_2}([1\ldots4],[1,\ldots,4]) \end{bmatrix}$ <br> $= \dfrac{1}{\sqrt{2}} \begin{bmatrix} W_{4,i_1} & 0_{4\times4} \\ 0_{4\times4} & W_{4,i_2} \end{bmatrix}$ |

In one example (numbering A), the antenna group i=1 maps to (corresponds to) antenna ports 1, 2, 3, 4, and the antenna group i=1 maps to (corresponds to) antenna ports 5, 6, 7, 8.

In one example (numbering B), the antenna group i=1 maps to (corresponds to) antenna ports 1, 2, 5, 6, and the antenna group i=1 maps to (corresponds to) antenna ports 3, 4, 7, 8.

In the following, the 8Tx precoding matrices for both examples of port numbering are provided.

In one embodiment, the codebook for 8 antenna ports when $N_g=2$ includes precoders or precoding matrices that are constructed based on a subset S of the rank $1_i$ full-coherent (FC) TPMIs of the Rel. 15 UL 4Tx codebook.

In one example, the subset S corresponds to 4Tx FC TPMIs that are based on the Rel.15 Type I codebook with $O_1=1$. Note that the 4Tx FC TPMIs that are based on the Rel.15 Type I codebook with $O_1=2$ for rank 1, 2, 3.

When the subset S corresponds to TPMIs with $O_1=1$, then for rank r=1, the rank-1 4Tx FC TPMIs included in S correspond to at least one of the following examples.

In one example, rank-1 FC TPMIs correspond to {12, 13, 14, 15, 20, 21, 22, 23}. In this case, the DFT vectors used to construct the 4Tx precoders are $$v_{l,m} \in \left\{ \begin{bmatrix} 1 \\ 1 \end{bmatrix}, \begin{bmatrix} 1 \\ -1 \end{bmatrix} \right\}.$$

In one example, rank-1 FC FC TPMIs correspond to {16, 17, 18, 19, 24, 25, 26, 27}. In this case, the DFT vectors used to construct the 4Tx precoders are $$v_{l,m} \in \left\{ \begin{bmatrix} 1 \\ j \end{bmatrix}, \begin{bmatrix} 1 \\ -j \end{bmatrix} \right\}.$$

In one example, rank-1 FC TPMIs correspond to {Z+12, Z+13, Z+14, Z+15, Z+20, Z+21, Z+22, Z+23}, where $Z \in \{0,4\}$. In one example, Z is fixed (e.g., 0), or configured (e.g., via RRC or MAC CE or DCI). In one example, the UE reports one or multiple values of Z that the UE can support.

In one example, rank-1 FC TPMIs correspond to {Z, Z+1, Z+2, Z+3, Z+8, Z+9, Z+10, Z+11}, where $Z \in \{12, 16\}$. In one example, Z is fixed (e.g., 12), or configured (e.g., via RRC or MAC CE or DCI). In one example, the UE reports one or multiple values of Z that the UE can support.

When the subset S corresponds to TPMIs with $O_1=1$, the rank-2 4Tx FC TPMIs included in S correspond to at least one of the following examples.

In one example, rank-2 FC TPMIs correspond to {14, 15, 18, 19}. In this case, the DFT vectors used to construct the 4Tx precoders are $$v_{l,m} \in \left\{ \begin{bmatrix} 1 \\ 1 \end{bmatrix}, \begin{bmatrix} 1 \\ -1 \end{bmatrix} \right\}.$$

In one example, rank-2 FC TPMIs correspond to {16, 17, 20, 21}. In this case, the DFT vectors used to construct the 4Tx precoders are $$v_{l,m} \in \left\{ \begin{bmatrix} 1 \\ j \end{bmatrix}, \begin{bmatrix} 1 \\ -j \end{bmatrix} \right\}.$$

In one example, rank-2 FC TPMIs correspond to {Z+14, Z+15, Z+18, Z+19}, where $Z \in \{0, 2\}$. In one example, Z is fixed (e.g., 0), or configured (e.g., via RRC or MAC CE or DCI). In one example, the UE reports one or multiple values of Z that the UE can support.

In one example, rank-2 FC TPMIs correspond to {Z, Z+1, Z+4, Z+5}, where $Z \in \{14, 16\}$. In one example, Z is fixed (e.g., 14), or configured (e.g., via RRC or MAC CE or DCI). In one example, the UE reports one or multiple values of Z that the UE can support.

When the subset S corresponds to TPMIs with $O_1=1$, the rank-3 4Tx FC TPMIs included in S correspond to at least one of the following examples.

In one example, rank-3 FC TPMIs correspond to {3, 5}. In this case, the DFT vectors used to construct the 4Tx precoders are $$v_{l,m} \in \left\{ \begin{bmatrix} 1 \\ 1 \end{bmatrix}, \begin{bmatrix} 1 \\ -1 \end{bmatrix} \right\}.$$

In one example, rank-3 FC TPMIs correspond to {4, 6}. In this case, the DFT vectors used to construct the 4Tx precoders are $$v_{l,m} \in \left\{ \begin{bmatrix} 1 \\ j \end{bmatrix}, \begin{bmatrix} 1 \\ -j \end{bmatrix} \right\}.$$

In one example, rank-3 FC TPMIs correspond to {Z+3, Z+5}, where $Z \in \{0, 1\}$. In one example, Z is fixed (e.g., 0), or configured (e.g., via RRC or MAC CE or DCI). In one example, the UE reports one or multiple values of Z that the UE can support.

In one example, rank-3 FC TPMIs correspond to {Z, Z+2}, where $Z \in \{3, 4\}$. In one example, Z is fixed (e.g., 3), or configured (e.g., via RRC or MAC CE or DCI). In one example, the UE reports one or multiple values of Z that the UE can support.

When the subset S corresponds to TPMIs with $O_1=1$, the rank-4 4Tx FC TPMIs included in S corresponds to rank-4 FC TPMIs {3, 4}, i.e., the subset S includes all of the rank-4 4Tx FC TPMIs.

In one example, the subset S according to at least one of the above example is considered/used only when $1_i>0$ for both i=1, 2, and all of the 4Tx FC TPMIs are used/considered when one of $L_1$ or $L_2$ is 0.

In one example, the subset S according to at least one of the above example is considered/used regardless of the value of $(1_1, 1_2)$.

In one example, the subset S according to at least one of the above example is considered/used based on the maxRank value (e.g., configured via higher layer). For example, when maxRank≤t, then all of the 4Tx FC TPMIs are used/considered, when maxRank>t, the subset S according to at least one of the above example is considered/used. Here, t is a threshold, which can be fixed (e.g., 1 or 2), or configured (e.g., via higher layer), or reported by the UE (e.g., via UE capability reporting).

In one example, the subset S according to at least one of the above example is considered/used based on the maxRank value (e.g., configured via higher layer). For example, when maxRank≤t, the subset $S=S_1$ according to at least one of the above example is considered/used, when maxRank>t, the subset $S=S_2$ according to at least one of the above example is considered/used, where $S_1$ includes more rank≤t 4Tx FC TPMIs that the same (rank≤t 4Tx FC TPMIs) in $S_2$. Here, t is a threshold, which can be fixed (e.g., 1 or 2), or configured (e.g., via higher layer), or reported by the UE (e.g., via UE capability reporting).

In one example, the subset S corresponds to, or based on, a (uniform) subsampling of the 4Tx FC TPMIs. Let Y be the subsampling factor, where Y=1 implies no subsampling (i.e., all 4Tx TPMIs are included in the subset), Y=2 implies subsampling by a factor 2 (so, number of candidate 4Tx FC TPMIs reduces by 2), and so on.

For rank r=1, the rank-1 4Tx FC TPMIs included in S correspond to at least one of the following examples.

In one example, Y=2 and rank-1 FC TPMIs correspond to even-numbered FC TPMIs, i.e., {12, 14, 16, . . . 26}.

In one example, Y=2 and rank-1 FC TPMIs correspond to odd-numbered FC TPMIs, i.e., {13, 15, 17, . . . 27}.

In one example, Y=2 and rank-1 FC TPMIs correspond to {Z+12, Z+14, . . . , Z+26}, where Z∈{0, 1}. In one example, Z is fixed (e.g., 0), or configured (e.g., via RRC or MAC CE or DCI). In one example, the UE reports one or multiple values of Z that the UE can support.

In one example, Y=2 and rank-1 FC TPMIs correspond to {Z, Z+2, . . . , Z+14}, where Z∈{12, 13}. In one example, Z is fixed (e.g., 12), or configured (e.g., via RRC or MAC CE or DCI). In one example, the UE reports one or multiple values of Z that the UE can support.

In one example, Y=4 and rank-1 FC TPMIs correspond to some of the even-numbered FC TPMIs, i.e., {12, 16, 20, 24} or {14, 18, 22, 26}.

In one example, Y=4 and rank-1 FC TPMIs correspond to odd-numbered FC TPMIs, i.e., {13, 17, 21, 25} or {15, 19, 23, 27}.

In one example, Y=4 and rank-1 FC TPMIs correspond to {Z+12, Z+16, . . . , Z+24}, where Z∈{0, 1, 2, 3} or {0, 2} or {1,3}. In one example, Z is fixed (e.g., 0), or configured (e.g., via RRC or MAC CE or DCI). In one example, the UE reports one or multiple values of Z that the UE can support.

In one example, Y=4 and rank-1 FC TPMIs correspond to {Z, Z+4, . . . , Z+12}, where Z∈{12, 13, 14, 15} or {12, 14} or {13, 15}. In one example, Z is fixed (e.g., 12), or configured (e.g., via RRC or MAC CE or DCI). In one example, the UE reports one or multiple values of Z that the UE can support.

For rank r=2, the rank-2 4Tx FC TPMIs included in S correspond to at least one of the following examples.

In one example, Y=2 and rank-2 FC TPMIs correspond to even-numbered FC TPMIs, i.e., {14, 16, . . . 20}.

In one example, Y=2 and rank-2 FC TPMIs correspond to odd-numbered FC TPMIs, i.e., {15, 17, . . . 21}.

In one example, Y=2 and rank-2 FC TPMIs correspond to {Z+14, Z+16, . . . , Z+20}, where Z∈{0, 1}. In one example, Z is fixed (e.g., 0), or configured (e.g., via RRC or MAC CE or DCI). In one example, the UE reports one or multiple values of Z that the UE can support.

In one example, Y=2 and rank-2 FC TPMIs correspond to {Z, Z+2, . . . , Z+6}, where Z∈{14, 15}. In one example, Z is fixed (e.g., 14), or configured (e.g., via RRC or MAC CE or DCI). In one example, the UE reports one or multiple values of Z that the UE can support.

In one example, Y=4 and rank-2 FC TPMIs correspond to some of the even-numbered FC TPMIs, i.e., {14, 18} or {16, 20}.

In one example, Y=4 and rank-2 FC TPMIs correspond to odd-numbered FC TPMIs, i.e., {15, 19} or {17, 21}.

In one example, Y=4 and rank-2 FC TPMIs correspond to {Z+14, Z+18}, where Z∈{0, 1, 2, 3} or {0, 2} or {1,3}. In one example, Z is fixed (e.g., 0), or configured (e.g., via RRC or MAC CE or DCI). In one example, the UE reports one or multiple values of Z that the UE can support.

In one example, Y=4 and rank-2 FC TPMIs correspond to {Z, Z+4}, where Z∈{14, 15, 16, 17} or {14, 16} or {15, 17}. In one example, Z is fixed (e.g., 14), or configured (e.g., via RRC or MAC CE or DCI). In one example, the UE reports one or multiple values of Z that the UE can support.

For rank r=3, the rank-3 4Tx FC TPMIs included in S correspond to at least one of the following examples.

In one example, Y=2 and rank-3 FC TPMIs correspond to even-numbered FC TPMIs, i.e., {4, 6}.

In one example, Y=2 and rank-3 FC TPMIs correspond to odd-numbered FC TPMIs, i.e., {3, 5}.

In one example, Y=2 and rank-3 FC TPMIs correspond to {Z+3, Z+5}, where Z∈{0, 1}. In one example, Z is fixed (e.g., 0), or configured (e.g., via RRC or MAC CE or DCI). In one example, the UE reports one or multiple values of Z that the UE can support.

In one example, Y=2 and rank-3 FC TPMIs correspond to {Z, Z+2}, where Z∈{3, 4}. In one example, Z is fixed (e.g., 3), or configured (e.g., via RRC or MAC CE or DCI). In one example, the UE reports one or multiple values of Z that the UE can support.

In one example, Y=4 and rank-3 FC TPMIs correspond to some of the even-numbered FC TPMIs, i.e., {4} or {6}.

In one example, Y=4 and rank-3 FC TPMIs correspond to odd-numbered FC TPMIs, i.e., {3} or {5}.

In one example, Y=4 and rank-3 FC TPMIs correspond to {Z+3}, where Z∈{0, 1, 2, 3} or {0, 2} or {1,3}. In one example, Z is fixed (e.g., 0), or configured (e.g., via RRC or MAC CE or DCI). In one example, the UE reports one or multiple values of Z that the UE can support.

In one example, Y=4 and rank-3 FC TPMIs correspond to {Z}, where Z∈{3, 4, 5, 6} or {4, 6} or {3, 5}. In one example, Z is fixed (e.g., 3), or configured (e.g., via RRC or MAC CE or DCI). In one example, the UE reports one or multiple values of Z that the UE can support.

In one example, the subset S according to at least one of the above example is considered/used only when $l_i > 0$ for both i=1, 2, and all of the 4Tx FC TPMIs are used/considered when one of $L_1$ or $L_2$ is 0.

In one example, the subset S according to at least one of the above example is considered/used regardless of the value of $(l_1, l_2)$.

In one example, the subset S according to at least one of the above example is considered/used based on the maxRank value (e.g., configured via higher layer). For example, when maxRank≤t, then all of the 4Tx FC TPMIs are used/considered, when maxRank>t, the subset S according to at least one of the above example is considered/used. Here, t is a threshold, which can be fixed (e.g., 1 or 2), or configured (e.g., via higher layer), or reported by the UE (e.g., via UE capability reporting).

In one example, the subset S according to at least one of the above example is considered/used based on the maxRank value (e.g., configured via higher layer). For example, when maxRank≤t, the subset $S=S_1$ according to at least one of the above example is considered/used, when maxRank>t, the subset S=$S_2$ according to at least one of the above example is considered/used, where $S_1$ includes more rank≤t 4Tx FC TPMIs that the same (rank≤t 4Tx FC TPMIs) in $S_2$. Here, t is a threshold, which can be fixed (e.g., 1 or 2), or configured (e.g., via higher layer), or reported by the UE (e.g., via UE capability reporting).

If numbering A is used to construct 8Tx precoders based on 4Tx precoders, then the 4Tx precoders are applied to consecutive 4 out of 8 ports, i.e., 1, 2, 3, 4 or 5, 6, 7, 8 or 0, 1, 2, 3 or 4, 5, 6, 7. Or, if numbering B is used to construct 8Tx precoders based on 4Tx precoders, then the 4Tx precoders are applied to one of the following port tuples, 1, 2, 5, 6 or 3, 4, 7, 8 or 0, 1, 4, 5 or 2, 3, 6, 7.

In one embodiment, the 8Tx PC precoders for $N_g$=2 are based on Rel. 15 4Tx UL FC precoders, as described above, except that either one 4Tx FC TPMI (case A) or two 4Tx TPMIs (case B) are indicated/configured, depending on $l_i$ values, and the indicated/configured one or two TPMIs are applied to the two antenna groups, based on an ordering ($l_{x_1}$, $l_{x_2}$), where ($x_1$, $x_2$)=(1, 2) or (2, 1). In one example, the ordering is fixed, e.g., (1, 2) or (2, 1). In one example, the ordering is configured/indicated to the UE, e.g., via higher layer and/or MAC CE based signaling.

In one example, a 1-bit signaling (b) or a parameter (p) with two states is used.

For example, when b=0, ($x_1$, $x_2$)=(1, 2), and when b=1, ($x_1$, $x_2$)=(2, 1).

For example, when b=1, ($x_1$, $x_2$)=(1, 2), and when b=0, ($x_1$, $x_2$)=(2, 1).

For example, when p=v0, ($x_1$, $x_2$)=(1, 2), and when p=v1, ($x_1$, $x_2$)=(2, 1).

For example, when p=v1, ($x_1$, $x_2$)=(1, 2), and when p=v0, ($x_1$, $x_2$)=(2, 1).

In one example, a signaling 2-bit signaling is used.

In one example, the PC precoders for $N_g$=2 are described (constructed) based on an ordered set of layer pair values ($l_{x_1}$, $l_{x_2}$). At least one of the Table 47 through Table 50 can be used.

TABLE 47

| Rank | All layers in one Antenna Group | Layers split across 2 Antenna Groups |
|---|---|---|
| 1 | (0, 1) or 1 | |
| 2 | (0, 2) or 2 | (1, 1) |
| 3 | (0, 3) or 3 | (1, 2) |
| 4 | (0, 4) or 4 | (1, 3), (2, 2) |
| 5 | | (1, 4), (2, 3) |
| 6 | | (2, 4), (3, 3) |
| 7 | | (3, 4) |
| 8 | | (4, 4) |

TABLE 48

| Rank | All layers in one Antenna Group | Layers split across 2 Antenna Groups |
|---|---|---|
| 1 | (1, 0) or 1 | |
| 2 | (2, 0) or 2 | (1, 1) |
| 3 | (3, 0) or 3 | (2, 1) |
| 4 | (4, 0) or 4 | (3, 1), (2, 2) |
| 5 | | (4, 1), (3, 2) |
| 6 | | (4, 2), (3, 3) |
| 7 | | (4, 3) |
| 8 | | (4, 4) |

TABLE 49

| Rank | All layers in one Antenna Group | Layers split across 2 Antenna Groups |
|---|---|---|
| 1 | (0, 1) or 1 | |
| 2 | (0, 2) or 2 | (1, 1) |
| 3 | (0, 3) or 3 | (1, 2) |
| 4 | (0, 4) or 4 | (2, 2) |
| 5 | | (2, 3) |
| 6 | | (3, 3) |
| 7 | | (3, 4) |
| 8 | | (4, 4) |

TABLE 50

| Rank | All layers in one Antenna Group | Layers split across 2 Antenna Groups |
|---|---|---|
| 1 | (1, 0) or 1 | |
| 2 | (2, 0) or 2 | (1, 1) |
| 3 | (3, 0) or 3 | (2, 1) |
| 4 | (4, 0) or 4 | (2, 2) |
| 5 | | (3, 2) |
| 6 | | (3, 3) |
| 7 | | (3, 4) |
| 8 | | (4, 4) |

In one embodiment, the 8Tx PC precoders for $N_g$=4 are based on Rel. 15 2Tx UL FC precoders (rank-1 2Tx TPMI=2, 3, 4, 5 and rank-2 2Tx TPMI=1, 2), similar to the $N_g$=2 case as described above, except that either 1 or 2 or 3 or 4 2Tx FC TPMIs are indicated/configured, depending on $l_i$ values, where i=1, 2, 3, 4 and $l_i \in \{0, 1, 2\}$, and the indicated/configured one or two TPMIs are applied to the two antenna groups, based on an ordering ($l_{x_1}$, $l_{x_2}$, $l_{x_3}$, $l_{x_4}$), where ($x_1$, $x_2$, $x_3$, $x_4$) is one of the values in Table 51.

If numbering A is used to construct 8Tx precoders based on 2Tx FC precoders, then the 2Tx precoders are applied to consecutive 2 out of 8 ports, i.e., {(1, 2), (3, 4), (5,6), (7,8)} or {(0, 1), (2, 3), (4, 5), (6,7)}. Or, if numbering B is used to construct 8Tx precoders based on 2Tx precoders, then the 2Tx precoders are applied to one or multiple of the following port pairs, {(1,5), (2,6), (3,7), (4, 8)} or {(0,4), (1,5), (2,6), (3,7)}.

TABLE 51

| Signaling | ($x_1$, $x_2$, $x_3$, $x_4$) |
|---|---|
| 0-5 or v0-v5 | (1, 2, 3, 4), (1, 2, 4, 3), (1, 3, 2, 4), (1, 3, 4, 2), (1, 4, 2, 3), (1, 4, 3, 2) |
| 6-11 or v6-v11 | (2, 1, 3, 4), (2, 1, 4, 3), (2, 3, 1, 4), (2, 3, 4, 1), (2, 4, 1, 3), (2, 4, 3, 1), |
| 12-17 or v12-v17 | (3, 2, 1, 4), (3, 2, 4, 1), (3, 1, 2, 4), (3, 1, 4, 2), (3, 4, 2, 1), (3, 4, 1, 2), |
| 18-23 or v18-v23 | (4, 2, 3, 1), (4, 2, 1, 3), (4, 3, 2, 1), (4, 3, 1, 2), (4, 1, 2, 3), (4, 1, 3, 2), |

In one example, the ordering is fixed, e.g., (1, 2, 3, 4). In one example, the ordering is configured/indicated to the UE, e.g., via higher layer and/or MAC CE based signaling. In one example, a 5-bit signaling (b) or a parameter (p) with 24 states is used to indicate one of the supported values.

In one example, the PC precoders for $N_g$=4 are described (constructed) based on an ordered set of layer tuple values ($l_{x_1}$, $l_{x_2}$, $l_{x_3}$, $l_{x_4}$). At least one of the Table 52 through Table 57 can be used.

TABLE 52

| Rank | All layers in one Antenna Group | Layers split across 2 Antenna Groups | Layers split across 3 Antenna Groups | Layers split across 4 Antenna Groups |
|---|---|---|---|---|
| 1 | (0, 0, 0, 1) or 1 | | | |
| 2 | (0, 0, 0, 2) or 2 | (0, 0, 1, 1) | | |
| 3 | | (0, 0, 1, 2) | (0, 1, 1, 1) | |
| 4 | | (0, 0, 2, 2) | (0, 1, 1, 2) | (1, 1, 1, 1) |
| 5 | | | (0, 1, 2, 2) | (1, 1, 1, 2) |
| 6 | | | (0, 2, 2, 2) | (1, 1, 2, 2) |
| 7 | | | | (1, 2, 2, 2) |
| 8 | | | | (2, 2, 2, 2) |

TABLE 53

| Rank | All layers in one Antenna Group | Layers split across 2 Antenna Groups | Layers split across 3 Antenna Groups | Layers split across 4 Antenna Groups |
|---|---|---|---|---|
| 1 | (1, 0, 0, 0) or 1 | | | |
| 2 | (2, 0, 0, 0) or 2 | (1, 1, 0, 0) | | |
| 3 | | (2, 1, 0, 0) | (1, 1, 1, 0) | |
| 4 | | (2, 2, 0, 0) | (2, 1, 1, 0) | (1, 1, 1, 1) |
| 5 | | | (2, 2, 1, 0) | (1, 1, 1, 1) |
| 6 | | | (2, 2, 2, 0) | (2, 2, 1, 1) |
| 7 | | | | (2, 2, 2, 1) |
| 8 | | | | (2, 2, 2, 2) |

TABLE 54

| Rank | All layers in one Antenna Group | Layers split across 2 Antenna Groups | Layers split across 4 Antenna Groups |
|---|---|---|---|
| 1 | (0, 0, 0, 1) or 1 | | |
| 2 | (0, 0, 0, 2) or 2 | (0, 0, 1, 1) | |
| 3 | | (0, 0, 1, 2) | |
| 4 | | (0, 0, 2, 2) | (1, 1, 1, 1) |
| 5 | | | (1, 1, 1, 2) |
| 6 | | | (1, 1, 2, 2) |
| 7 | | | (1, 2, 2, 2) |
| 8 | | | (2, 2, 2, 2) |

TABLE 55

| Rank | All layers in one Antenna Group | Layers split across 2 Antenna Groups | Layers split across 4 Antenna Groups |
|---|---|---|---|
| 1 | (1, 0, 0, 0) or 1 | | |
| 2 | (2, 0, 0, 0) or 2 | (1, 1, 0, 0) | |
| 3 | | (2, 1, 0, 0) | |
| 4 | | (2, 2, 0, 0) | (1, 1, 1, 1) |
| 5 | | | (1, 1, 1, 1) |
| 6 | | | (2, 2, 1, 1) |
| 7 | | | (2, 2, 2, 1) |
| 8 | | | (2, 2, 2, 2) |

TABLE 56

| Rank | All layers in one Antenna Group | Layers split across 2 Antenna Groups | Layers split across 3 Antenna Groups | Layers split across 4 Antenna Groups |
|---|---|---|---|---|
| 1 | (0, 0, 0, 1) or 1 | | | |
| 2 | (0, 0, 0, 2) or 2 | (0, 0, 1, 1) | | |
| 3 | | (0, 0, 1, 2) | (0, 1, 1, 1) | |
| 4 | | (0, 0, 2, 2) | (0, 1, 1, 2) | (1, 1, 1, 1) |
| 5 | | | (0, 1, 2, 2) | (1, 1, 1, 2) |
| 6 | | | | (1, 1, 2, 2) |

TABLE 56-continued

| Rank | All layers in one Antenna Group | Layers split across 2 Antenna Groups | Layers split across 3 Antenna Groups | Layers split across 4 Antenna Groups |
|---|---|---|---|---|
| 7 | | | | (1, 2, 2, 2) |
| 8 | | | | (2, 2, 2, 2) |

TABLE 57

| Rank | All layers in one Antenna Group | Layers split across 2 Antenna Groups | Layers split across 3 Antenna Groups | Layers split across 4 Antenna Groups |
|---|---|---|---|---|
| 1 | (1, 0, 0, 0) or 1 | | | |
| 2 | (2, 0, 0, 0) or 2 | (1, 1, 0, 0) | | |
| 3 | | (2, 1, 0, 0) | (1, 1, 1, 0) | |
| 4 | | (2, 2, 0, 0) | (2, 1, 1, 0) | (1, 1, 1, 1) |
| 5 | | | (2, 2, 1, 0) | (1, 1, 1, 1) |
| 6 | | | | (2, 2, 1, 1) |
| 7 | | | | (2, 2, 2, 1) |
| 8 | | | | (2, 2, 2, 2) |

In one example, for $N_g=2$, for rank 1, the 8Tx precoders (based on 4Tx FC precoders) can be as shown in Table 58 and Table 59. In one example, the normalized or multiplication factor $M_1=\frac{1}{2}$ in the 4Tx UL precoders are not included when the 8Tx precoders are constructed. The tables below are according to this example. In one example, the factor $M_1$ is included, and hence in this case a multiplication factor $M_1$ is included (multiplied to) in each precoder in the tables below. In another example, a multiplication factor $$P_1 = \frac{1}{\sqrt{2}} M_1$$

is included in (multiplied to) each precoder in the tables below. In another example, a multiplication factor $$N_1 = \frac{1}{2\sqrt{2}}$$

is included in (multiplied to) each precoder in the tables below. Depending on the subset S or subsampling Z, as described above, a subset of the 8Tx precoders as shown in two tables can be selected for 8Tx rank 1 TPMI indication.

For rank>1, the 8Tx precoders can be constructed analogously for the two numbering schemes and the subset S or subsampling Z.

TABLE 58

| | | | |
|---|---|---|---|
| | | port numbering scheme (A) | |
| $(l_1, l_2)$ | Rank 1 4Tx FC TPMIs (I) | 8Tx precoders | 8Tx precoders (without scaling) |
| (1, 0) | 12-27 | $\begin{bmatrix} W_{4,1,I}([1\ldots4],[1]) \\ 0_{4,1} \end{bmatrix}$ | $\begin{bmatrix}1\\1\\1\\1\\0\\0\\0\\0\end{bmatrix}, \begin{bmatrix}1\\1\\j\\j\\0\\0\\0\\0\end{bmatrix}, \begin{bmatrix}1\\1\\-1\\-1\\0\\0\\0\\0\end{bmatrix}, \begin{bmatrix}1\\1\\-j\\-j\\0\\0\\0\\0\end{bmatrix}, \begin{bmatrix}1\\j\\1\\j\\0\\0\\0\\0\end{bmatrix}, \begin{bmatrix}1\\j\\j\\-1\\0\\0\\0\\0\end{bmatrix}, \begin{bmatrix}1\\j\\-1\\-j\\0\\0\\0\\0\end{bmatrix}, \begin{bmatrix}1\\j\\-j\\1\\0\\0\\0\\0\end{bmatrix}$ |
| | | | $\begin{bmatrix}1\\-1\\1\\-1\\0\\0\\0\\0\end{bmatrix}, \begin{bmatrix}1\\-1\\j\\-j\\0\\0\\0\\0\end{bmatrix}, \begin{bmatrix}1\\-1\\-1\\1\\0\\0\\0\\0\end{bmatrix}, \begin{bmatrix}1\\-1\\-j\\j\\0\\0\\0\\0\end{bmatrix}, \begin{bmatrix}1\\-j\\1\\-j\\0\\0\\0\\0\end{bmatrix}, \begin{bmatrix}1\\-j\\j\\1\\0\\0\\0\\0\end{bmatrix}, \begin{bmatrix}1\\-j\\-1\\j\\0\\0\\0\\0\end{bmatrix}, \begin{bmatrix}1\\-j\\-j\\-1\\0\\0\\0\\0\end{bmatrix}$ |
| (0, 1) | 12-27 | $\begin{bmatrix} 0_{4,1} \\ W_{4,1,I}([1\ldots4],[1]) \end{bmatrix}$ | $\begin{bmatrix}0\\0\\0\\0\\1\\1\\1\\1\end{bmatrix}, \begin{bmatrix}0\\0\\0\\0\\1\\1\\j\\j\end{bmatrix}, \begin{bmatrix}0\\0\\0\\0\\1\\1\\-1\\-1\end{bmatrix}, \begin{bmatrix}0\\0\\0\\0\\1\\1\\-j\\-j\end{bmatrix}, \begin{bmatrix}0\\0\\0\\0\\1\\j\\1\\j\end{bmatrix}, \begin{bmatrix}0\\0\\0\\0\\1\\j\\j\\-1\end{bmatrix}, \begin{bmatrix}0\\0\\0\\0\\1\\j\\-1\\-j\end{bmatrix}, \begin{bmatrix}0\\0\\0\\0\\1\\j\\-j\\1\end{bmatrix}$ |
| | | | $\begin{bmatrix}0\\0\\0\\0\\1\\-1\\1\\-1\end{bmatrix}, \begin{bmatrix}0\\0\\0\\0\\1\\-1\\j\\-j\end{bmatrix}, \begin{bmatrix}0\\0\\0\\0\\1\\-1\\-1\\1\end{bmatrix}, \begin{bmatrix}0\\0\\0\\0\\1\\-1\\-j\\j\end{bmatrix}, \begin{bmatrix}0\\0\\0\\0\\1\\-j\\1\\-j\end{bmatrix}, \begin{bmatrix}0\\0\\0\\0\\1\\-j\\j\\1\end{bmatrix}, \begin{bmatrix}0\\0\\0\\0\\1\\-j\\-1\\j\end{bmatrix}, \begin{bmatrix}0\\0\\0\\0\\1\\-j\\-j\\-1\end{bmatrix}$ |

TABLE 59

| | | | |
|---|---|---|---|
| | | port numbering scheme (B) | |
| $(l_1, l_2)$ | Rank 1 4Tx FC TPMIs (I) | 8Tx precoders | 8Tx precoders (without scaling) |
| (1, 0) | 12-27 | $\begin{bmatrix} W_{4,1,I}([1,2],[1]) \\ 0_2 \\ W_{4,1,I}([3,4],[1]) \\ 0_2 \end{bmatrix}$ | $\begin{bmatrix}1\\1\\0\\0\\1\\1\\0\\0\end{bmatrix}, \begin{bmatrix}1\\1\\0\\0\\j\\j\\0\\0\end{bmatrix}, \begin{bmatrix}1\\1\\0\\0\\-1\\-1\\0\\0\end{bmatrix}, \begin{bmatrix}1\\1\\0\\0\\-j\\-j\\0\\0\end{bmatrix}, \begin{bmatrix}1\\j\\0\\0\\1\\j\\0\\0\end{bmatrix}, \begin{bmatrix}1\\j\\0\\0\\j\\-1\\0\\0\end{bmatrix}, \begin{bmatrix}1\\j\\0\\0\\-1\\-j\\0\\0\end{bmatrix}, \begin{bmatrix}1\\j\\0\\0\\-j\\1\\0\\0\end{bmatrix}$ |
| | | | $\begin{bmatrix}1\\-1\\0\\0\\1\\-1\\0\\0\end{bmatrix}, \begin{bmatrix}1\\-1\\0\\0\\j\\-j\\0\\0\end{bmatrix}, \begin{bmatrix}1\\-1\\0\\0\\-1\\1\\0\\0\end{bmatrix}, \begin{bmatrix}1\\-1\\0\\0\\-j\\j\\0\\0\end{bmatrix}, \begin{bmatrix}1\\-j\\0\\0\\1\\-j\\0\\0\end{bmatrix}, \begin{bmatrix}1\\-j\\0\\0\\j\\1\\0\\0\end{bmatrix}, \begin{bmatrix}1\\-j\\0\\0\\-1\\j\\0\\0\end{bmatrix}, \begin{bmatrix}1\\-j\\0\\0\\-j\\-1\\0\\0\end{bmatrix}$ |

TABLE 59-continued port numbering scheme (B)

| Rank 1 4Tx $(l_1, l_2)$ FC TPMIs (I) | 8Tx precoders | 8Tx precoders (without scaling) |
|---|---|---|
| (0, 1)  12-27 | $\begin{bmatrix} 0_2 \\ W_{4,1,I}([1,2],[1]) \\ 0_2 \\ W_{4,1,I}([3,4],[1]) \end{bmatrix}$ | $\begin{bmatrix} 0\\0\\1\\1\\0\\0\\1\\1 \end{bmatrix}, \begin{bmatrix} 0\\0\\1\\1\\0\\0\\j\\j \end{bmatrix}, \begin{bmatrix} 0\\0\\1\\1\\0\\0\\-1\\-1 \end{bmatrix}, \begin{bmatrix} 0\\0\\1\\1\\0\\0\\-j\\-j \end{bmatrix}, \begin{bmatrix} 0\\0\\1\\j\\0\\0\\1\\j \end{bmatrix}, \begin{bmatrix} 0\\0\\1\\j\\0\\0\\j\\-1 \end{bmatrix}, \begin{bmatrix} 0\\0\\1\\j\\0\\0\\-1\\-j \end{bmatrix}, \begin{bmatrix} 0\\0\\1\\j\\0\\0\\-j\\1 \end{bmatrix},$ $\begin{bmatrix} 0\\0\\1\\-1\\0\\0\\1\\-1 \end{bmatrix}, \begin{bmatrix} 0\\0\\1\\-1\\0\\0\\j\\-j \end{bmatrix}, \begin{bmatrix} 0\\0\\1\\-1\\0\\0\\-1\\1 \end{bmatrix}, \begin{bmatrix} 0\\0\\1\\-1\\0\\0\\-j\\j \end{bmatrix}, \begin{bmatrix} 0\\0\\1\\-j\\0\\0\\1\\-j \end{bmatrix}, \begin{bmatrix} 0\\0\\1\\-j\\0\\0\\j\\1 \end{bmatrix}, \begin{bmatrix} 0\\0\\1\\-j\\0\\0\\-1\\j \end{bmatrix}, \begin{bmatrix} 0\\0\\1\\-j\\0\\0\\-j\\-1 \end{bmatrix}$ |

In one example, for $N_g=4$, for rank 1, the 8Tx precoders (based on 2Tx FC precoders) can be as shown in Table 60 and Table 61. In one example, the normalized or multiplication factor $$M_1 = \frac{1}{\sqrt{2}}$$

in the 2Tx UL precoders are not included when the 8Tx precoders are constructed. The tables below are according to this example. In one example, the factor $M_1$ is included, and hence in this case a multiplication factor $M_1$ is included (multiplied to) in each precoder in the tables below. In another example, a multiplication factor $P_1 = \frac{1}{2}M_1$ is included in (multiplied to) each precoder in the tables below. In another example, a multiplication factor $$N_1 = \frac{1}{2\sqrt{2}}$$

is included in (multiplied to) each precoder in the tables below. Depending on the subset S or subsampling Z, as described above, a subset of the 8Tx precoders as shown in two tables can be selected for 8Tx rank 1 TPMI indication.

For rank>1, the 8Tx precoders can be constructed analogously for the two numbering schemes and the subset S or subsampling Z.

TABLE 60 port numbering scheme (A)

| $(l_1, l_2, l_3, l_4)$ Rank 1 2Tx FC TPMIs (I) | 8Tx precoders (without scaling) |
|---|---|
| (1, 0, 0, 0)  2-5 | $\begin{bmatrix} 1\\1\\0\\0\\0\\0\\0\\0 \end{bmatrix}, \begin{bmatrix} 1\\j\\0\\0\\0\\0\\0\\0 \end{bmatrix}, \begin{bmatrix} 1\\-1\\0\\0\\0\\0\\0\\0 \end{bmatrix}, \begin{bmatrix} 1\\-j\\0\\0\\0\\0\\0\\0 \end{bmatrix}$ |

TABLE 60-continued port numbering scheme (A)

| $(l_1, l_2, l_3, l_4)$ Rank 1 2Tx FC TPMIs (I) | 8Tx precoders (without scaling) |
|---|---|
| (0, 1, 0, 0)  2-5 | $\begin{bmatrix} 0\\0\\1\\1\\0\\0\\0\\0 \end{bmatrix}, \begin{bmatrix} 0\\0\\1\\j\\0\\0\\0\\0 \end{bmatrix}, \begin{bmatrix} 0\\0\\1\\-1\\0\\0\\0\\0 \end{bmatrix}, \begin{bmatrix} 0\\0\\1\\-j\\0\\0\\0\\0 \end{bmatrix}$ |
| (0, 0, 1, 0)  2-5 | $\begin{bmatrix} 0\\0\\0\\0\\1\\1\\0\\0 \end{bmatrix}, \begin{bmatrix} 0\\0\\0\\0\\1\\j\\0\\0 \end{bmatrix}, \begin{bmatrix} 0\\0\\0\\0\\1\\-1\\0\\0 \end{bmatrix}, \begin{bmatrix} 0\\0\\0\\0\\1\\-j\\0\\0 \end{bmatrix}$ |
| (0, 0, 0, 1)  2-5 | 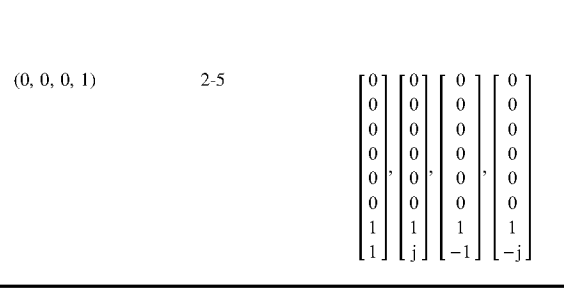 |

81

TABLE 61 port numbering scheme (B)

| $(l_1, l_2, l_3, l_4)$ | Rank 1 2Tx FC TPMIs (I) | 8Tx precoders (without scaling) | | | |
|---|---|---|---|---|---|
| (1, 0, 0, 0) | 2-5 | $\begin{bmatrix}1\\0\\0\\0\\1\\0\\0\\0\end{bmatrix}$ | $\begin{bmatrix}1\\0\\0\\0\\j\\0\\0\\0\end{bmatrix}$ | $\begin{bmatrix}1\\0\\0\\0\\-1\\0\\0\\0\end{bmatrix}$ | $\begin{bmatrix}1\\0\\0\\0\\-j\\0\\0\\0\end{bmatrix}$ |
| (0, 1, 0, 0) | 2-5 | $\begin{bmatrix}0\\1\\0\\0\\0\\1\\0\\0\end{bmatrix}$ | $\begin{bmatrix}0\\1\\0\\0\\0\\j\\0\\0\end{bmatrix}$ | $\begin{bmatrix}0\\1\\0\\0\\0\\-1\\0\\0\end{bmatrix}$ | $\begin{bmatrix}0\\1\\0\\0\\0\\-j\\0\\0\end{bmatrix}$ |
| (0, 0, 1, 0) | 2-5 | $\begin{bmatrix}0\\0\\1\\0\\0\\0\\1\\0\end{bmatrix}$ | $\begin{bmatrix}0\\0\\1\\0\\0\\0\\j\\0\end{bmatrix}$ | $\begin{bmatrix}0\\0\\1\\0\\0\\0\\-1\\0\end{bmatrix}$ | $\begin{bmatrix}0\\0\\1\\0\\0\\0\\-j\\0\end{bmatrix}$ |
| (0, 0, 0, 1) | 2-5 | $\begin{bmatrix}0\\0\\0\\1\\0\\0\\0\\1\end{bmatrix}$ | $\begin{bmatrix}0\\0\\0\\1\\0\\0\\0\\j\end{bmatrix}$ | $\begin{bmatrix}0\\0\\0\\1\\0\\0\\0\\-1\end{bmatrix}$ | $\begin{bmatrix}0\\0\\0\\1\\0\\0\\0\\-j\end{bmatrix}$ |

Figure 9:
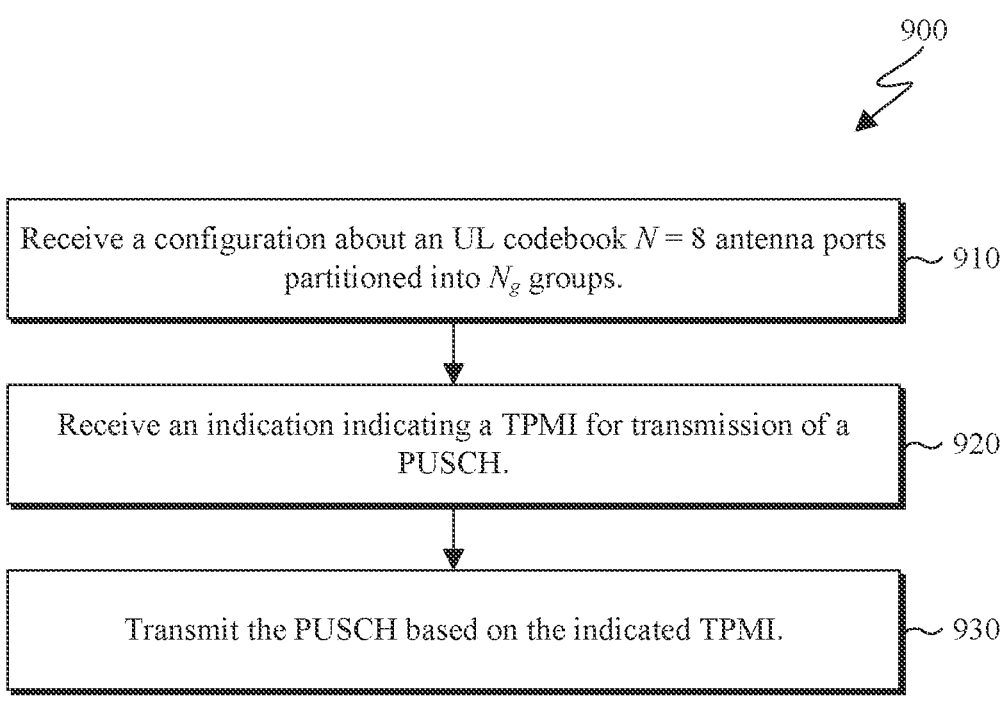
FIG. 9 illustrates an example method performed by a UE in a wireless communication system according to embodiments of the present disclosure.

FIG. 9 illustrates an example method 900 performed by a UE in a wireless communication system according to embodiments of the present disclosure. The method 900 of FIG. 9 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 900 is for illustration only and other embodiments can be used without departing from the scope of the present disclosure.

The method 900 begins with the UE receiving a configuration about an UL codebook N=8 antenna ports partitioned into $N_g$ groups (910). The UE then receives an indication indicating a TPMI for transmission of a PUSCH (920). For example, in 902, the TPMI indicates a precoding matrix from the UL codebook and the precoding matrix is based on up to K submatrices. Each of the K submatrices is a full-coherent (FC) precoding matrix for $$P = \frac{N}{N_g}$$

antenna ports and is associated with one of the $N_g$ groups, $K \in \{1, \ldots, N_g\}$ and $N_g \in \{2, 4\}$. The UE then transmits the PUSCH based on the indicated TPMI (930).

In various embodiments, when $N_g=2$: N=8 antenna ports are partitioned into $N_g=2$ groups comprising antenna ports {0, 1, 4, 5} and {2, 3, 6, 7}, respectively, P=4, K∈{1, 2}, and

82 each of the K submatrices is given by $W_{4,r,I}$, where $r \in \{1, \ldots, 4\}$ and I is a TPMI index indicating the FC precoding matrix $W_{4,r,I}$, from an UL codebook ($C_{4,r}$) for P=4 antenna ports and r layers.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a processor; and
a transceiver operably coupled to the processor, the transceiver configured to:
   receive a configuration about an uplink (UL) codebook ($C_8$) for N=8 antenna ports partitioned into $N_g$ groups;
   receive an indication indicating a transmit precoding matrix indicator (TPMI) for transmission of a physical uplink shared channel (PUSCH); and
   transmit the PUSCH based on the indicated TPMI,
   wherein the TPMI indicates a precoding matrix (W) from the UL codebook ($C_8$) and the precoding matrix (W) is based on up to K submatrices, where each of the K submatrices is a full-coherent (FC) precoding matrix for $$P = \frac{N}{N_g}$$

antenna ports and is associated with one of the $N_g$ groups, $K \in \{1, \ldots, N_g\}$ and $N_g \in \{2, 4\}$.

2. The UE of claim 1, wherein, when $N_g=2$:
N=8 antenna ports are partitioned into $N_g=2$ groups comprising antenna ports {0, 1, 4, 5} and {2, 3, 6, 7}, respectively,
P=4,
K∈{1, 2}, and
each of the K submatrices is given by $W_{4,r,I}$, where $r \in \{1, \ldots, 4\}$ and I is a TPMI index indicating the FC precoding matrix $W_{4,r,I}$ from an UL codebook $(C_{4,r})$ for P=4 antenna ports and r layers.

3. The UE of claim 2, wherein:

$$W_{4,r,I} = \overline{W}_{r,i},$$

I=i+$s_r$, where i={0, 1, ... } and $s_r$ is a value of the TPMI index indicating a first FC precoding matrix from the UL codebook $(C_{4,r})$, where $s_1$=12, $s_2$=14, $s_3$=3, and $s_4$=3, the submatrices for r=1 layer include the following:

| i | $\overline{W}_{1,i}$ (ordered from left to right in increasing order of i) |
|---|---|
| 0-7 | $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ <br><br> $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ |
| 8-15 | $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ <br><br> $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\1\end{bmatrix}$ $\frac{1}{2}\begin{bmatrix}1\\-j\\-j\\-1\end{bmatrix}$, | the submatrices for r=2 layers include the following:

| i | $\overline{W}_{2,i}$ (ordered from left to right in increasing order of i) |
|---|---|
| 0-3 | $\frac{1}{2\sqrt2}\begin{bmatrix}1&1\\1&1\\1&-1\\1&-1\end{bmatrix}$ $\frac{1}{2\sqrt2}\begin{bmatrix}1&1\\1&1\\j&-j\\j&-j\end{bmatrix}$ $\frac{1}{2\sqrt2}\begin{bmatrix}1&1\\j&j\\1&-1\\j&-j\end{bmatrix}$ $\frac{1}{2\sqrt2}\begin{bmatrix}1&1\\j&j\\j&-j\\-1&1\end{bmatrix}$ |
| 4-7 | $\frac{1}{2\sqrt2}\begin{bmatrix}1&1\\-1&-1\\1&-1\\-1&1\end{bmatrix}$ $\frac{1}{2\sqrt2}\begin{bmatrix}1&1\\-1&-1\\j&-j\\j&-j\end{bmatrix}$ $\frac{1}{2\sqrt2}\begin{bmatrix}1&1\\-j&-j\\1&-1\\-j&j\end{bmatrix}$ $\frac{1}{2\sqrt2}\begin{bmatrix}1&1\\-j&-j\\j&-j\\1&-1\end{bmatrix}$, | the submatrices for r 3 layers include the following:

| i | $\overline{W}_{3,i}$ (ordered from left to right in increasing order of i) |
|---|---|
| 0-3 | $\frac{1}{2\sqrt3}\begin{bmatrix}1&1&1\\1&-1&1\\1&1&-1\\1&-1&-1\end{bmatrix}$ $\frac{1}{2\sqrt3}\begin{bmatrix}1&1&1\\1&-1&1\\j&j&-j\\j&-j&-j\end{bmatrix}$ <br><br> $\frac{1}{2\sqrt3}\begin{bmatrix}1&1&1\\-1&1&-1\\1&1&-1\\-1&1&1\end{bmatrix}$ $\frac{1}{2\sqrt3}\begin{bmatrix}1&1&1\\-1&1&-1\\j&j&-j\\-j&j&j\end{bmatrix}$, | and
the submatrices for r 4 layers include the following:

| i | $\overline{W}_{4,i}$ (ordered from left to right in increasing order of i) |
|---|---|
| 0-1 | $\frac{1}{4}\begin{bmatrix}1&1&1&1\\1&-1&1&-1\\1&1&-1&-1\\1&-1&-1&1\end{bmatrix}$ $\frac{1}{4}\begin{bmatrix}1&1&1&1\\1&-1&1&-1\\j&j&-j&-j\\j&-j&-j&j\end{bmatrix}$. |

4. The UE of claim 3, wherein the UL codebook $(C_8)$ for 1 layer includes all of or a subset of the following:

| Rank 1 4Tx FC TPMI (I) | TPMI index i | Intermediate precoder matrix W' |
|---|---|---|
| 12-27 | 0-15 | $\begin{bmatrix}W_{4,1,I}([1\ ...\ 4],[1])\\0_{4,1}\end{bmatrix} = \frac{1}{\sqrt2}\begin{bmatrix}\overline{W}_{1,i}\\0_{4\times1}\end{bmatrix}$ |
| 12-27 | 16-31 | $\begin{bmatrix}0_{4,1}\\W_{4,1,I}([1\ ...\ 4],[1])\end{bmatrix} = \frac{1}{\sqrt2}\begin{bmatrix}0_{4\times1}\\\overline{W}_{1,(i-16)}\end{bmatrix}$ |

5. The UE of claim 3, wherein the UL codebook $(C_8)$ for 2 layers includes all of or a subset of the following:

| Rank 2 4Tx FC TPMIs (I) | TPMI index i | Intermediate precoder matrix W' |
|---|---|---|
| 14-21 | 0-7 | $\begin{bmatrix}W_{4,2,I}([1\ ...\ 4],[1,2])\\0_{4,2}\end{bmatrix} = \frac{1}{\sqrt2}\begin{bmatrix}\overline{W}_{2,i}\\0_{4\times2}\end{bmatrix}$ |
| 14-21 | 8-15 | $\begin{bmatrix}0_{4,2}\\W_{4,2,I}([1\ ...\ 4],[1,2])\end{bmatrix} = \frac{1}{\sqrt2}\begin{bmatrix}0_{4\times2}\\\overline{W}_{2,(i-8)}\end{bmatrix}$ |
| 14-21 | 0, 1, 4, 5, 8, 9, | $\begin{bmatrix}W_{4,2,I}([1\ ...\ 4],[1]) & 0_{4,1}\\0_{4,1} & W_{4,2,I}([1\ ...\ 4],[2])\end{bmatrix}$ |
|  | 12, 13 | $=\begin{bmatrix}W_{4,3,i}([1\ ...\ 4],[1]) & 0_{4\times1}\\0_{4\times1} & W_{4,1,i+2}([1\ ...\ 4],[2])\end{bmatrix}$ <br><br> $=\frac{1}{\sqrt2}\begin{bmatrix}\overline{W}_{1,i} & 0_{4\times1}\\0_{4\times1} & \overline{W}_{1,i+2}\end{bmatrix}$ |

6. The UE of claim 3, wherein the UL codebook $(C_8)$ for 3 layers includes all of or a subset of the following:

| 4Tx FC TPMIs (I) | TPMI index i | Intermediate precoder matrix W' |
|---|---|---|
| 3-6 | 0-3 | $\begin{bmatrix}W_{4,3,i}([1\ ...\ 4],[1,2,3])\\0_{4\times3}\end{bmatrix} = \frac{1}{\sqrt2}\begin{bmatrix}\overline{W}_{3,i}\\0_{4\times3}\end{bmatrix}$ |
| 3-6 | 4-7 | $\begin{bmatrix}0_{4,3}\\W_{4,3,i}([1\ ...\ 4],[1,2,3])\end{bmatrix} = \frac{1}{\sqrt2}\begin{bmatrix}0_{4\times3}\\\overline{W}_{3,(i-4)}\end{bmatrix}$ |
|  | i = ($i_1$, $i_2$) | $\begin{bmatrix}W_{4,3,I}([1\ ...\ 4],[1]) & 0_{4,2}\\0_{4,1} & W_{4,3,I}([1\ ...\ 4],[2,3])\end{bmatrix}$ <br><br> $=\begin{bmatrix}W_{4,1,i_1}([1\ ...\ 4],[1]) & 0_{4,2}\\0_{4,1} & W_{4,2,i_2}([1\ ...\ 4],[1,2])\end{bmatrix}$ |

-continued

| 4Tx FC TPMIs (I) | TPMI index i | Intermediate precoder matrix W' |
|---|---|---|
| | | $=\frac{1}{\sqrt{2}}\begin{bmatrix} \overline{W}_{1,i_1} & 0_{4\times2} \\ 0_{4\times1} & \overline{W}_{2,i_2} \end{bmatrix}$ |
| | $i=(i_1, i_2)$ | $\begin{bmatrix} W_{4,3,I}([1 \dots 4], [1, 2]) & 0_{4,1} \\ 0_{4,2} & W_{4,3,I}([1 \dots 4], [3]) \end{bmatrix}$ |
| | | $=\begin{bmatrix} W_{4,2,i_2}([1 \dots 4], [1, 2]) & 0_{4,1} \\ 0_{4,2} & W_{4,1,i_1}([1 \dots 4], [1]) \end{bmatrix}$ |
| | | $=\frac{1}{\sqrt{2}}\begin{bmatrix} \overline{W}_{2,i_2} & 0_{4\times1} \\ 0_{4\times2} & \overline{W}_{1,i_1} \end{bmatrix}$ |

7. The UE of claim 3, wherein the UL codebook ($C_8$) for 4 layers includes all of or a subset of the following:

| 4Tx FC TPMIs (I) | TPMI index i | Intermediate precoder matrix W' |
|---|---|---|
| 3-4 | 0-1 | $\begin{bmatrix} W_{4,4,I}([1 \dots 4], [1, \dots, 4]) \\ 0_{4\times4} \end{bmatrix} = \frac{1}{\sqrt{2}}\begin{bmatrix} \overline{W}_{4,i} \\ 0_{4\times4} \end{bmatrix}$ |
| 3-4 | 2-3 | $\begin{bmatrix} 0_{4\times4} \\ W_{4,4,I}([1 \dots 4], [1, \dots, 4]) \end{bmatrix} = \frac{1}{\sqrt{2}}\begin{bmatrix} 0_{4\times4} \\ \overline{W}_{4,(i-2)} \end{bmatrix}$ |
| | $i=(i_1, i_2)$ | $\begin{bmatrix} W_{4,4,I}([1 \dots 4], [1, 2]) & 0_{4,2} \\ 0_{4,2} & W_{4,4,I}([1 \dots 4], [3, 4]) \end{bmatrix}$ |

-continued

| 4Tx FC TPMIs (I) | TPMI index i | Intermediate precoder matrix W' |
|---|---|---|
| | | $=\begin{bmatrix} W_{4,2,i_1}([1 \dots 4], [1, 2]) & 0_{4,2} \\ 0_{4,2} & W_{4,2,i_2}([1 \dots 4], [1, 2]) \end{bmatrix}$ |
| | | $=\frac{1}{\sqrt{2}}\begin{bmatrix} \overline{W}_{2,i_1} & 0_{4\times2} \\ 0_{4\times2} & \overline{W}_{2,i_2} \end{bmatrix}$ |

8. The UE of claim 3, wherein the UL codebook ($C_8$) for 6 layers includes all of or a subset of the following:

| 4Tx FC TPMIs (I) | TMPI index i | Intermediate precoder matrix W' |
|---|---|---|
| 3-4 | $i=(i_1, i_2)$ | $\begin{bmatrix} W_{4,4,I}([1 \dots 4], [1, 2, 3]) & 0_{4,3} \\ 0_{4,3} & W_{4,4,I}([1 \dots 4], [2, 3, 4]) \end{bmatrix}$ |
| | | $=$ |
| | | $\begin{bmatrix} W_{4,3,i_1}([1 \dots 4], [1, 2, 3]) & 0_{4,3} \\ 0_{4,3} & W_{4,3,i_2}([1 \dots 4], [1, 2, 3]) \end{bmatrix}$ |
| | | $=\frac{1}{\sqrt{2}}\begin{bmatrix} \overline{W}_{3,i_1} & 0_{4\times3} \\ 0_{4\times3} & \overline{W}_{3,i_2} \end{bmatrix}$ | the UL codebook ($C_8$) for 7 layers includes all of or a subset of the following:

| 4Tx FC TPMIs (I) | TPMI index i | Intermediate precoder matrix W' |
|---|---|---|
| 3-4 | $i=(i_1, i_2)$ | $\begin{bmatrix} W_{4,4,I}([1 \dots 4], [1, 2, 3]) & 0_{4,4} \\ 0_{4,3} & W_{4,4,I}([1 \dots 4], [1, \dots, 4]) \end{bmatrix}$ |
| | | $=\begin{bmatrix} W_{4,3,i_1}([1 \dots 4], [1, 2, 3]) & 0_{4,4} \\ 0_{4,3} & W_{4,4,i_2}([1 \dots 4], [1, \dots, 4]) \end{bmatrix}$ |
| | | $=\frac{1}{\sqrt{2}}\begin{bmatrix} \overline{W}_{3,i_1} & 0_{4\times4} \\ 0_{4\times3} & \overline{W}_{4,i_2} \end{bmatrix}$ | and
the UL codebook ($C_8$) for 8 layers includes all of or a subset of the following:

| 4Tx FC TPMIs (I) | TPMI index i | Intermediate precoder matrix W' |
|---|---|---|
| 3-4 | $i=(i_1, i_2)$ | $\begin{bmatrix} W_{4,4,i_1}([1 \dots 4], [1, \dots, 4]) & 0_{4,4} \\ 0_{4,4} & W_{4,4,i_2}([1 \dots 4], [1, \dots, 4]) \end{bmatrix}$ |
| | | $=\frac{1}{\sqrt{2}}\begin{bmatrix} \overline{W}_{4,i_1} & 0_{4\times4} \\ 0_{4\times4} & \overline{W}_{4,i_2} \end{bmatrix}$ |

9. A base station (BS) comprising:

a processor; and a transceiver operably coupled to the processor, the transceiver configured to:

transmit a configuration about an uplink (UL) codebook ($C_8$) for N=8 antenna ports partitioned into $N_g$ groups;

transmit an indication indicating a transmit precoding matrix indicator (TPMI) for transmission of a physical uplink shared channel (PUSCH); and receive the PUSCH based on the indicated TPMI, wherein the TPMI indicates a precoding matrix (W) from the UL codebook ($C_8$) and the precoding matrix (W) is based on u to K submatrices, where each of the K submatrices is a full-coherent (FC) precoding matrix for $$P = \frac{N}{N_g}$$

antenna ports and is associated with one of the $N_g$ groups, $K \in \{1, \ldots, N_g\}$ and $N_g \in \{2, 4\}$.

10. The BS of claim 9, wherein, when $N_g=2$:

N=8 antenna ports are partitioned into $N_g=2$ groups comprising antenna ports $\{0, 1, 4, 5\}$ and $\{2, 3, 6, 7\}$, respectively,

P=4, $K \in \{1, 2\}$, and each of the K submatrices is given by $W_{4,r,I}$, where $r \in \{1, \ldots, 4\}$ and I is a TPMI index indicating the FC precoding matrix $W_{4,r,I}$ from an UL codebook ($C_{4,r}$) for P=4 antenna ports and r layers.

11. The BS of claim 10, wherein:

$$W_{4,r,I} = \overline{W}_{r,i},$$

$I=i+s_r$, where $i=\{0, 1, \ldots\}$ and $s_r$ is a value of the TPMI index indicating a first FC precoding matrix from the UL codebook ($C_{4,r}$), where $s_1=12$, $s_2=14$, $s_3=3$, and $s_4=3$, the submatrices for r=1 layer include the following:

| i | $\overline{W}_{1,i}$ (ordered from left to right in increasing order of i) |
|---|---|
| 0-7 | $\frac{1}{2}\begin{bmatrix} 1 \\ 1 \\ 1 \\ 1 \end{bmatrix}$ $\frac{1}{2}\begin{bmatrix} 1 \\ 1 \\ j \\ j \end{bmatrix}$ $\frac{1}{2}\begin{bmatrix} 1 \\ 1 \\ -1 \\ -1 \end{bmatrix}$ $\frac{1}{2}\begin{bmatrix} 1 \\ 1 \\ -j \\ -j \end{bmatrix}$ $\frac{1}{2}\begin{bmatrix} 1 \\ j \\ 1 \\ j \end{bmatrix}$ $\frac{1}{2}\begin{bmatrix} 1 \\ j \\ j \\ -1 \end{bmatrix}$ $\frac{1}{2}\begin{bmatrix} 1 \\ j \\ -1 \\ j \end{bmatrix}$ $\frac{1}{2}\begin{bmatrix} 1 \\ j \\ -j \\ 1 \end{bmatrix}$ |
| 8-15 | $\frac{1}{2}\begin{bmatrix} 1 \\ -1 \\ 1 \\ -1 \end{bmatrix}$ $\frac{1}{2}\begin{bmatrix} 1 \\ -1 \\ j \\ -j \end{bmatrix}$ $\frac{1}{2}\begin{bmatrix} 1 \\ -1 \\ -1 \\ 1 \end{bmatrix}$ $\frac{1}{2}\begin{bmatrix} 1 \\ -1 \\ -j \\ j \end{bmatrix}$ $\frac{1}{2}\begin{bmatrix} 1 \\ -j \\ 1 \\ -j \end{bmatrix}$ $\frac{1}{2}\begin{bmatrix} 1 \\ -j \\ j \\ 1 \end{bmatrix}$ $\frac{1}{2}\begin{bmatrix} 1 \\ -j \\ -1 \\ j \end{bmatrix}$ $\frac{1}{2}\begin{bmatrix} 1 \\ -j \\ -j \\ -1 \end{bmatrix},$ | the submatrices for r=2 layers include the following:

| i | $\overline{W}_{2,1}$ (ordered from left to right in increasing order of i) |
|---|---|
| 0-3 | $\frac{1}{2\sqrt{2}}\begin{bmatrix} 1 & 1 \\ 1 & 1 \\ 1 & -1 \\ 1 & -1 \end{bmatrix}$ $\frac{1}{2\sqrt{2}}\begin{bmatrix} 1 & 1 \\ 1 & 1 \\ j & -j \\ j & -j \end{bmatrix}$ $\frac{1}{2\sqrt{2}}\begin{bmatrix} 1 & 1 \\ j & j \\ 1 & -1 \\ j & -j \end{bmatrix}$ $\frac{1}{2\sqrt{2}}\begin{bmatrix} 1 & 1 \\ j & j \\ j & -j \\ -1 & 1 \end{bmatrix}$ |
| 4-7 | $\frac{1}{2\sqrt{2}}\begin{bmatrix} 1 & 1 \\ -1 & -1 \\ 1 & -1 \\ -1 & 1 \end{bmatrix}$ $\frac{1}{2\sqrt{2}}\begin{bmatrix} 1 & 1 \\ -1 & -1 \\ j & -j \\ -j & j \end{bmatrix}$ $\frac{1}{2\sqrt{2}}\begin{bmatrix} 1 & 1 \\ -j & -j \\ 1 & -1 \\ -j & -j \end{bmatrix}$ $\frac{1}{2\sqrt{2}}\begin{bmatrix} 1 & 1 \\ -j & -j \\ j & -j \\ 1 & -1 \end{bmatrix},$ | the submatrices for r=3 layers include the following:

| i | $\overline{W}_{3,i}$ (ordered from left to right in increasing order of i) |
|---|---|
| 0-3 | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ $\frac{1}{2\sqrt{3}}\begin{bmatrix} 1 & 1 & 1 \\ 1 & -1 & 1 \\ j & j & -j \\ j & -j & -j \end{bmatrix}$ $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ $\frac{1}{2\sqrt{3}}\begin{bmatrix} 1 & 1 & 1 \\ -1 & 1 & -1 \\ j & j & -j \\ -j & j & j \end{bmatrix},$ | and
the submatrices for r=4 layers include the following:

| i | $\overline{W}_{4,i}$ (ordered from left to right in increasing order of i) | |
|---|---|---|
| 0-1 | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ | $\frac{1}{4}\begin{bmatrix} 1 & 1 & 1 & 1 \\ 1 & -1 & 1 & -1 \\ j & j & -j & -j \\ j & -j & -j & j \end{bmatrix}$ . |

12. The BS of claim 11, wherein the UL codebook ($C_8$) for 1 layer includes all of or a subset of the following:

| Rank 1 4Tx FC TPMI (I) | TPMI index i | Intermediate precoder matrix W' |
|---|---|---|
| 12-27 | 0-15 | $\begin{bmatrix} W_{4,1,I}([1 \ldots 4], [1]) \\ 0_{4,1} \end{bmatrix} = \frac{1}{\sqrt{2}}\begin{bmatrix} \overline{W}_{1,i} \\ 0_{4\times1} \end{bmatrix}$ |
| 12-27 | 16-31 | $\begin{bmatrix} 0_{4,1} \\ W_{4,1,I}([1 \ldots 4], [1]) \end{bmatrix} = \frac{1}{\sqrt{2}}\begin{bmatrix} 0_{4\times1} \\ \overline{W}_{1,(i-16)} \end{bmatrix}$ . |

13. The BS of claim 11, wherein the UL codebook ($C_8$) for 2 layers includes all of or a subset of the following:

| Rank 2 4Tx FC TPMIs (I) | TPMI index i | Intermediate precoder matrix W' |
|---|---|---|
| 14-21 | 0-7 | $\begin{bmatrix} W_{4,2,I}([1 \ldots 4], [1,2]) \\ 0_{4,2} \end{bmatrix} = \frac{1}{\sqrt{2}}\begin{bmatrix} \overline{W}_{2,i} \\ 0_{4\times2} \end{bmatrix}$ |
| 14-21 | 8-15 | $\begin{bmatrix} 0_{4,2} \\ W_{4,2,I}([1 \ldots 4], [1,2]) \end{bmatrix} = \frac{1}{\sqrt{2}}\begin{bmatrix} 0_{4\times2} \\ \overline{W}_{2,(i-8)} \end{bmatrix}$ |
| 14-21 | 0, 1, 4, 5, 8, 9, 12, 13 | $\begin{bmatrix} W_{4,2,I} ([1 \ldots 4], [1]) & 0_{4,1} \\ 0_{4,1} & W_{4,2,I} ([1 \ldots 4], [2]) \end{bmatrix} = \begin{bmatrix} W_{4,1,i} ([1 \ldots 4], [1]) & 0_{4,1} \\ 0_{4,1} & W_{4,1,i+2} ([1 \ldots 4], [2]) \end{bmatrix}$ $= \frac{1}{\sqrt{2}}\begin{bmatrix} \overline{W}_{1,i} & 0_{4\times1} \\ 0_{4\times1} & \overline{W}_{1,i+2} \end{bmatrix}$ . |

14. The BS of claim 11, wherein the UL codebook ($C_8$) for 3 layers includes all of or a subset of the following:

| 4Tx FC TPMIs (I) | TPMI index i | Intermediate precoder matrix W' |
|---|---|---|
| 3-6 | 0-3 | $\begin{bmatrix} W_{4,3,I}([1 \ldots 4], [1,2,3]) \\ 0_{4,3} \end{bmatrix} = \frac{1}{\sqrt{2}}\begin{bmatrix} \overline{W}_{3,i} \\ 0_{4\times3} \end{bmatrix}$ |
| 3-6 | 4-7 | $\begin{bmatrix} 0_{4,3} \\ W_{4,3,I}([1 \ldots 4], [1,2,3]) \end{bmatrix} = \frac{1}{\sqrt{2}}\begin{bmatrix} 0_{4\times3} \\ \overline{W}_{3,(i-4)} \end{bmatrix}$ |
| | $i = (i_1, i_2)$ | $\begin{bmatrix} W_{4,3,I} ([1 \ldots 4], [1]) & 0_{4,2} \\ 0_{4,1} & W_{4,3,I} ([1 \ldots 4], [2, 3]) \end{bmatrix} = \begin{bmatrix} W_{41,i_1} ([1 \ldots 4], [1]) & 0_{4,2} \\ 0_{4,1} & W_{4,2,i_2} ([1 \ldots 4], [1, 2]) \end{bmatrix}$ $= \frac{1}{\sqrt{2}}\begin{bmatrix} \overline{W}_{1,i_1} & 0_{4\times2} \\ 0_{4\times1} & \overline{W}_{2,i_2} \end{bmatrix}$ |
| | $i = (i_1, i_2)$ | $\begin{bmatrix} W_{4,3,I} ([1 \ldots 4], [1, 2]) & 0_{4,1} \\ 0_{4,2} & W_{4,3,I} ([1 \ldots 4], [3]) \end{bmatrix} = \begin{bmatrix} W_{4,2,i_2} ([1 \ldots 4], [1, 2]) & 0_{4,1} \\ 0_{4,2} & W_{4,1,i_1} ([1 \ldots 4], [1]) \end{bmatrix}$ $= \frac{1}{\sqrt{2}}\begin{bmatrix} \overline{W}_{2,i_2} & 0_{4\times1} \\ 0_{4\times2} & \overline{W}_{1,i_1} \end{bmatrix}$ . |

15. The BS of claim 11, wherein the UL codebook ($C_8$) for 4 layers includes all of or a subset of the following:

| 4Tx FC TPMIs (I) | TPMI index i | Intermediate precoder matrix W' |
|---|---|---|
| 3-4 | 0-1 | $\begin{bmatrix} W_{4,4,I}([1 \ \ldots \ 4], [1, \ldots , 4]) \\ 0_{4,4} \end{bmatrix} = \dfrac{1}{\sqrt{2}} \begin{bmatrix} \overline{W}_{4,i} \\ 0_{4\times4} \end{bmatrix}$ |
| 3-4 | 2-3 | $\begin{bmatrix} 0_{4,4} \\ W_{4,4,I}([1 \ \ldots \ 4], [1, \ldots , 4]) \end{bmatrix} = \dfrac{1}{\sqrt{2}} \begin{bmatrix} 0_{4\times4} \\ \overline{W}_{4,(i-2)} \end{bmatrix}$ |
| | $i = (i_1, i_2)$ | $\begin{bmatrix} W_{4,4,I}([1 \ \ldots \ 4], [1, 2]) & 0_{4,2} \\ 0_{4,2} & W_{4,4,I}([1 \ \ldots \ 4], [3, 4]) \end{bmatrix} = \begin{bmatrix} W_{4,2,i_1}([1 \ \ldots \ 4], [1, 2]) & 0_{4,2} \\ 0_{4,2} & W_{4,2,i_2}([1 \ \ldots \ 4], [1,2]) \end{bmatrix}$ $= \dfrac{1}{\sqrt{2}} \begin{bmatrix} \overline{W}_{2,i_1} & 0_{4\times2} \\ 0_{4\times2} & \overline{W}_{2,i_2} \end{bmatrix}.$ |

16. The BS of claim 11, wherein the UL codebook ($C_8$) for 4 layers includes all of or a subset of the following:

| 4Tx FC TPMIs (I) | TPMI index i | Intermediate precoder matrix W' |
|---|---|---|
| 3-4 | $i = (i_1, i_2)$ | $\begin{bmatrix} W_{4,4,I}([1 \ \ldots \ 4], [1, 2, 3]) & 0_{4,3} \\ 0_{4,3} & W_{4,4,I}([1 \ \ldots \ 4], [2, 3, 4]) \end{bmatrix} = \begin{bmatrix} W_{4,3,i_1}([1 \ \ldots \ 4], [1, 2, 3]) & 0_{4,3} \\ 0_{4,3} & W_{4,3,i_2}([1 \ \ldots \ 4], [1,2,3]) \end{bmatrix}$ $= \dfrac{1}{\sqrt{2}} \begin{bmatrix} \overline{W}_{3,i_1} & 0_{4\times3} \\ 0_{4\times3} & \overline{W}_{3,i_2} \end{bmatrix},$ | the UL codebook ($C_8$) for 7 layers includes all of or a subset of the following:

| 4Tx FC TPMIs (I) | TPMI index i | Intermediate precoder matrix W' |
|---|---|---|
| 3-4 | $i = (i_1, i_2)$ | $\begin{bmatrix} W_{4,4,I}([1 \ \ldots \ 4], [1, 2, 3]) & 0_{4,4} \\ 0_{4,3} & W_{4,4,I}([1 \ \ldots \ 4], [1, \ldots , 4]) \end{bmatrix} = \begin{bmatrix} W_{4,3,i_1}([1 \ \ldots \ 4], [1, 2, 3]) & 0_{4,4} \\ 0_{4,3} & W_{4,4,i_2}([1 \ \ldots \ 4], [1, \ldots , 4]) \end{bmatrix}$ $= \dfrac{1}{\sqrt{2}} \begin{bmatrix} \overline{W}_{3,i_1} & 0_{4\times4} \\ 0_{4\times3} & \overline{W}_{4,i_2} \end{bmatrix},$ | and
the UL codebook ($C_8$) for 8 layers includes all of or a subset of the following:

| 4Tx FC TPMIs (I) | TPMI index i | Intermediate precoder matrix W' |
|---|---|---|
| 3-4 | $i = (i_1, i_2)$ | $\begin{bmatrix} W_{4,4,i_1}([1 \ \ldots \ 4], [1, \ldots , 4]) & 0_{4,4} \\ 0_{4,4} & W_{4,4,i_2}([1 \ \ldots \ 4], [1, \ldots , 4]) \end{bmatrix} = \dfrac{1}{\sqrt{2}} \begin{bmatrix} \overline{W}_{4,i_1} & 0_{4\times4} \\ 0_{4\times4} & \overline{W}_{4,i_2} \end{bmatrix}.$ |

17. A method performed by a user equipment (UE), the method comprising:

receiving a configuration about an uplink (UL) codebook ($C_8$) for N=8 antenna ports partitioned into $N_g$ groups;

receiving an indication indicating a transmit precoding matrix indicator (TPMI) for transmission of a physical uplink shared channel (PUSCH); and transmitting the PUSCH based on the indicated TPMI, wherein the TPMI indicates a precoding matrix (W) from the UL codebook ($C_8$) and the precoding matrix (W) is based on up to K submatrices, where each of the K submatrices is a full-coherent (FC) precoding matrix for $$P = \frac{N}{N_g}$$

antenna ports and is associated with one of the $N_g$ groups, $K \in \{1, \ldots, N_g\}$ and $N_g \in \{2, 4\}$.

18. The method of claim 17, wherein, when $N_g=2$:

N=8 antenna ports are partitioned into $N_g=2$ groups comprising antenna ports {0, 1, 4, 5} and {2, 3, 6, 7}, respectively,

P=4, $K \in \{1, 2\}$, and each of the K submatrices is given by $W_{4,r,I}$, where $r \in \{1, \ldots, 4\}$ and I is a TPMI index indicating the FC precoding matrix $W_{4,r,I}$ from an UL codebook ($C_{4,r}$) for P=4 antenna ports and r layers.

19. The method of claim 18, wherein:

$$W_{4,r,I} = \overline{W}_{r,i},$$

I=i+$s_r$, where i={0, 1, . . . } and $s_r$ is a value of the TPMI index indicating a first FC precoding matrix from the UL codebook ($C_{4,r}$), where $s_1$=12, $s_2$=14, $s_3$=3, and $s_4$=3, the submatrices for r=1 layer include the following:

| i | $\overline{W}_{1,i}$ (ordered from left to right in increasing order of i) |
|---|---|
| 0-7 | $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ |
| 8-15 | $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$, | the submatrices for r=2 layers include the following:

| i | $\overline{W}_{2,i}$ (ordered from left to right in increasing order of i) |
|---|---|
| 0-3 | $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ |
| 4-7 | $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\j&-j\\-j&j\end{bmatrix}$ $\frac{1}{2\sqrt{2}}\begin{bmatrix}1&1\\-j&-j\\1&-1\\-j&-j\end{bmatrix}$ $\frac{1}{2\sqrt{2}}\begin{bmatrix}1&1\\-j&-j\\j&-j\\1&-1\end{bmatrix}$, | the submatrices for r=3 layers include the following:

| i | $\overline{W}_{3,i}$ (ordered from left to right in increasing order of i) |
|---|---|
| 0-3 | $\frac{1}{2\sqrt{3}}\begin{bmatrix}1&1&1\\1&-1&1\\1&1&-1\\1&-1&-1\end{bmatrix}$ $\frac{1}{2\sqrt{3}}\begin{bmatrix}1&1&1\\1&-1&1\\j&j&-j\\1&-j&-j\end{bmatrix}$ $\frac{1}{2\sqrt{3}}\begin{bmatrix}1&1&1\\-1&1&-1\\1&1&-1\\-1&1&1\end{bmatrix}$ $\frac{1}{2\sqrt{3}}\begin{bmatrix}1&1&1\\-1&1&-1\\j&j&-j\\-j&j&j\end{bmatrix}$, | and
the submatrices for r=4 layers include the following:

| i | $\overline{W}_{4,i}$ (ordered from left to right in increasing order of i) |
|---|---|
| 0-1 | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ $\frac{1}{4}\begin{bmatrix} 1 & 1 & 1 & 1 \\ 1 & -1 & 1 & -1 \\ j & j & -j & -j \\ j & -j & -j & j \end{bmatrix}$ |

20. The method of claim 19, wherein the UL codebook ($C_8$) for 1 layer includes all of or a subset of the following:

| Rank 1 4Tx FC TPMI (I) | TPMI index i | Intermediate precoder matrix W' |
|---|---|---|
| 12-27 | 0-15 | $\begin{bmatrix} W_{4,1,I}([1 \ldots 4], [1]) \\ 0_{4,1} \end{bmatrix} = \frac{1}{\sqrt{2}}\begin{bmatrix} W_{1,i} \\ 0_{4\times1} \end{bmatrix}$ |
| 12-27 | 16-31 | $\begin{bmatrix} 0_{4,1} \\ W_{4,1,I}([1 \ldots 4], [1]) \end{bmatrix} = \frac{1}{\sqrt{2}}\begin{bmatrix} 0_{4\times1} \\ W_{1,(i-16)} \end{bmatrix}$ , | the UL codebook ($C_8$) for 2 layers includes all of or a subset of the following:

| Rank 2 4Tx FC TPMIs (I) | TPMI index i | Intermediate precoder matrix W' |
|---|---|---|
| 14-21 | 0-7 | $\begin{bmatrix} W_{4,2,I}([1 \ldots 4], [1, 2]) \\ 0_{4,2} \end{bmatrix} = \frac{1}{\sqrt{2}}\begin{bmatrix} W_{2,i} \\ 0_{4\times2} \end{bmatrix}$ |
| 14-21 | 8-15 | $\begin{bmatrix} 0_{4,2} \\ W_{4,2,I}([1 \ldots 4], [1, 2]) \end{bmatrix} = \frac{1}{\sqrt{2}}\begin{bmatrix} 0_{4\times2} \\ W_{2,(i-8)} \end{bmatrix}$ |
| 14-21 | 0, 1, 4, 5, 8, 9, 12, 13 | $\begin{bmatrix} W_{4,2,I}([1 \ldots 4], [1]) & 0_{4,1} \\ 0_{4,1} & W_{4,2,I}([1 \ldots 4], [2]) \end{bmatrix}$ $= \begin{bmatrix} W_{4,1,i}([1 \ldots 4], [1]) & 0_{4,1} \\ 0_{4,1} & W_{4,1,i+2}([1 \ldots 4], [2]) \end{bmatrix}$ $= \frac{1}{\sqrt{2}}\begin{bmatrix} W_{1,i} & 0_{4\times1} \\ 0_{4\times1} & W_{1,i+2} \end{bmatrix}$ , | the UL codebook ($C_8$) for 3 layers includes all of or a subset of the following:

| 4Tx FC TPMIs (I) | TPMI index i | Intermediate precoder matrix W' |
|---|---|---|
| 3-6 | 0-3 | $\begin{bmatrix} W_{4,3,I}([1 \ldots 4], [1, 2, 3]) \\ 0_{4,3} \end{bmatrix} = \frac{1}{\sqrt{2}}\begin{bmatrix} W_{3,i} \\ 0_{4\times3} \end{bmatrix}$ |
| 3-6 | 4-7 | $\begin{bmatrix} 0_{4,3} \\ W_{4,3,I}([1 \ldots 4], [1, 2, 3]) \end{bmatrix} = \frac{1}{\sqrt{2}}\begin{bmatrix} 0_{4\times3} \\ W_{3,(i-4)} \end{bmatrix}$ |

-continued

| 4Tx FC TPMIs (I) | TPMI index i | Intermediate precoder matrix W' |
|---|---|---|
| i = ($i_1$, $i_2$) | | $\begin{bmatrix} W_{4,3,I}([1 \ldots 4], [1]) & 0_{4,2} \\ 0_{4,1} & W_{4,3,I}([1 \ldots 4], [2, 3]) \end{bmatrix}$ $= \begin{bmatrix} W_{4,1,i}([1 \ldots 4], [1]) & 0_{4,2} \\ 0_{4,1} & W_{4,2,i+2}([1 \ldots 4], [1, 2]) \end{bmatrix}$ $= \frac{1}{\sqrt{2}}\begin{bmatrix} W_{1,i_1} & 0_{4\times2} \\ 0_{4\times1} & W_{2,i_2} \end{bmatrix}$ |
| i = ($i_1$, $i_2$) | | $\begin{bmatrix} W_{4,3,I}([1 \ldots 4], [1, 2]) & 0_{4,1} \\ 0_{4,2} & W_{4,3,I}([1 \ldots 4], [3]) \end{bmatrix}$ $= \begin{bmatrix} W_{4,1,i_2}([1 \ldots 4], [1, 2]) & 0_{4,1} \\ 0_{4,2} & W_{4,1,i_1}([1 \ldots 4], [1]) \end{bmatrix}$ $= \frac{1}{\sqrt{2}}\begin{bmatrix} W_{2,i_2} & 0_{4\times1} \\ 0_{4\times2} & W_{1,i_1} \end{bmatrix}$ , | the UL codebook ($C_8$) for 4 layers includes all of or a subset of the following:

| 4Tx FC TPMIs (I) | TPMI index i | Intermediate precoder matrix W' |
|---|---|---|
| 3-4 | 0-1 | $\begin{bmatrix} W_{4,4,I}([1 \ldots 4], [1, \ldots , 4]) \\ 0_{4,4} \end{bmatrix} = \frac{1}{\sqrt{2}}\begin{bmatrix} W_{4,i} \\ 0_{4\times4} \end{bmatrix}$ |
| 3-4 | 2-3 | $\begin{bmatrix} 0_{4,4} \\ W_{4,4,I}([1 \ldots 4], [1, \ldots , 4]) \end{bmatrix} = \frac{1}{\sqrt{2}}\begin{bmatrix} 0_{4\times4} \\ W_{4,(i-2)} \end{bmatrix}$ |
| i = ($i_1$, $i_2$) | | $\begin{bmatrix} W_{4,4,I}([1 \ldots 4], [1, 2]) & 0_{4,2} \\ 0_{4,2} & W_{4,4,I}([1 \ldots 4], [3, 4]) \end{bmatrix}$ $= \begin{bmatrix} W_{4,1,i_1}([1 \ldots 4], [1, 2]) & 0_{4,2} \\ 0_{4,2} & W_{4,1,i_2}([1 \ldots 4], [1, 2]) \end{bmatrix}$ $= \frac{1}{\sqrt{2}}\begin{bmatrix} W_{2,i_1} & 0_{4\times2} \\ 0_{4\times2} & W_{2,i_2} \end{bmatrix}$ , | the UL codebook ($C_8$) for 6 layers includes all of or a subset of the following:

| 4Tx FC TPMIs (I) | TPMI index i | Intermediate precoder matrix W' |
|---|---|---|

3-4      $i = (i_1, i_2)$ $$\begin{bmatrix} W_{4,4,I}([1 \ldots 4], [1, 2, 3]) & 0_{4,3} \\ 0_{4,3} & W_{4,4,I}([1 \ldots 4], [2, 3, 4]) \end{bmatrix}$$

$$=$$

$$\begin{bmatrix} W_{4,3,i_1}([1 \ldots 4], [1, 2, 3]) & 0_{4,3} \\ 0_{4,3} & W_{4,3,i_2}([1 \ldots 4], [1, 2, 3]) \end{bmatrix}$$

$$= \frac{1}{\sqrt{2}} \begin{bmatrix} \overline{W}_{3,i_1} & 0_{4\times3} \\ 0_{4\times3} & \overline{W}_{3,i_2} \end{bmatrix}$$

,

15 the UL codebook ($C_8$) for 7 layers includes all of or a subset of the following:

| 4Tx FC TPMIs (I) | TPMI index i | Intermediate precoder matrix W' |
|---|---|---|

3-4      $i = (i_1, i_2)$ $$\begin{bmatrix} W_{4,4,I}([1 \ldots 4], [1, 2, 3]) & 0_{4,4} \\ 0_{4,3} & W_{4,4,I}([1 \ldots 4], [1, \ldots, 4]) \end{bmatrix}$$

$$= \begin{bmatrix} W_{4,3,i_1}([1 \ldots 4], [1, 2, 3]) & 0_{4,4} \\ 0_{4,3} & W_{4,4,i_2}([1 \ldots 4], [1, \ldots, 4]) \end{bmatrix}$$

$$= \frac{1}{\sqrt{2}} \begin{bmatrix} \overline{W}_{3,i_1} & 0_{4\times4} \\ 0_{4\times3} & \overline{W}_{4,i_2} \end{bmatrix}$$

, the UL codebook ($C_8$) for 8 layers includes all of or a subset of the following:

| 4Tx FC TPMIs (I) | TPMI index i | Intermediate precoder matrix W' |
|---|---|---|

3-4      $i = (i_1, i_2)$ $$\begin{bmatrix} W_{4,4,i_1}([1 \ldots 4], [1, \ldots, 4]) & 0_{4,4} \\ 0_{4,4} & W_{4,4,i_2}([1 \ldots 4], [1, \ldots, 4]) \end{bmatrix} =$$

$$\frac{1}{\sqrt{2}} \begin{bmatrix} \overline{W}_{4,i_1} & 0_{4\times4} \\ 0_{4\times4} & \overline{W}_{4,i_2} \end{bmatrix}$$

\*    \*    \*    \*    \*